United States Patent
Shibusawa et al.

(10) Patent No.: US 11,044,403 B2
(45) Date of Patent: Jun. 22, 2021

(54) IMAGING DEVICE THAT CONTINUOUSLY MONITOR A SUBJECT WHILE REDUCING POWER CONSUMPTION NEEDED TO ILLUMINATE THE SUBJECT

(71) Applicant: SAMSUNG ELECTRONICS CO., LTD., Suwon-si (KR)

(72) Inventors: Eijiro Shibusawa, Yokohama (JP); Edwardo Arata Y. Murakami, Yokohama (JP); Yoshiaki Okuno, Yokohama (JP); Toshihiro Kitajima, Yokohama (JP); Sang-on Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 15 days.

(21) Appl. No.: 15/778,483

(22) PCT Filed: Dec. 9, 2016

(86) PCT No.: PCT/KR2016/014436
§ 371 (c)(1),
(2) Date: May 23, 2018

(87) PCT Pub. No.: WO2017/099517
PCT Pub. Date: Jun. 15, 2017

(65) Prior Publication Data
US 2018/0359424 A1    Dec. 13, 2018

(30) Foreign Application Priority Data
Dec. 28, 2015   (JP) .............................. JP2015-257027

(51) Int. Cl.
H04N 5/232      (2006.01)
H04N 5/225      (2006.01)
H04N 5/235      (2006.01)

(52) U.S. Cl.
CPC ..... *H04N 5/232411* (2018.08); *H04N 5/2256* (2013.01); *H04N 5/2352* (2013.01);
(Continued)

(58) Field of Classification Search
CPC ........... H04N 5/232411; H04N 5/2352; H04N 5/23218; H04N 5/2256; H04N 5/23219; H04N 5/2353; H04N 5/2354
See application file for complete search history.

(56) References Cited

U.S. PATENT DOCUMENTS 6,987,876 B2 * 1/2006 Silber ................... G01J 1/32
                                                    250/205
8,169,496 B2 * 5/2012 Numazaki ............ H04N 5/2354
                                                    348/222.1
(Continued)

FOREIGN PATENT DOCUMENTS

JP    2001-350171 A   12/2001
JP    2004-240799 A   8/2004
(Continued)

OTHER PUBLICATIONS

International Search Report dated Mar. 9, 2017 issued by the International Searching Authority in counterpart International Application No. PCT/KR2016/014436 (PCT/ISA/210).
(Continued)

*Primary Examiner* — Luong T Nguyen
(74) *Attorney, Agent, or Firm* — Sughrue Mion, PLLC

(57) ABSTRACT

Power consumption needed to illuminate a subject is reduced and the subject is continuously monitored. Each of a plurality of light sources emits light to the subject. An imaging circuitry obtains a captured image by imaging the subject. A controller performs light emission control to change a light source that emits light from among the plurality of light sources and causes the imaging circuitry to
(Continued)

US 11,044,403 B2

Page 2 image the subject. A determiner determines whether a detection target that is pre-determined exists in an image area that is a part of the captured image obtained by the imaging circuitry and corresponds to the light source that emits light during imaging for obtaining the captured image.

24 Claims, 66 Drawing Sheets

(52) U.S. Cl.
CPC ......... *H04N 5/2353* (2013.01); *H04N 5/2354* (2013.01); *H04N 5/23218* (2018.08); *H04N 5/23219* (2013.01)

(56) References Cited

U.S. PATENT DOCUMENTS

| | | | | |
|---|---|---|---|---|
| 9,215,781 | B2* | 12/2015 | Marman | H05B 47/105 |
| 10,194,789 | B2* | 2/2019 | Seto | A61B 1/0661 |
| 10,313,601 | B2* | 6/2019 | Chen | H04N 5/2352 |
| 2009/0262189 | A1 | 10/2009 | Marman | |
| 2012/0241620 | A1* | 9/2012 | On | A61B 5/0071 |
| | | | | 250/338.1 |
| 2014/0371535 | A1 | 12/2014 | Seto | |
| 2015/0069917 | A1* | 3/2015 | Shih | H04N 5/2351 |
| | | | | 315/151 |
| 2017/0019578 | A1* | 1/2017 | Wang | H04N 5/2354 |

FOREIGN PATENT DOCUMENTS

| | | | |
|---|---|---|---|
| JP | 2011-49788 A | | 3/2011 |
| JP | 2012-174421 A | | 9/2012 |
| JP | 2013-4490 A | | 1/2013 |
| JP | 2013-99577 A | | 5/2013 |
| JP | 2013-226394 A | | 11/2013 |
| JP | 2014-216138 | * | 11/2014 |
| JP | 2014-216138 A | | 11/2014 |
| JP | 2015-173344 A | | 10/2015 |
| KR | 10-1052803 B1 | | 7/2011 |
| KR | 10-2011-0131772 A | | 12/2011 |

OTHER PUBLICATIONS

Written Opinion dated Mar. 9, 2017 issued by the International Searching Authority in counterpart International Application No. PCT/KR2016/014436 (PCT/ISA/237).
Communication dated Sep. 7, 2018, issued by the European Patent Office in counterpart European Application No. 16873382.2.
Communication dated Jul. 23, 2019, issued by the European Patent Office in counterpart European Application No. 16 873 382.2.
Communication dated Dec. 26, 2019, issued by the State Intellectual Property Office of People's Republic of China in counterpart Chinese Application No. 201680072566.2.

\* cited by examiner

FIG. 1F

|  | FULL PERIOD TURN-ON | TIMING TURN-ON |
|---|---|---|
| ILLUMINATION OF ENTIRE SUBJECT | 100% | 10%~15% |
| ILLUMINATION OF PART OF SUBJECT | 25% | 2.5%~4% |

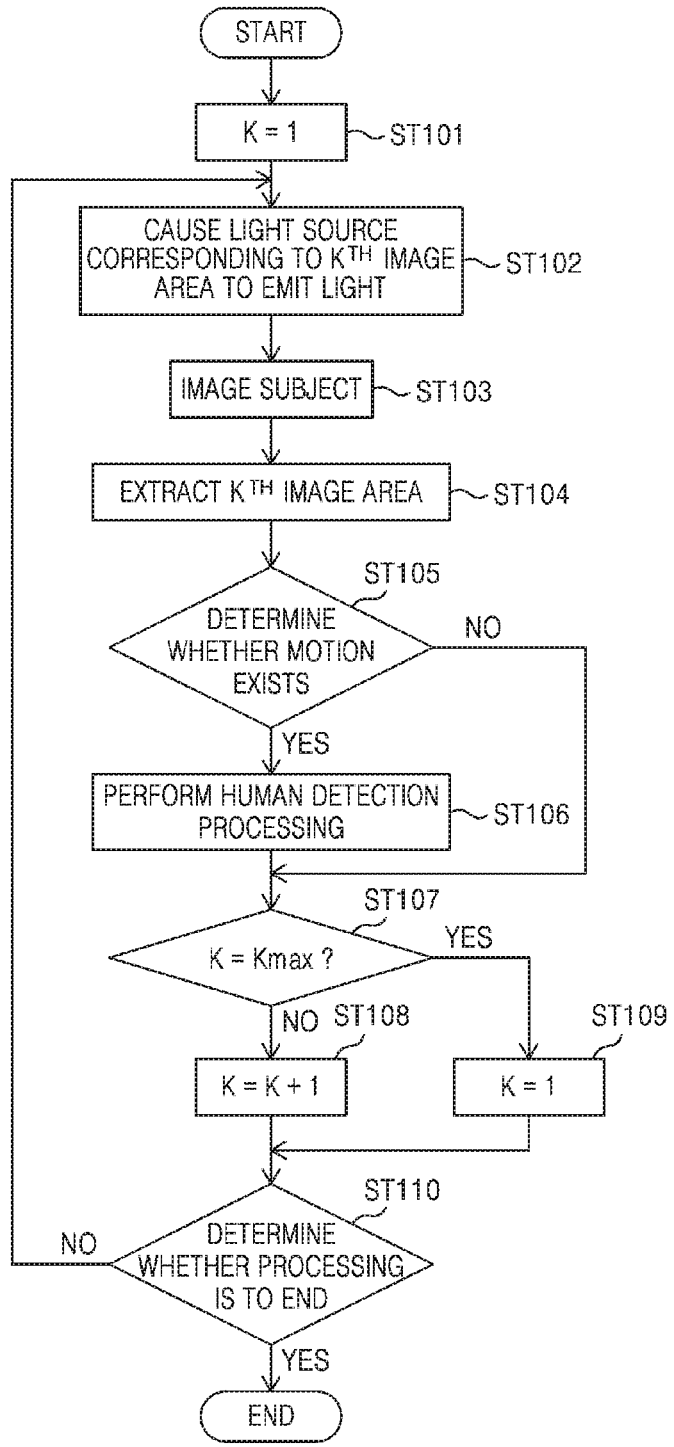

IMAGING DEVICE THAT CONTINUOUSLY MONITOR A SUBJECT WHILE REDUCING POWER CONSUMPTION NEEDED TO ILLUMINATE THE SUBJECT

TECHNICAL FIELD

The present disclosure relates to an imaging device and a method of operating the same.

BACKGROUND ART

Imaging devices for imaging and monitoring subjects have been known. For example, an image sensor for judging the presence of a human by processing image information obtained by an image pickup element is disclosed in Japanese Patent Application Publication No. 2001-243475.

DESCRIPTION OF EMBODIMENTS

Technical Problem

The above imaging device determines the presence of a detection target (e.g., a motion or a human) by imaging a subject in a state where the whole of the subject is illuminated. Also, in the above imaging device, the illumination of the subject may be stopped in order to reduce power consumption needed to illuminate the subject system. However, once the illumination of the subject is stopped, the subject may not be continuously performed (whether the detection target exists may not be continuously determined).

Solution to Problem

Accordingly, an objective of the present disclosure is to provide an imaging device that may continuously monitor a subject while reducing power consumption needed to illuminate the subject system, and a method of operating the imaging device.

Advantageous Effects of Disclosure

As described above, power consumption needed to illuminate a subject may be reduced and the subject may be continuously monitored.

BRIEF DESCRIPTION OF DRAWINGS

FIG. 1F is a reference diagram illustrating the effect of the present disclosure.

FIG. 4 is a flowchart for explaining an operation of the imaging device according to Embodiment 1.

BEST MODE

Figure 1A:
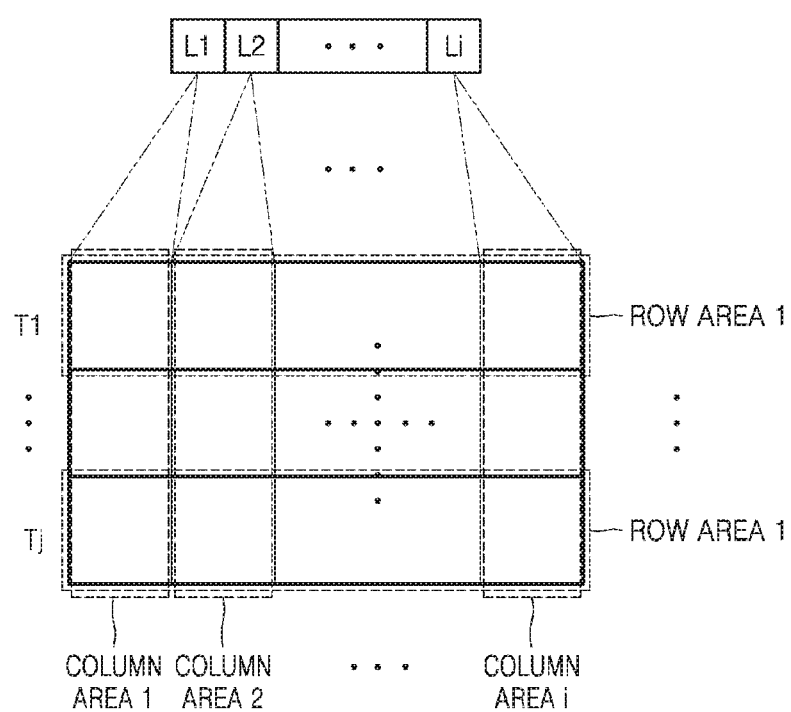
FIG. 1A is a reference diagram for explaining the concept of the present disclosure.

An imaging device according to an embodiment of the present disclosure includes: a plurality of light sources each configured to emit light to a subject; an imaging circuitry configured to obtain a captured image by imaging the subject; a controller configured to perform light emission control of the plurality of light sources to change a light source that emits light from among the plurality of light sources and control the imaging circuitry to image the subject; and determiner configured to determine whether a detection target that is pre-determined exists in an image area that is a part of the captured image obtained by the imaging circuitry and corresponds to the light source that emits light during imaging for obtaining the captured image.

In the imaging device, since the light source that emits light from among the plurality of light source is changed, power consumption needed to illuminate the subject may be reduced to be less than when all of the plurality of light sources continuously emit light (i.e., when the entire subject is continuously illuminated).

Also, in the imaging device, the image area that is a part of the captured image and corresponds to the light source that emits light during imaging for obtaining the captured image corresponds to a portion of the subject illuminated by the light source. Accordingly, whether the detection target exists may be accurately determined by determining whether the detection target exists in the image area (i.e., the image area corresponding to the portion of the subject illuminated by the light source) of the captured image.

Also, in the imaging device, since the subject is continuously imaged by changing the light source that emits light from among the plurality of light sources, the image area (i.e., the portion of the subject to be determined) that is a part of the captured image and is to be determined by the determiner may be changed. Accordingly, the subject may be continuously monitored (whether the detection target exists may be continuously determined).

According to an embodiment, the controller may be further configured to, when the image area determined by the determiner to include the detection target does not exist, perform the light emission control so that the plurality of light sources emit light in a pre-determined light emission order, and when the image area determined by the determiner to include the detection target exists, perform the light emission control so that a light emission frequency of the light source corresponding to the image area determined by the determiner to include the detection target from among the plurality of light sources is increased.

According to an embodiment, the controller may be further configured to, when the image area determined by the determiner to include the detection target exists, perform the light emission control so that a first light-emitting operation in which the light source corresponding to the image area determined by the determiner to include the detection target emits light and a second light-emitting operation in which one or more light sources from among light sources corresponding to image areas not determined by the determiner to include the detection target emit light based on the pre-determined light emission order are alternately performed.

According to an embodiment, in the first light-emitting operation, a plurality of light sources respectively corresponding to a plurality of the image areas determined by the determiner to include the detection target may emit light simultaneously.

According to an embodiment, in the first light-emitting operation, a plurality of light sources respectively corresponding to a plurality of the image areas determined by the determiner to include the detection target may emit light sequentially.

According to an embodiment, the imaging device may further include a detector configured to detect a pre-determined object from the captured image including the image area determined by the determiner to include the detection target.

According to an embodiment, when a portion that is a part of an attention area that is the image area determined by the determiner to include the detection target and is determined by the determiner to include the detection target is an edge portion of the attention area, the detector may be further configured to detect the pre-determined object from a candidate area including the attention area and an adjacent area that is an image area adjacent to the edge portion of the attention area.

According to an embodiment, the imaging device may further include an identifier configured to extract an object area that is a part of the captured image and includes the pre-determined object detected by the detector from the captured image and identify the pre-determined object by combining the object area with a combination image that is pre-registered.

According to an embodiment, when the object area extracted by the identifier extends over an attention area that is the image area determined by the determiner to include the detection target and an adjacent area that is an image area adjacent to an edge portion of the attention area, the controller may be further configured to cause the imaging circuitry to image the subject by causing light sources corresponding to the attention area and the adjacent area from among the plurality of light sources to emit light, and the identifier may be further configured to combine the object area with the combination image by extracting the object area from the captured image obtained by the imaging circuitry when the light source corresponding to the attention area emits light, combine the object area with the combination image by extracting the object area from the captured image obtained by the imaging circuitry when the light sources corresponding to the attention area and the adjacent area emit light, and identify the pre-determined object based on a combination result.

According to an embodiment, the imaging circuitry may be further configured to be driven by a rolling shutter method, the controller may be further configured to, in the light emission control, cause the light source to emit light so that a turn-on period where at least one light source from among the plurality of light sources is turned on and a turn-off period where the at least one light source is turned off exist in a period other than a period where all lines of the imaging circuitry are simultaneously exposed, and the determiner may be further configured to determine whether the detection target exists in an image area that is a part of the captured image obtained by the imaging circuitry, corresponds to the light source that emits light during imaging for obtaining the captured image, and corresponds to the period where the at least one light source is turned on.

The controller may be further configured to, when the image area determined by the determiner to include the detection target does not exist, perform the light emission control so that the plurality of light sources emit light in a pre-determined light emission order and a turn-on order, and when the image area determined by the determiner to include the detection target exists, perform the light emission control so that a frequency at which the light source corresponding to the image area determined by the determiner to include the detection target from among the plurality of light sources is turned on in a turn-on period corresponding to the image area determined by the determiner to include the detection target is increased.

The controller may be further configured to, when the image area determined by the determiner to include the detection target exists, perform the light emission control so that a first light-emitting operation in which the light source corresponding to the image area determined by the determiner to include the detection target is turned on in the turn-on period corresponding to the image area determined by the determiner to include the detection target and a second light-emitting operation in which one of light sources corresponding to image areas not determined by the determiner to include the detection target emit light based on the pre-determined light emission order and the turn-on order are alternately performed.

According to an embodiment, in the first light-emitting operation, a plurality of light sources respectively corresponding to a plurality of the image areas determined by the determiner to include the detection target may be turned on simultaneously.

According to an embodiment, in the first light-emitting operation, a plurality of light sources respectively corresponding to a plurality of the image areas determined by the determiner to include the detection target may be turned on sequentially.

According to an embodiment, each of the plurality of light sources may be further configured to be capable of changing a light emission amount, and the controller may be further configured to set a light emission amount of the light source based on a brightness of an image area that is a part of the captured image obtained by the imaging circuitry and corresponds to a light source that does not emit light during imaging for obtaining the captured image.

According to an embodiment, the imaging device may further include a setter, wherein each of the plurality of light sources is further configured to be capable of changing a light emission amount into a plurality of light emission amounts, and the controller is further configured to, when a light emission amount to be set for the light source that emits light from among the plurality of light sources is not determined, perform a first operation in which a light emission amount of the light source is set as a light emission amount selected from among the plurality of light emission amounts in a pre-determined order and the subject illuminated by the light source that emits light at the selected light emission amount is imaged by the imaging circuitry, and when the light emission amount to be set for the light source is determined, perform a second operation in which a light emission amount of the light source is set as the light emission amount to be set and the subject illuminated by the light source that emits light at the light emission amount to be set is imaged by the imaging circuitry, and the setter is further configured to determine a light emission amount of the light source that emits light during imaging for obtaining the captured image including the image area determined by the determiner to include the detection target as the light emission amount to be set for the light source.

According to an embodiment, each of the plurality of light sources may be further configured to be capable of changing a light emission amount into a first light emission amount and a second light emission amount less than the first light emission amount, the imaging circuitry may be further configured to be capable of changing an exposure time into a first exposure time and a second exposure time longer than the first exposure time, and the controller may be further configured to set a light emission amount of the light source corresponding to the image area determined by the determiner to include the detection target as the first light emission amount and an exposure time of the imaging circuitry during imaging the subject illuminated by the light source as the first exposure time, and set a light emission amount of a light source corresponding to an image area determined by the determiner not to include the detection target as the second light emission amount and set an exposure time of the imaging circuitry during imaging the subject illuminated by the light source as the second exposure time.

According to an embodiment, the imaging circuitry may be further configured to be driven by a rolling shutter method, and the controller may be further configured to, in the light emission control, cause the light source to emit light so that a period where at least one light source from among the plurality of light sources is turned on and a period where the at least one light source is turned off exist in a period other than a period where all lines of the imaging circuitry are simultaneously exposed, and determine the image area that is a part of the captured image obtained by the imaging circuitry and in which presence of the detection target is to be determined, based on the light source that emits light from among the plurality of light sources and a period where the light source that emits light is turned on.

According to an embodiment, the captured image obtained by the imaging circuitry may be divided into a plurality of row areas and a plurality of column areas, wherein one column area from among the plurality of column areas is determined in accordance with the light source that emits light during imaging for obtaining the captured image, and one row area from among the plurality of row areas is determined in accordance with the period where the light source that emits light is turned on.

An imaging device according to another embodiment may include: a light source configured to emit light to a subject; an imaging circuitry configured to be driven by a rolling shutter method and obtain a captured image by imaging the subject; and a controller configured to cause the light source to emit light so that a period where the light source is turned on and a period where the light source is turned off exist within a period other than a period where all lines of the imaging circuitry are simultaneously exposed.

According to an embodiment, the imaging device may further include a determiner configured to determine whether a motion exists by performing an interframe differential method on an image area that is a part of the captured image obtained by the imaging circuitry and corresponds to the period where the light source is turned on.

According to an embodiment, the imaging device may further include an identifier, wherein, when it is determined by the determiner that the motion exists, the controller is further configured to control the light source to emit stronger light in a period corresponding to the image area determined to include the motion, and the identifier is further configured to perform face recognition on the image area determined to include the motion.

An imaging device according to another embodiment may include: a light source configured to emit light to a subject system; an imaging circuitry configured to obtain a captured image by imaging the subject system; and a controller configured to set a light emission amount of the light source based on a brightness of the captured image obtained by the imaging circuitry when the light source does not emit light.

According to an embodiment, the imaging circuitry may be further configured to be driven by a rolling shutter method.

According to an embodiment, the controller may be further configured to change the light emission amount of the light source by using pulse width modulation.

According to an embodiment, the light source may be further configured to emit infrared light.

According to an embodiment, the brightness of the captured may be may include an average value of brightnesses of all pixels in the captured image obtained by the imaging circuitry.

An imaging device according to another embodiment may include: a light source configured to be capable of changing a light emission amount into a plurality of light emission amounts; an imaging circuitry configured to obtain a captured image by imaging a subject system; a controller configured to, when a light emission amount to be set for the light source is not determined, perform a first operation in which a light emission amount of the light source as a light emission amount selected from among the plurality of light emission amounts in a pre-determined order and the subject illuminated by the light source that emits light at the selected light emission amount is imaged by the imaging circuitry, and when the light emission amount to be set for the light source is determined, perform a second operation in which a light emission amount of the light source is set as the light emission amount to be set and the subject illuminated by the light source that emits light at the light emission amount to be set is imaged by the imaging circuitry; a determiner configured to determine whether a detection target exists in the captured image obtained by the imaging circuitry; and a setter configured to determine a light emission amount of the light source during imaging for obtaining the captured image determined by the determiner to include the detection target as the light emission amount to be set.

According to an embodiment, the determiner may be further configured to classify a plurality of captured images obtained by the imaging circuitry into light emission amounts of the light source during imaging for obtaining the captured image and determine whether the detection target exists in the captured image for each of the light emission amounts.

According to an embodiment, the setter may be further configured to, when the captured image obtained by the second operation of the controller is determined by the determiner not to include the detection target, cancel the determining of the light emission amount of the light source during imaging for obtaining the captured image as the light emission amount to be set.

According to an embodiment, the light source may be further configured to be capable of changing a light emission amount into first and second light emission amounts, the controller may be further configured to, in the first operation, set a light emission amount of the light source as the first light emission amount and cause the subject illuminated by the light source that emits light at the first light emission amount to be imaged by the imaging circuitry, and then set a light emission amount of the light source as the second light emission amount and cause the subject illuminated by the light source that emits light at the second light emission amount to be imaged by the imaging circuitry; and in the second operation, when the first light emission amount is determined as the light emission amount to be set, set a light emission amount of the light source as the first light emission amount and cause the subject illuminated by the light source that emits light at the first light emission amount to be imaged by the imaging circuitry, when the second light emission amount is determined as the light emission amount to be set, set a light emission amount of the light source as the second light emission amount and cause the subject illuminated by the light source that emits light at the second light emission amount to be imaged by the imaging circuitry, and when the first and second light emission amounts are each determined as the light emission amount to be set, alternately change a light emission amount of the light source into any of the first and second light emission amounts and cause the subject illuminated by the light source that emits light at the changed light emission amount to be imaged by the imaging circuitry.

An imaging device according to another embodiment may include: a light source configured to be capable of changing a light emission amount into a first light emission amount and a second light emission amount less than the first light emission amount and emit light to a subject system; an imaging circuitry configured to be capable of changing an exposure time into a first exposure time and a second exposure time shorter than the first exposure time and obtain a captured image by imaging the subject system; a determiner configured to determine whether a detection target exists in the captured image obtained by the imaging circuitry; and a controller configured to, when it is determined by the determiner that the detection target exists, set a light emission amount of the light source as the first light emission amount and an exposure time of the imaging circuitry as the first exposure time, and when it is determined by the determiner that the detection target does not exist, set a light emission amount of the light source as the second light emission amount and an exposure time of the imaging circuitry as the second exposure time.

According to another embodiment, an imaging method using a plurality of light sources that each emit light to a subject and an imaging circuitry that obtains a captured image by imaging the subject may include: a first process of performing light emission control to change a light source that emits light from among the plurality of light sources and causing the imaging circuitry to image the subject; and a second process of determining whether a detection target that is pre-determined exists in an image area that is a part of the captured image obtained by the imaging circuitry and corresponds to the light source that emits light during imaging for obtaining the captured image.

An imaging method using a rolling shutter according to another embodiment may include: a first process of emitting light to a subject by using a light source; and a second process of causing the light source to emit light so that a period where the light source is turned on and a period where the light source is turned off exist within a period other than a period where all lines of the rolling shutter are simultaneously exposed.

According to an embodiment, the imaging method may further include a third process of determining whether a motion exists by performing an interframe differential method on an image area within a captured image corresponding to the period where the light source is turned on.

According to an embodiment, the imaging method may further include: a fourth process of, when it is determined that the motion exists, controlling the light source to emit stronger light in a period corresponding to the image area determined to include the motion; and a fifth process of, when it is determined that the motion exists, performing face recognition on the image area determined to include the motion.

An imaging method according to another embodiment may include: a first process of emitting light to a subject by using a light source; a second process of obtaining a captured image by imaging the subject by using an imaging circuitry; and a third process of setting a light emission amount of the light source based on a brightness of the captured image obtained by the imaging circuitry.

According to an embodiment, the imaging circuitry may be further configured to be driven by a rolling shutter method.

According to an embodiment, the light emission amount of the light source may be changed by using pulse width modulation.

According to an embodiment, the light source may be further configured to emit infrared light.

According to an embodiment, the brightness of the captured image may include an average value of brightnesses of all pixels in the captured image obtained by the imaging circuitry.

According to another embodiment, an imaging method using a light source configured to be capable of changing a light emission amount into a plurality of light emission amounts and an imaging circuitry configured to obtain a captured image by imaging a subject may include: a first process in which it is determined whether a light emission amount to be set for the light source is determined; a second process in which, when it is determined that the light emission amount to be set for the light source is not determined, a light emission amount of the light source is set as a light emission amount selected from among the plurality of light emission amounts in a pre-determined order, the subject illuminated by the light source that emits light at the selected light emission amount is imaged by the imaging circuitry, it is determined whether a detection target exists in the captured image obtained by the imaging circuitry, and a light emission amount of the light source during imaging for obtaining the captured image determined to include the detection target is determined as the light emission amount to be set; and a third process in which, when it is determined that the light emission amount to be set for the plurality of light emission amounts is determined in the first process, a light emission amount of the light source is set as the light emission amount to be set and the subject illuminated by the light source that emits light at the light emission amount to be set is imaged by the imaging circuitry.

According to an embodiment, in the second process, a plurality of captured images obtained by the imaging circuitry may be classified into light emission amounts of the light source during imaging for obtaining the captured image, and it may be determined whether the detection target exists in the captured image for each of the light emission amounts.

According to an embodiment, in the third process, it may be determined whether the detection target exists in the captured image obtained by the imaging circuitry, and the determining of the light emission amount of the light source during imaging for obtaining the captured image determined not to include the detection target as the light emission amount to be set may be canceled.

According to an embodiment, the light source may be further configured to be capable of changing a light emission amount into first and second light emission amounts, wherein in the second process, a light emission amount of the light source may be set as the first light emission amount and the subject illuminated by the light source that emits light at the first light emission amount may be imaged by the imaging circuitry, and then a light emission amount of the light source may be set as the second light emission amount and the subject illuminated by the light source that emits light at the second light emission amount may be imaged by the imaging circuitry; and in the third process, when the first light emission amount is determined as the light emission amount to be set, a light emission amount of the light source may be set as the first light emission amount and the subject illuminated by the light source that emits light at the first light emission amount may be imaged by the imaging circuitry, when the second light emission amount is determined as the light emission amount to be set, a light emission amount of the light source may be set as the second light emission amount and the subject illuminated by the light source that emits light at the second light emission amount may be imaged by the imaging circuitry, and when the first and second light emission amounts are each determined as the light emission amount to be set, a light emission amount of the light source may be alternately changed into any of the first and second light emission amounts and the subject illuminated by the light source that emits light at the changed light emission amount may be imaged by the imaging circuitry.

According to another embodiment, an imaging method using a light source configured to be capable of changing a light emission amount into a first light emission amount and a second light emission amount less than the first light emission amount and emit light to a subject system, and an imaging circuitry configured to be capable of changing an exposure time into a first exposure time and a second exposure time longer than the first exposure time and obtain a captured image by imaging the subject may include: a first process in which it is determined whether a detection target exists in the captured image obtained by the imaging circuitry; and a second process in which, when it is determined that the detection target exists in the first process, a light emission amount of the light source is set as the first light emission amount and an exposure time of the imaging circuitry is set as the first exposure time, and when it is determined that the detection target does not exist in the first process, a light emission amount of the light source is set as the second light emission amount and an exposure time of the imaging circuitry is set as the second exposure time.

MODE OF DISCLOSURE

Hereinafter, embodiments will be described in detail with reference to the drawings. Also, the same or corresponding portions are denoted by the same reference numerals and an explanation thereof is not repeated.

[Overall Concept]

In a device that monitors and images a subject, an image sensor equipped with an illumination device is provided in order to detect or identify a person in a bright place and a dark place. It is disclosed that timing or light distribution characteristics of such an illumination device are controlled in order to prevent luminance unevenness in an image. However, it is not appropriate to uniformly illuminate the entire subject in order to detect a person, considering power consumption of the illumination device. In particular, an increase in power consumption may make it difficult to miniaturize a device such as a heat dissipation mechanism.

Accordingly, the present disclosure proposes to control a portion of an image area corresponding to a subject to be imaged by illuminating only a part, instead of the whole, of the subject and/or illuminating the subject during only a time that is a turn-on time, instead of a full time.

FIG. 1A is a reference diagram for explaining the concept of the present disclosure.

Referring to FIG. 1A, a part of a column area of an image area corresponding to a subject may be illuminated by providing a plurality of light sources in an imaging device. Also, a part of a row area of the image area may be illuminated by controlling a time during which a light source is turned on. Referring to FIG. 1A, the imaging device may include i light sources L1, L2, . . . , and Li (i is an integer equal to or greater than 2), and a corresponding part of the subject may be illuminated by light emission of each light source. The image area may include i column areas corresponding to the i light sources. That is, at least one light source may be selected to emit light from among the plurality of light sources and at least one column area corresponding to the selected light source may be imaged. Also, the imaging device may turn on a light source during a part of a period of one frame, instead of, the whole of the period of the frame, and a part of the subject corresponding to the part of the period may be illuminated. For example, a full turn-on time of a light source for imaging one frame, that is, from a first line to a last line of the frame, may be divided into times T1, T2, . . . , and Tj (j is an integer equal to or greater than 2), at least one time from among the times Ti, T2, . . . , and Tj may be selected to turn on the light source, and a row area corresponding to the selected time may be imaged. Also, both row areas and column areas of the image area that are imaged may be selected by controlling both the number of light sources that emit light and turn-on times of the light sources.

Figure 1B:
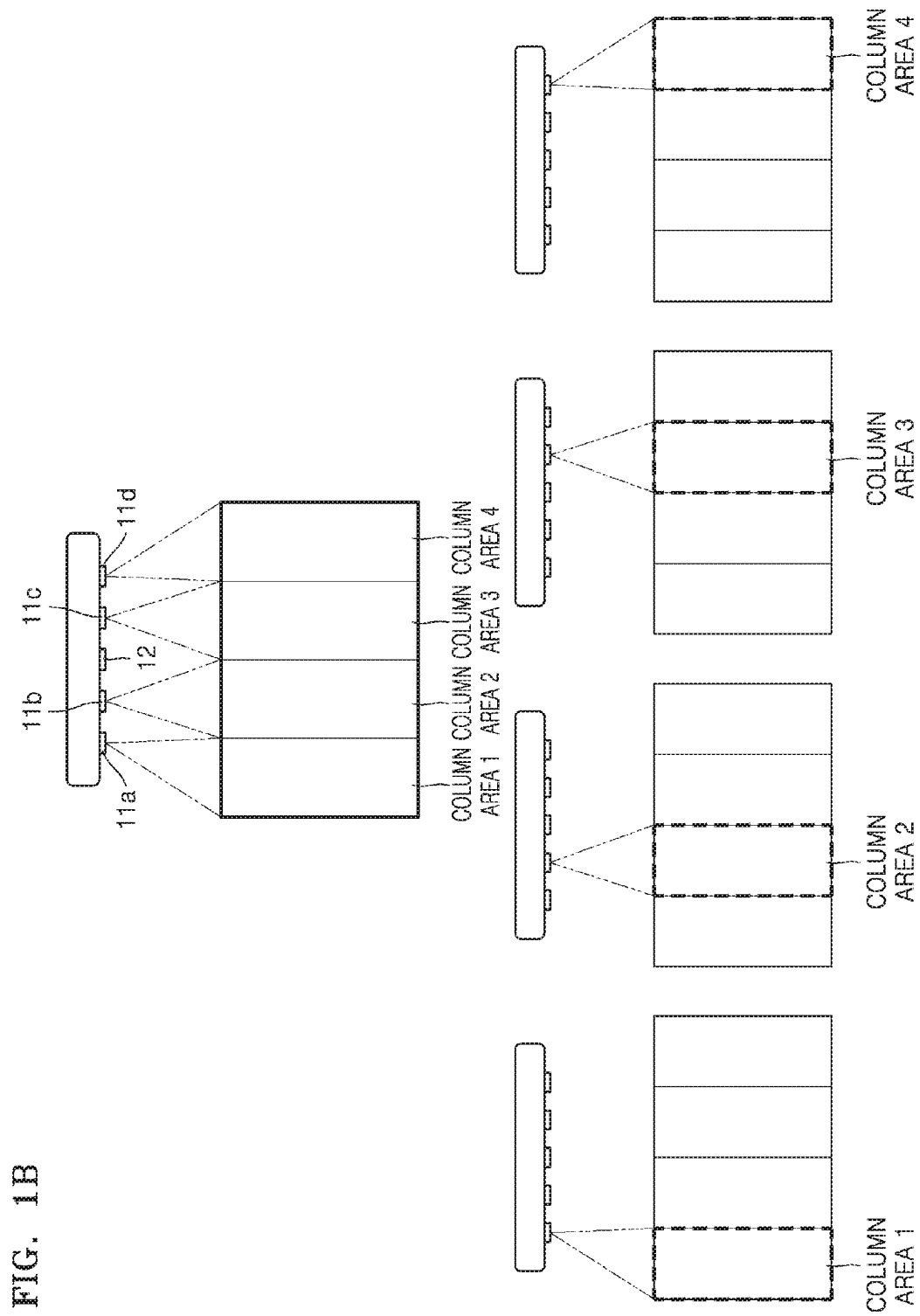
FIG. 1B is a reference diagram for explaining an example where a column area of an image area is controlled by selecting at least one light source from among a plurality of light sources.

FIG. 1B is a reference diagram for explaining an example where a column area of an image area is controlled by selecting at least one light source from among a plurality of light sources.

Referring to FIG. 1B, for example, light source includes 11a, 11b, 11c, and 11d are provided. A column area 1, a column area 2, a column area 3, and a column area 4 of an image area corresponding to positions of the light sources 11a, 11b, 11c, and 11d are illustrated. The column area 1 of the image area may be obtained by causing the light source 11a to emit light and an imaging circuitry 12 to perform imaging. The column area 2 of the image area, the column area 3 of the image area, and the column area 4 of the image area may be respectively obtained by causing the light source 11b, the light source 11c, and the light source 11d to emit light.

As such, since light sources are arranged in parallel and only a specific light source emits light, a portion obtained by vertically dividing the subject may be illuminated and an image of the portion may be obtained. That is, since only a specific light source for obtaining a portion emits light, power consumption needed for illumination may be reduced.

Figure 1C:
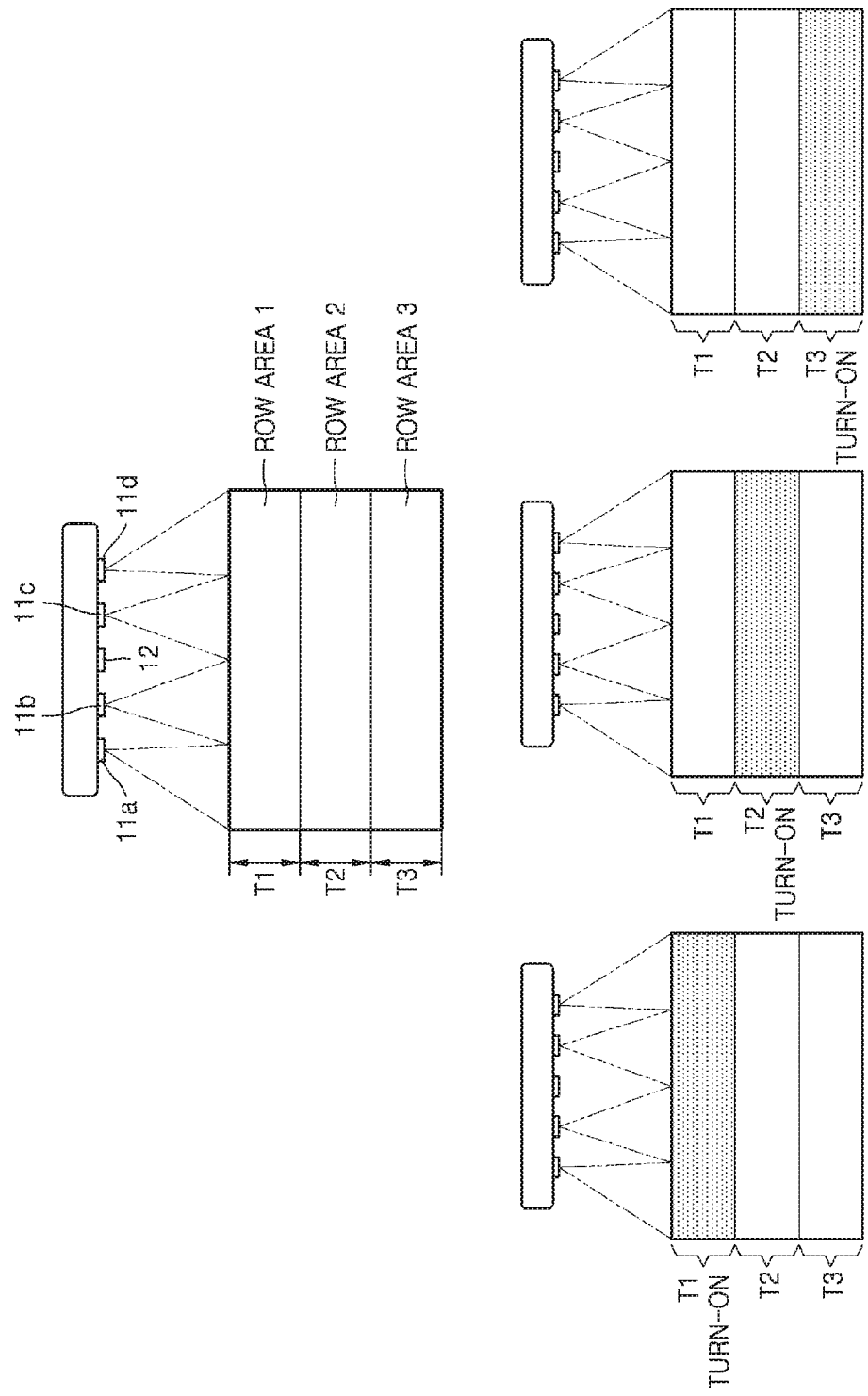
FIG. 1C is a reference diagram for explaining an example where a row area of an image area is controlled by adjusting a turn-on time and a turn-off time of a light source that emits light.

FIG. 1C is a reference diagram for explaining an example where a row area of an image area is controlled by adjusting a turn-on time and a turn-off time of a light source that emits light.

Referring to FIG. 1C, for example, the light sources 11a, 11b, 11c, and 11d are provided. For convenience of explanation of row area control, it is assumed that all of the light sources 11a, 11b, 11c, and 11d emit light. A row area 1, a row area 2, and a row area 3 of an image area respectively corresponding to times T1, T2, and T3 during which the light sources 11a, 11b, 11c, and 11d emit light to image one frame are illustrated. The row area 1 of the image area may be obtained by turning on the light sources 11a, 11b, 11c, and 11d during the time T1 and turning off the light sources 11a, 11b, 11c, and 11d during the times T2 and T3. Also, the row area 2 of the image area may be obtained by turning on the light sources 11a, 11b, 11c, and 11d during the time T2 and turning off the light sources 11a, 11b, 11c, and 11d during the times T1 and T3. Also, the row area 3 of the image area may be obtained by turning on the light sources 11a, 11b, 11c, and 11d during the time T3 and turning off the light sources 11a, 11b, 11c, and 11d during the times T1 and T2.

As such, since a light emission timing is suppressed in accordance with an exposure time by using a rolling shutter, a portion obtained by horizontally dividing the subject may be illuminated. Since the light sources 11a, 11b, 11c, and 11d emit light only during a time for obtaining the portion obtained by horizontally dividing the subject system, power consumption may be reduced to be less than power consumption when all lines of an image are turned on.

Figure 1D:
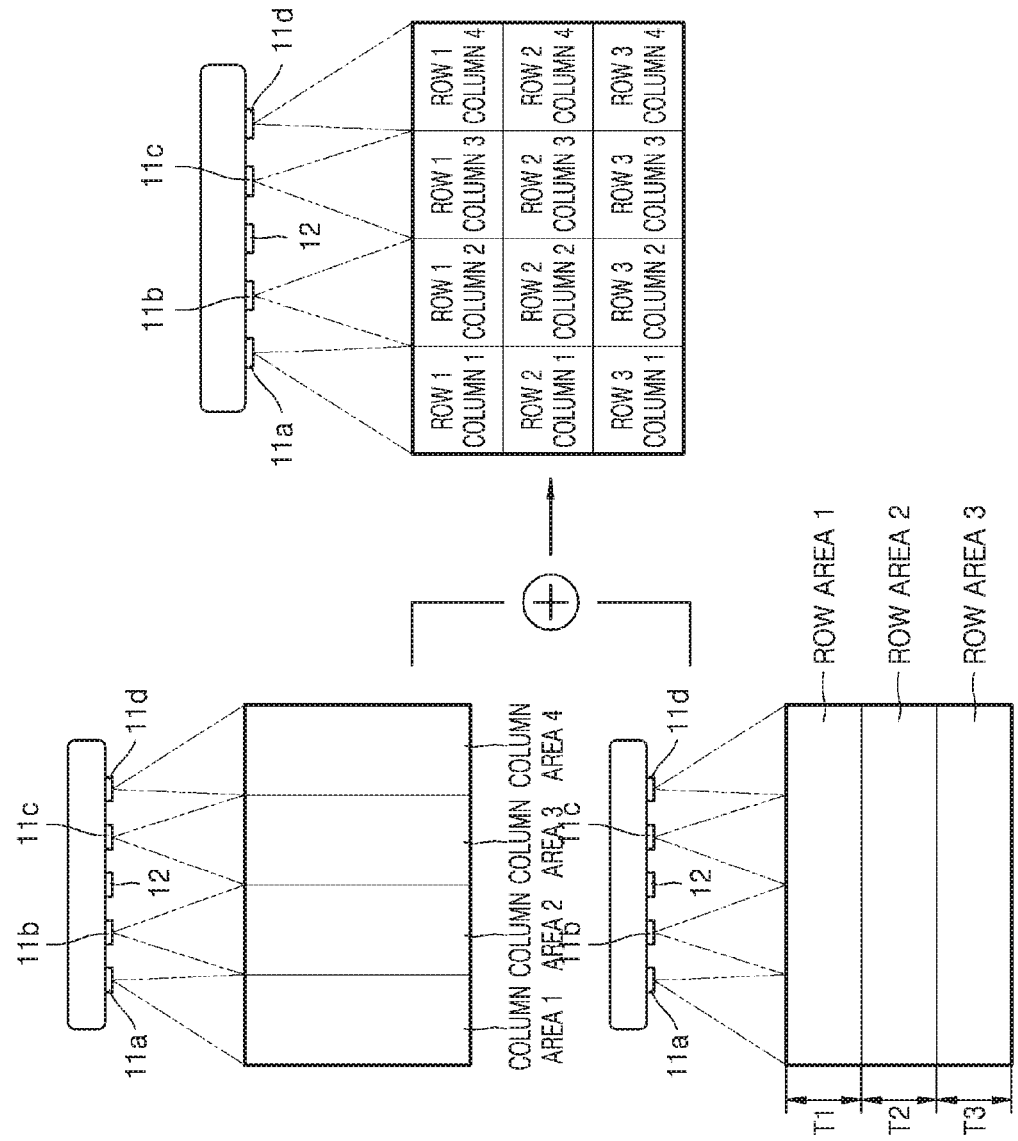
FIG. 1D is a reference diagram for explaining an example where both a row area and a column area of an image area are controlled.

FIG. 1D is a reference diagram for explaining an example where both a row area and a column area of an image area are controlled.

An imaging device may control both a row area and a column area of an image area by using both column area control of FIG. 1D and row area control of FIG. 1C.

That is, a column area of an image to be imaged may be selected by selecting at least one from among a plurality of light sources that are provided in parallel as a light-emitting light source, and a row area of the image to be imaged may be selected by selecting a light emission time of the selected light-emitting light source. For example, referring to FIG. 1D, when there are four light sources and a light emission time of each light source is divided into three times, an image area may be divided into 12 small areas including four column areas and three row areas. Accordingly, the imaging device may obtain an image of a subject corresponding to one small area from among the 12 small areas by selecting one light source from among the four light sources and selecting one time from among the three times.

Figure 1E:
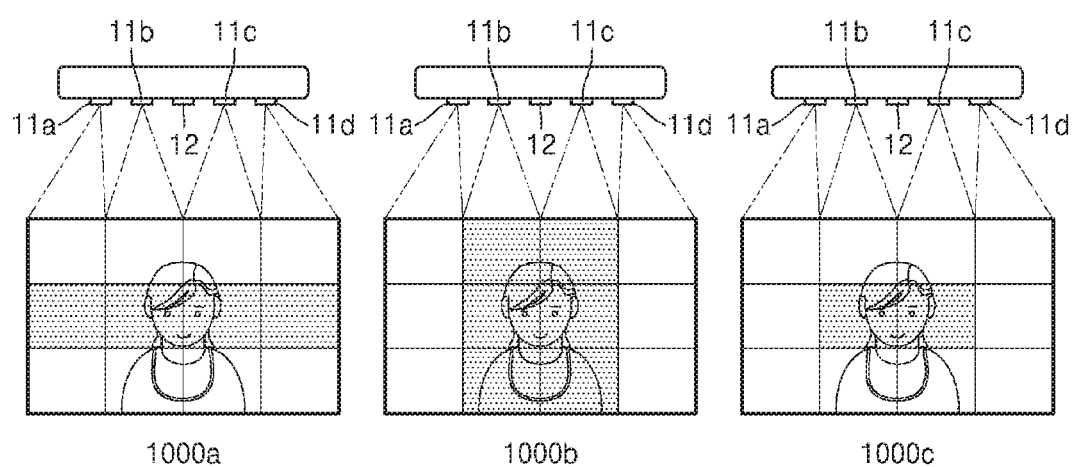
FIG. 1E is a reference diagram for explaining a detailed example where both a row area and a column area of an image area are controlled.

FIG. 1E is a reference diagram for explaining a detailed example where both a row area and a column area of an image are controlled.

Referring to 1000a of FIG. 1E, an image corresponding to a row image 2 of an image area may be obtained by selecting all four light sources as light-emitting light sources and causing the light sources to emit light during the time T2. Accordingly, for example, an image of a face portion of a standing person may be obtained.

Referring to 1000b of FIG. 1E, an image corresponding to a column area 2 and a column area 3 of an image area may be obtained by selecting the light sources 11b and 11c as light-emitting light sources and causing the light sources 11b and 11c to emit light during all the times T1, T2, and T3. Accordingly, for example, an image of the whole body of the standing person may be obtained.

Referring to 1000c of FIG. 1E, an image corresponding to (a row area 2, a column area 2) and (the row area 2, a column area 3) of an image area may be obtained by selecting the light sources 11b and 11c as light-emitting light sources and causing the light sources 11b and 11c to emit light during the time T2. Accordingly, for example, an image of a face portion of the standing person may be obtained.

As such, according to the present disclosure, a portion of a subject may be illuminated. Since a light source corresponding to the portion of the subject is selected and illumination is performed in accordance with an exposure period of a corresponding image line, an illumination time per detection processing may be reduced, thereby reducing power consumption.

FIG. 1F is a reference diagram illustrating the effect of the present disclosure.

FIG. 1F shows a result obtained after comparing power needed for illumination when a subject is vertically divided into four regions with power needed for illumination during a full period.

Power needed to illuminate a region from among the four regions obtained by vertically dividing the subject is about 25% of power needed to illuminate the entire subject system.

When timing turn-on is performed, for example, during about 10% to about 15% of an exposure period of one frame, along with subject division turn-on, needed power is about 2.5% to about 4%. Accordingly, needed power may be greatly reduced by dividing a subject by using a plurality of light sources and performing timing turn-on.

When there is a large motion, for example, when a user enters or exits and thus the whole body of the user moves, lots of power does not need to be used for illumination. Also, as will be described below in detail, a personal identification processing timing and an area needed to be illuminated may be specified by monitoring the entry/exit by using motion detection using a differential. Also, the same personal identification performance as that achieved during indoor illumination may be achieved by performing machine learning on a person image where a dark indoor is illuminated with infrared light.

The above-described concept will now be described in detail by using embodiments.

Embodiment 1

Figure 2:
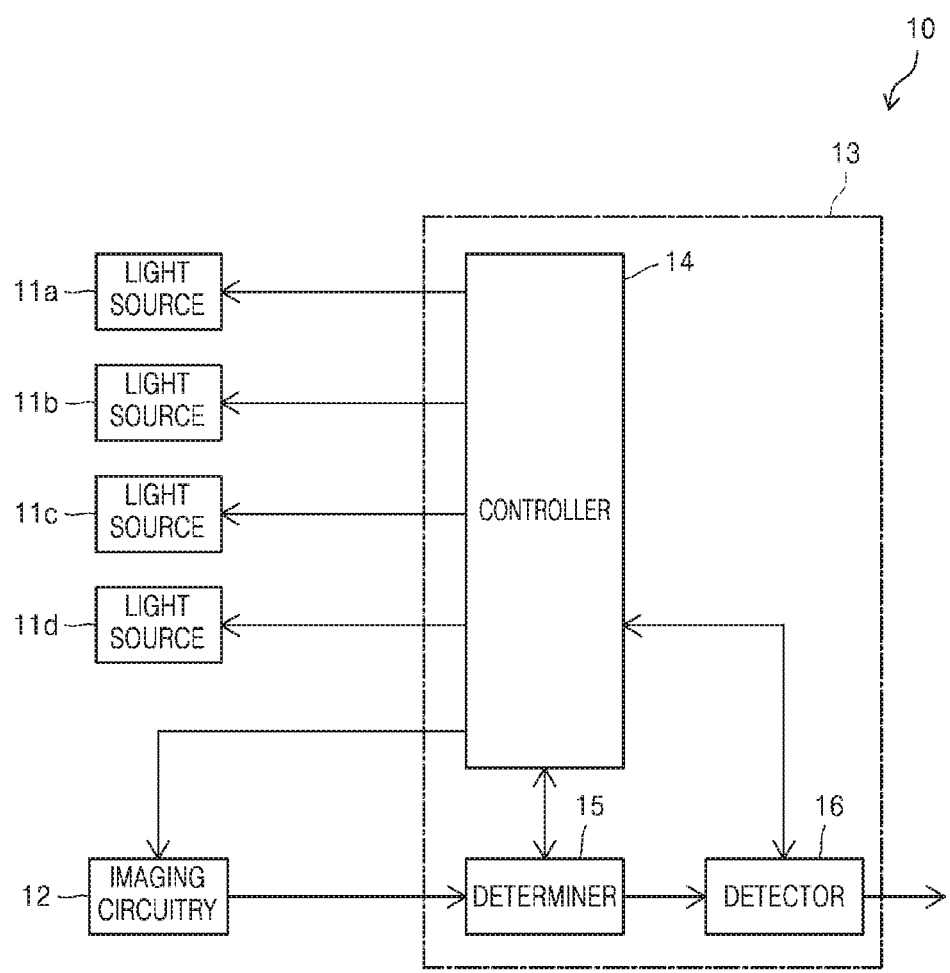
FIG. 2 is a block diagram illustrating a configuration of an imaging device according to Embodiment 1.
Figure 3A:
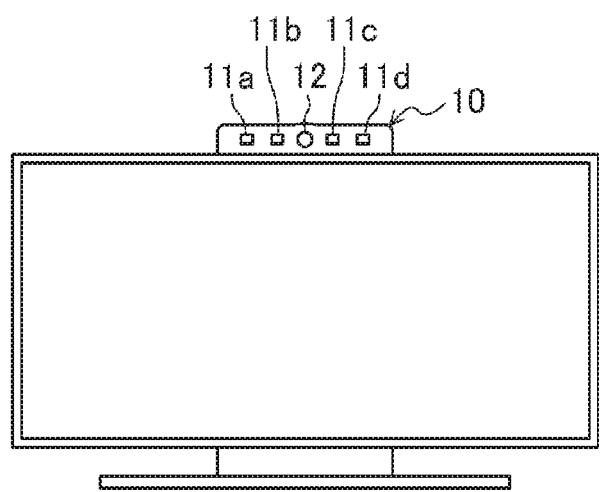
FIG. 3A is a schematic diagram illustrating an arrangement of the imaging device according to Embodiment 1.

FIG. 2 illustrates a configuration of an imaging device 10 according to Embodiment 1. The imaging device 10 is configured to image and monitor a subject system. For example, as shown in FIG. 3A, the imaging device 10 is provided in an electronic product (a flat-panel display in FIG. 3A) installed indoors. In the present embodiment, the imaging device 10 includes a plurality of (4 in the present embodiment) light sources 11a through 11d, the imaging circuitry 12, and a processing circuit 13. Also, in the following description, the light sources 11a through 11d are collectively referred to as "light sources 11".

<Light Source>

Each of the light sources 11 is configured to emit light to the subject. For example, the light source 11 may include a light-emitting diode (LED) or a laser diode. Also, light emitted from the light source 11 may be infrared light or visible light.

Also, as shown in FIG. 3A, the plurality of light sources 11a through 11d are provided around the imaging circuitry 12. The plurality of light sources 11a through 11d are configured to separately illuminate the subject. In detail, each of the plurality of light sources 11a through 11d is configured to illuminate a portion of the subject corresponding to the light source 11, and the plurality of light sources 11a through 11d are arranged so that when all of the plurality of light sources 11a through 11d emit light, the entire subject is illuminated. In the present embodiment, the plurality of light sources 11a through 11d are arranged horizontally in parallel.

<Imaging Circuitry>

The imaging circuitry 12 is configured to image the subject and obtain a captured image. For example, the imaging circuitry 12 may include a complementary metal-oxide semiconductor (CMOS) or a charged-coupled device (CCD).

<Corresponding Relationship Between Light Source and Image Area>

Figure 3B:
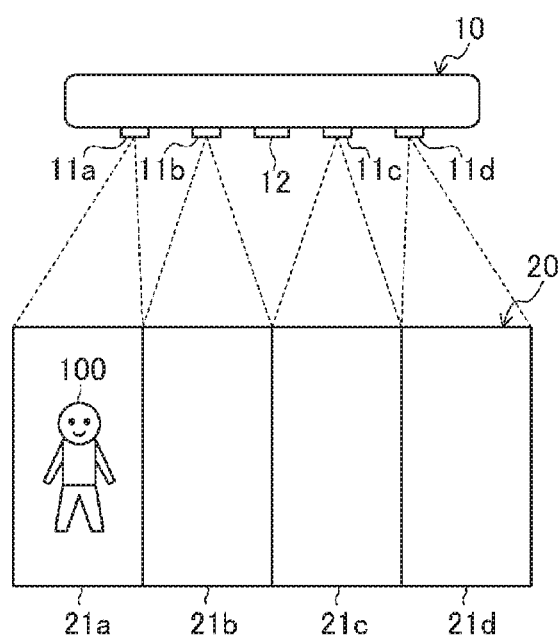
FIG. 3B is a conceptual diagram for explaining a corresponding relationship between a light source and an image area in Embodiment 1.

As shown in FIG. 3B, a captured image 20 includes a plurality of (4 in the present embodiment) image areas 21a through 21d respectively corresponding to the plurality of (4 in the present embodiment) light sources 11a through 11d. Also, in the following description, the image areas 21a through 21d are collectively referred to as "image areas 21".

Each of the image areas 21 includes a portion of the subject illuminated by each of the light sources 11 corresponding to the image area 21. In the present embodiment, the image area 21a includes a portion of the subject illuminated by the light source 11a, the image area 21b includes a portion of the subject illuminated by the light source 11b, the image area 21c includes a portion of the subject illuminated by the light source 11c, and the image area 21d includes a portion of the subject illuminated by the light source 11d. Also, in the present embodiment, the plurality of image areas 21a through 21d are arranged so that an edge portion of each of the plurality of image areas 21a through 21d does not overlap an edge portion of an adjacent image area 21.

《Processing Circuit》

The processing circuit 13 is configured to control each component of the imaging device 10 such as the light source 11 and the imaging circuitry 12. For example, the processing circuit 13 includes a central processing unit (CPU) or a memory. Also, in the present embodiment, the processing circuit 13 includes a controller 14, a determiner 15, and a detector 16.

《Controller》

The controller 14 is configured to perform light emission control to change the light source (light-emitting light source) 11 that emits light from among the plurality of light sources 11a through 11d and cause the imaging circuitry 12 to image the subject (the subject illuminated by the light-emitting light source 11). That is, in the light emission control, the controller 14 selects the light-emitting light source 11 from among the plurality of light sources 11a through 11d and causes the selected light source 11 to emit light and the imaging circuitry 12 to image the subject system.

《Determiner》

The determiner 15 is configured to determine whether a pre-determined detection target (a motion in the present embodiment) exists in the image area 21 that is a part of the captured image 20 obtained by the imaging circuitry 12 and corresponds to the light source 11 that emits light during imaging for obtaining the captured image 20. The determiner 15 may include an appropriate logic, circuit, interface, and/or code for determining whether the pre-determined detection target exists.

《Detector》

The detector 16 is configured to detect a pre-determined object (a human in the present embodiment) from the captured image 20 including the image area 21 determined by the determiner 15 to include the detection target. Also, the detector 16 is configured to output a detection result to the outside. The detector 16 may include an appropriate logic, circuit, interface, and/or code for detecting the pre-determined object from the captured image 20.

<Operation>

Next, an operation of the imaging device 10 according to Embodiment 1 will be described with reference to FIG. 4. In the present embodiment, a light emission order (an order of selecting the light-emitting light sources 11) of the light sources 11a through 11d is pre-determined, and a determination order (an order of selecting the image area 21 to be determined) of the image areas 21a through 21d is pre-determined. That is, a selection order of the light sources 11 and the image areas 21 is pre-determined. In detail, the selection order of the light sources 11 and the image areas 21 is pre-determined so that the light source 11a and the image area 21a are firstly selected, the light source 11b and the image area 21b are secondly selected, the light source 11c and the image area 21c are thirdly selected, and the light source 11d and the image area 21d are fourthly selected. Also, numbers (numbers indicating a selection number) are allocated to the light sources 11a through 11d and the image areas 21a through 21d based on the selection order of the light sources 11 and the image areas 21. In detail, "1" is allocated to the light source 11 and the image area 21a, "2" is allocated to the light source 11b and the image area 21b, "3" is allocated to the light source 11c and the image area 21c, and "4" is allocated to the light source 11d and the image area 21d. Also, in the following description, a variable K is an integer equal to or greater than 1 and equal to or less than an upper limit Kmax, and indicates a number of the light source 11 and the image area 21 to be processed. The upper limit Kmax is an integer equal to or greater than 2, and corresponds to the number (4 in the present embodiment) of the light sources 11.

《Step ST101》

First, the controller 14 sets the variable K to 1. That is, the controller 14 selects the light source 11 and the image area 21 (the light source 11a and the image area 21a in the present embodiment) that are firstly selected in a pre-determined selection order as the light source 11 and the image area 21 to be processed this time.

《Steps ST102 and ST103》

Next, the controller 14 causes the light source 11 corresponding to a $K^{th}$ image area 21 (the image area 21 to be processed this time) from among the plurality of light sources 11a through 11d to emit light and causes the imaging circuitry 12 to image the subject. For example, the controller 14 causes the imaging circuitry 12 to continuously image the subject N times so that a captured image sequence including N (N is an integer equal to or greater than 2) captured images 20 that are continuous in time series is obtained in a period where the light source 11 corresponding to the $K^{th}$ image area 21 from among the plurality of light sources 11a through 11d emits light.

《Step ST104》

Next, the determiner 15 extracts the $K^{th}$ image area 21 from each of the captured images 20 obtained in step ST103. For example, the determiner 15 extracts the $K^{th}$ image area 21 from each of the N captured images 20 constituting the captured image sequence obtained in step ST103, and obtains a partial image sequence including the extracted N image areas 21 (the $K^{th}$ image areas 21).

《Step ST105》

Next, the determiner 15 determines whether a detection target (a motion in the present embodiment) exists in the $K^{th}$ image area 21 extracted in step ST104. When it is determined that the detection target exists in the $K^{th}$ image area 21, the operation proceeds to step ST106, and otherwise, the operation proceeds to step ST107.

For example, the determiner 15 calculates N−1 partial differential images from the N image areas (the $K^{th}$ image areas) constituting the partial image sequence obtained in step ST104. Also, an $X^{th}$ (X is an integer equal to or greater than 1 and equal to or less than N−1) partial differential image corresponds to a differential image between a $K^{th}$ image area included in a captured image at an $X^{th}$ position in time series and a $K^{th}$ image area included in a captured image at an $(X+1)^{th}$ position in the time series from among the N image areas constituting the partial image sequence. Next, the determiner 15 calculates a differential average image (an image whose pixel value is an average value of N−1 pixel values) by averaging pixel values of the N−1 partial differential images for each pixel. When a percentage (a ratio to a total number of pixels included in the differential average image) of the number of pixel values exceeding a pre-determined differential threshold value from among a plurality of pixel values included in the differential average image exceeds a pre-determined percentage threshold value, the determiner 15 determines that a motion (a detection target) exists in the $K^{th}$ image area, and otherwise, the determiner 15 determines that a motion (a detection target) does not exist in the $K^{th}$ image area. Also, the differential threshold value and the percentage threshold value are respectively set as a pixel value and a percentage, for example, when it is assumed that a motion exists.

《Step ST106》

Next, the detector 16 detects an object 100 (a human in the present embodiment) from the captured image 20 including the $K^{th}$ image area 21 determined in step ST105 to include the detection target. For example, the detector 16 may be configured to perform object detection processing (human detection processing in the present embodiment) by using a detection method (a detection method based on machine learning of luminance gradient histogram features) disclosed in Non-Patent Document 1 ("Navneetdalal and Bill Triggs, "Histograms of Oriented Gradients for Human Detection, "Proc. of CVPR 2005, vol. 1, pp. 886-893, 2005").

《Steps ST107, ST108, and ST109》

Next, the controller 14 selects the light source 11 and the image area 21 to be processed next time, based on the pre-determined selection order. In detail, the controller 14 determines whether the variable K reaches the upper limit Kmax, and, adds 1 to the variable K when the variable K does not reach the upper limit Kmax and sets the variable K to 1 when the variable K reaches the upper limit Kmax. Next, the operation proceeds to step ST110.

That is, the controller 14 determines whether the light source 11 and the image area 21 to be processed this time are the light source 11 and the image area 2 (the light source 11d and the image area 21d in the present embodiment) that are lastly selected in the pre-determined selection order (step ST107). When the light source 11 and the image area 21 to be processed this time are not the light source 11 and the image area 21 that are lastly selected in the pre-determined selection order, the controller 14 selects the image area 21 to be selected next to the light source 11 and the image area 21 to be processed this time in the pre-determined selection order as the light source 11 and the image area 21 to be processed next time (step ST108). When the light source 11 and the image area 21 to be processed this time are the light source 11 and the image area 21 that are lastly selected in the pre-determined selection order, the controller 14 selects the light source 11 and the image area 21 (the light source 11a and the image area 21a in the present embodiment) that are firstly selected in the pre-determined selection order as the light source 11 and the image area 21 to be processed next time (step ST109).

《Step ST110》

Next, when processing is to end, the processing ends, and when the processing is to continue, the operation proceeds to step ST102.

<Light Emission Pattern of Light Source>

Figure 5:
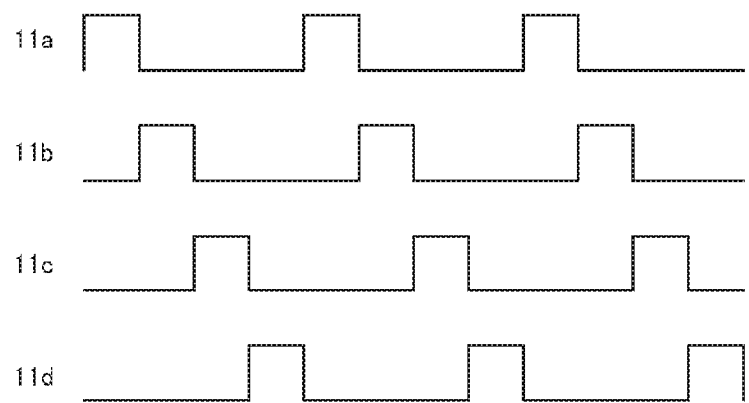
FIG. 5 is a timing chart illustrating a light emission pattern of the light source in the imaging device according to Embodiment 1.

FIG. 5 illustrates a light emission pattern of the light source 11 in Embodiment 1. As shown in FIG. 5, in Embodiment 1, light emission control (control for changing the light-emitting light source 11) is performed so that the plurality of light sources 11a through 11d sequentially emit light in a pre-determined light emission order (an order of the light sources 11a, 11b, 11c, and 11d).

Effect of Embodiment 1

As described above, since the light-emitting light source 11 is changed from among the plurality of light sources 11a through 11d, power consumption needed to illuminate a subject may be reduced to be less than that when all of the plurality of light sources 11a through 11d continuously emit light (i.e., when the entire subject is continuously illuminated).

Also, the image area 21 that is a part of the captured image 20 and corresponds to the light source 11 that emits light during imaging for obtaining the captured image 20 corresponds to a portion (a part) of the subject illuminated by the light source 11. Accordingly, since it is determined whether a detection target (a motion in the present embodiment) exists in the image area 21 (the image area 21 corresponding to the portion of the subject illuminated by the light source 11) of the captured image 20, whether the detection target exists may be accurately determined.

Also, since the subject is continuously imaged while changing the light-emitting light source 11 from among the plurality of light sources 11a through 11d, the image area 21 (a portion of the subject to be determined) of the captured image to be determined by the determiner 15 may be changed. Accordingly, the subject may be continuously monitored (whether the detection target exists may be continuously determined).

Also, since object detection processing (human detection processing in the present embodiment) is performed on the captured image 20 including the image area 21 determined by the determiner 15 to include the detection target (the motion in the present embodiment), object detection may be effectively performed.

Also, in light emission control of the controller 14, although one light source is selected from among the plurality of light sources 11a through 11d to emit light, the controller 14 may be configured to select two or more light sources 11 (not all the light sources 11) from among the plurality of light sources 11a through 11d and cause the selected light sources 11 to simultaneously emit light, in the light emission control.

Embodiment 2

An operation of the imaging device 10 according to Embodiment 2 is different from an operation of the imaging device 10 according to Embodiment 1. In Embodiment 2, when the image area 21 determined by the determiner 15 to include a detection target does not exist, the controller 14 performs light emission control (control for changing the light-emitting light source 11) so that the plurality of light sources 11a through 11d emit light in a pre-determined light emission order; and when the image area 21 determined by the determiner 15 to include the detection target exists, the controller 14 performs the light emission control so that a light emission frequency of the light source 11 corresponding to the image area 21 determined by the determiner 15 to include the detection target from among the plurality of light sources 11a through 11d is increased.

In detail, in Embodiment 2, when the image area 21 determined by the determiner 15 to include the detection target exists, the controller 14 performs the light emission control so that a first light-emitting operation in which the light source 11 corresponding to the image area 21 determined by the determiner 15 to include the detection target emits light and a second light-emitting operation in which one light source 11 from among the light sources 11 corresponding to the image areas 21 not determined by the determiner 15 to include the detection target emits light based on the pre-determined light emission order are alternately performed. Also, other elements of Embodiment 2 are the same as those of Embodiment 1.

<Operation>

Figure 6:
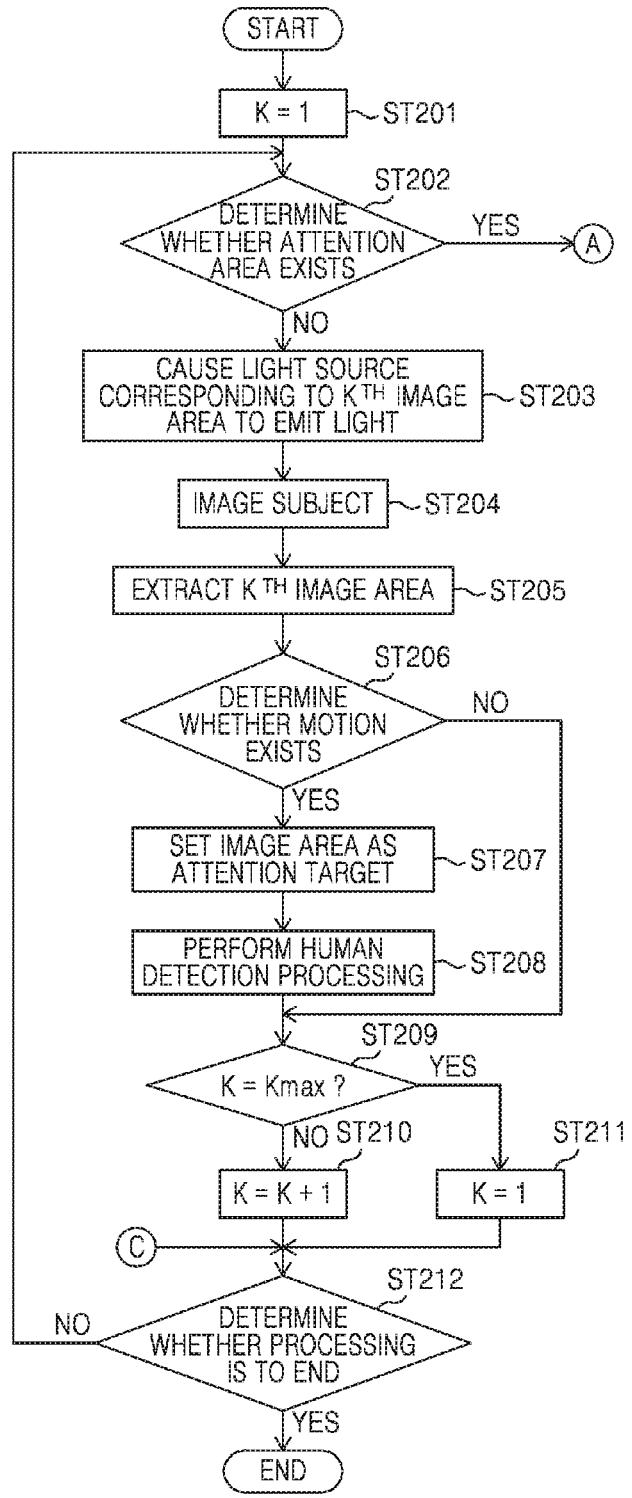
FIG. 6 is a flowchart for explaining an operation of the imaging device according to Embodiment 2.
Figure 7:
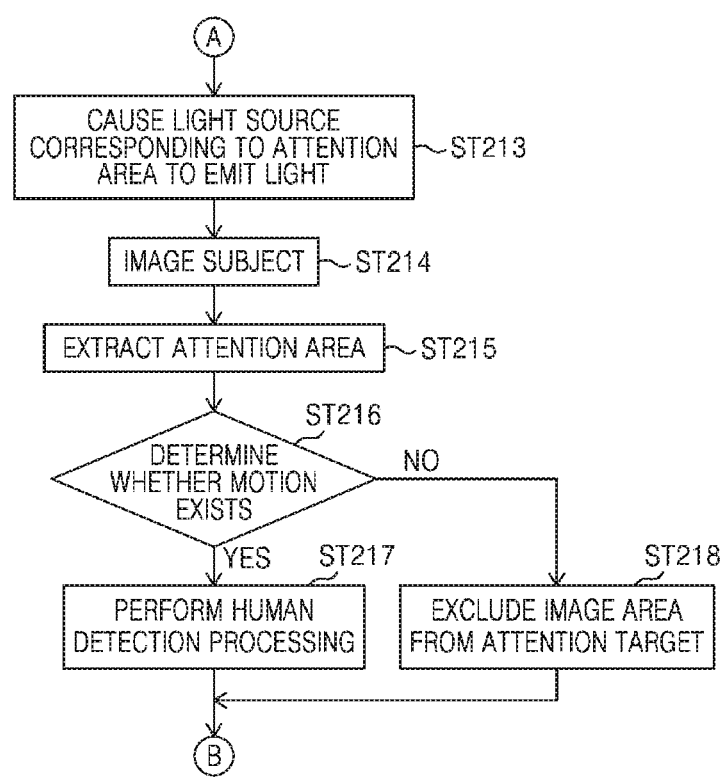
FIG. 7 is a flowchart for explaining an operation of the imaging device according to Embodiment 2.
Figure 8:
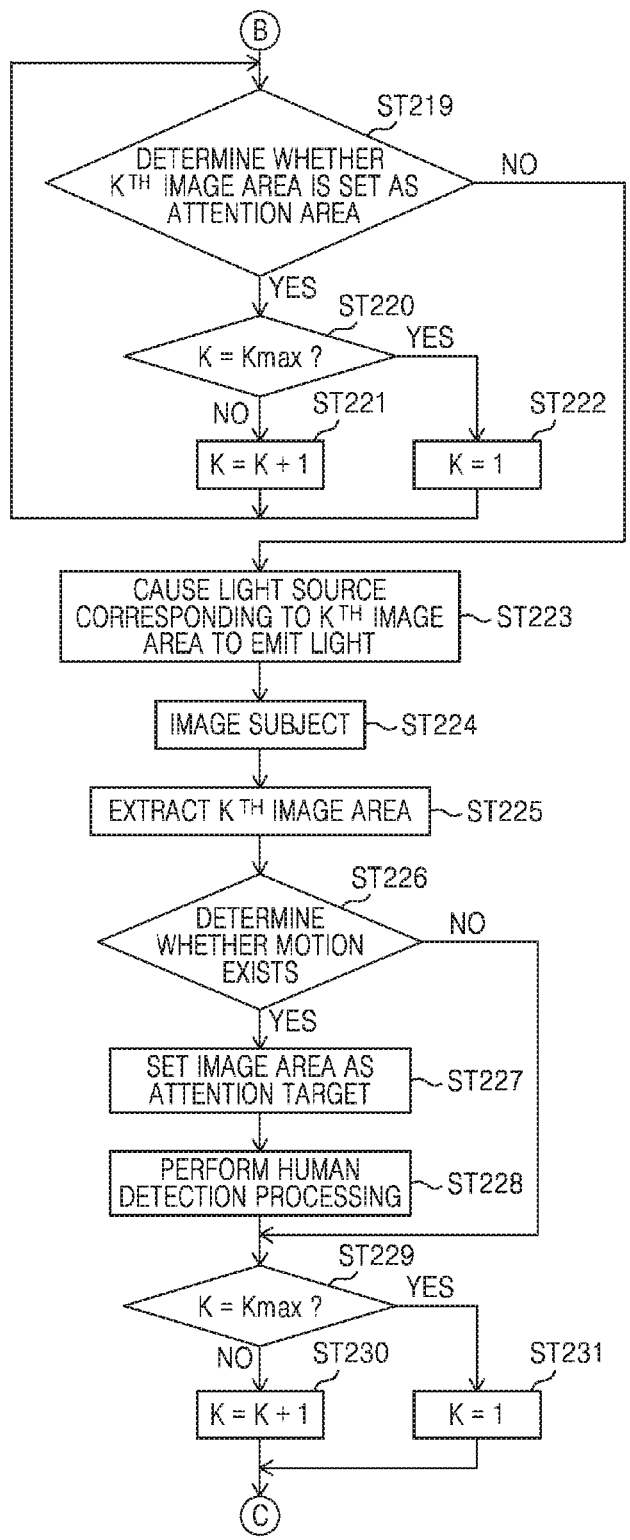
FIG. 8 is a flowchart for explaining an operation of the imaging device according to Embodiment 2.

Next, an operation of the imaging device 10 according to Embodiment 2 will be described with reference to FIGS. 6, 7, and 8. In the present embodiment, like in Embodiment 1, a light emission order (an order of selecting the light-emitting light source 11) of the light sources 11a through 11d is pre-determined, and a determination order (an order of selecting the image area 21 to be determined) of the image areas 21a through 21d is pre-determined. In detail, a selection order of the light sources 11 and the image areas 21 is pre-determined so that the light source 11a and the image area 21a are firstly selected, the light source 11b and the image area 21b are secondly selected, the light source 11c and the image area 21c are thirdly selected, and the light source 11d and the image area 21d are fourthly selected. Also, numbers (numbers indicating the selection order) are allocated to the light sources 11a through 11d and the image areas 21a through 21d based on the selection order of the light sources 11 and the image areas 21.

《Step ST201》

First, like in step ST101, the controller 14 sets the variable K to 1.

《Step ST202》

Next, the controller 14 determines whether an attention area exists. The attention area corresponds to the image area 21 determined by the determiner 15 to include a detection target (a motion in the present embodiment). When it is determined that the attention area does not exist, the operation proceeds to step ST203. When the attention area exists, the operation proceeds to operation ST213.

《Steps ST203 through ST206》

Next, like in steps ST102 and ST103, the controller 14 causes the light source 11 corresponding to a $K^{th}$ image area 21 (the image area 21 to be processed this time) from among the plurality of light sources 11a through 11d to emit light and causes the imaging circuitry 12 to image a subject system. Next, like in steps ST104 and ST105, the determiner 15 extracts the $K^{th}$ image area 21 from the captured image 20 obtained in step ST204, and determines whether the detection target (the motion in the present embodiment) exists in the $K^{th}$ image area 21. When it is determined that the detection target exists in the $K^{th}$ image area 21, the operation proceeds to step ST207, and otherwise, the operation proceeds to step ST209.

《Step ST207》

Next, the controller 14 sets the $K^{th}$ image area 21 determined in step ST206 to include the detection target as an attention target (i.e., an attention area). Next, the operation proceeds to step ST208.

《Step ST208》

Next, like in step ST106, the detector 16 detects the object 100 (a human in the present embodiment) from the captured image 20 including the $K^{th}$ image area 21 determined in step ST206 to include the detection target.

《Steps ST209, ST210, and ST211》

Next, like in steps ST107, ST108, and ST109, the controller 14 selects the light source 11 and the image area 21 to be processed next time, based on the pre-determined selection order. In detail, the controller 14 determines whether the variable K reaches the upper limit KMAX, and adds 1 to the variable K when the variable K does not reach the upper limit Kmax and sets the variable K to 1 when the variable K reaches the upper limit Kmax. Next, the operation proceeds to step ST212.

《Step ST212》

Next, when processing is to end, the processing ends, and when the processing is to continue, the operation proceeds to step ST202.

《Steps ST213 and ST214》

When it is determined in step ST202 that the attention area exists, the controller 14 causes a light source corresponding to the image area 21 that is the attention area from among the plurality of light sources 11a through 11d to emit light, and causes the imaging circuitry 12 to image the subject system. In detail, like in step ST103, the controller 14 causes the imaging circuitry 12 to continuously image the subject N times so that a captured image sequence including N captured images 20 that are continuous in time series is obtained in a period where the light source 11 corresponding to the image area 21 that is the attention area from among the plurality of light sources 11a through 11d emits light.

《Step ST215》

Next, the determiner 15 extracts the image area 21 that is the attention area from the captured image 20 obtained in step ST214. In detail, like in step ST104, the determiner 15 extracts the image area 21 that is the attention area from each of the N captured images 20 constituting the captured image sequence obtained in step ST214, and obtains a partial image sequence including the extracted N image areas 21 (the image areas 21 that are the attention areas).

《Step ST216》

Next, the determiner 15 determines whether the detection target (the motion in the present embodiment) exists in the image area 21 that is the attention area extracted in step ST215. Also, a method of determining whether the detection target exists may be the same as a determination method of step ST105. When it is determined that the detection target exists in the image area 21 that is the attention area, the operation proceeds to step ST217, and otherwise, the operation proceeds to step ST218.

《Step ST217》

Next, the detector 16 detects the object 100 (a human in the present embodiment) from the captured image 20 including the image area 21 that is the attention area determined in step ST216 to include the detection target. Also, a method of detecting the object 100 may be the same as a detection method of step ST106. Next, the operation proceeds to step ST219.

《Step ST218》

When it is determined in step ST216 that the detection target does not exist, the controller 14 excludes the image area 21 that is the attention area determined not to include the detection target from the attention target (i.e., the attention area). Next, the operation proceeds to step ST219.

《Step ST219》

Next, the controller 14 determines whether the $K^{th}$ image area 21 is set as the attention area. When the $K^{th}$ image area 21 is set as the attention area, the operation proceeds to step ST220, and otherwise, the operation proceeds to step ST223.

《Steps ST220, ST221, and ST222》

When it is determined in step ST219 that the $K^{th}$ image area 21 is set as the attention area, the controller 14 selects the light source 11 and the image area 21 to be processed next time, based on the pre-determined selection order. In detail, the controller 14 determines whether the variable K reaches the upper limit Kmax, and adds 1 to the variable K when the variable K does not reach the upper limit Kmax and sets the variable k to 1 when the variable K reaches the upper limit Kmax. Next, the operation proceeds to step ST219.

《Steps ST223 through ST226》

When it is determined in step ST219 that the $K^{th}$ image area 21 is not set as the attention area, like in steps ST203 and ST204, the controller 14 causes the light source 11 corresponding to the $K^{th}$ image area 21 from among the plurality of light sources 11a through 11d to emit light and causes the imaging circuitry 12 to image the subject system. Next, like in steps ST205 and ST206, the determiner 15 extracts the $K^{th}$ image area 21 from the captured image 20 obtained in step ST224, and determines whether the detection target (the motion in the present embodiment) exists in the $K^{th}$ image area 21. When it is determined that the detection target exists in the $K^{th}$ image area 21, the operation proceeds to step ST227, and otherwise, the operation proceeds to step ST229.

《Step ST227》

Next, like in step ST207, the controller 14 sets the $K^{th}$ image area 21 determined in step ST226 to include the detection target as the attention target (i.e., the attention area). Next, the operation proceeds to step ST228.

《Step ST228》

Next, like in step ST208, the detector 16 detects the object 100 (a human in the present embodiment) from the captured image 20 including the $K^{th}$ image area 21 determined in step ST226 to include the detection object.

《Steps ST229, ST230, and ST231》

Next, like in steps ST209, ST210, and ST211, the controller 14 selects the light source 11 and the image area 21 to be processed next time, based on the pre-determined selection order. In detail, the controller 14 determines whether the variable K reaches the upper limit Kmax, and adds 1 to the variable K when the variable K does not reach the upper limit Kmax and sets the variable K to 1 when the variable K reaches the upper limit Kmax. Next, the operation proceeds to step ST212.

<Light Emission Pattern of Light Source>

Figure 9:
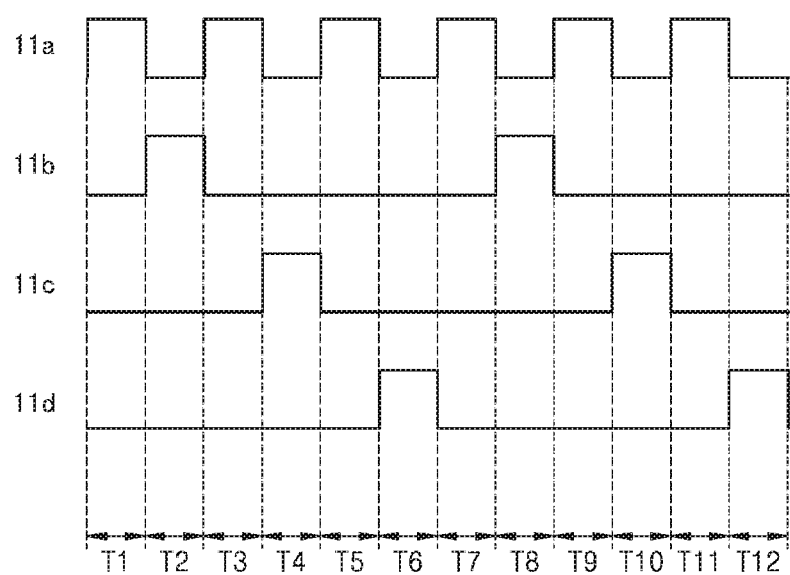
FIG. 9 is a timing chart illustrating a light emission pattern of the light source in the imaging device according to Embodiment 2.

FIG. 9 illustrates a light emission pattern of the light source 11 when an attention area exists in Embodiment 2. In FIG. 9, the light source 11a corresponds to the image area 21 that is an attention area, and three light sources 11b, 11c, and 11d respectively correspond to three image areas 21 that are not the attention area. As shown in FIG. 9, in Embodiment 2, when the attention area exists, light emission control is performed so that a first light-emitting operation in which the light source 11 (the light source 11a in FIG. 9) corresponding to the attention area emits light and a second light-emitting operation in which one light source 11 from among the light sources 11 (the light sources 11b, 11c, and 11d in FIG. 9) corresponding to the image areas 21 other than the attention area emits light based on a pre-determined light emission order are alternately performed. Referring to FIG. 9, the light source 11a corresponding to the attention area emits light in a cycle of one time interval per two time intervals by emitting light during time intervals T1, T3, T5, T7, T9, and T11, and the light sources 11b, 11c, and 11d not corresponding to the attention area emit light each in a cycle of one time interval per six time intervals by sequentially emit light during time intervals T2, T4, T6, T8, and T10. That is, in Embodiment 2, when the attention area exists, the light emission control is performed so that a light emission frequency of the light source 11 corresponding to the attention area from among the plurality of light sources 11a through 11d is increased.

Also, a light emission pattern of the light source 11 when the attention area does not exist in Embodiment 2 is the same as a light emission pattern of FIG. 5. As shown in FIG. 5, in Embodiment 2, when the attention area does not exist, the light emission control is performed so that the plurality of light sources 11a through 11d sequentially emit light in a pre-determined light emission order (an order of the light sources 11a, 11b, 11c, and 11d in the present embodiment).

Effect of Embodiment 2

As described above, when an attention area (the image area 21 determined by the determiner 15 to include a detection target) exists, since light emission control for changing the light-emitting light source 11 from among the plurality of light sources 11a through 11d is performed so that a light emission frequency of the light source 11 corresponding to the attention area from among the plurality of light sources 11a through 11d is increased and the imaging circuitry 12 is controlled to image a subject, determining whether the detection target exists may be mainly performed on the attention area (the image area 21 determined to include the detection target). Accordingly, since a portion of the subject expected to include the detection target may be mainly monitored, the subject may be effectively monitored (whether the detection target exists may be effectively determined).

Modification 1 of Embodiment 2

Also, in the imaging device 10 according to Embodiment 2, the plurality of image areas 21 may be set as attention targets (i.e., attention areas). The controller 14 may be configured to perform light emission control so that the plurality of light sources 11 respectively corresponding to the plurality of attention areas (the plurality of image areas 21 determined by the determiner 15 to include a detection target) simultaneously emit light in a first light-emitting operation.

<Operation>

Figure 10:
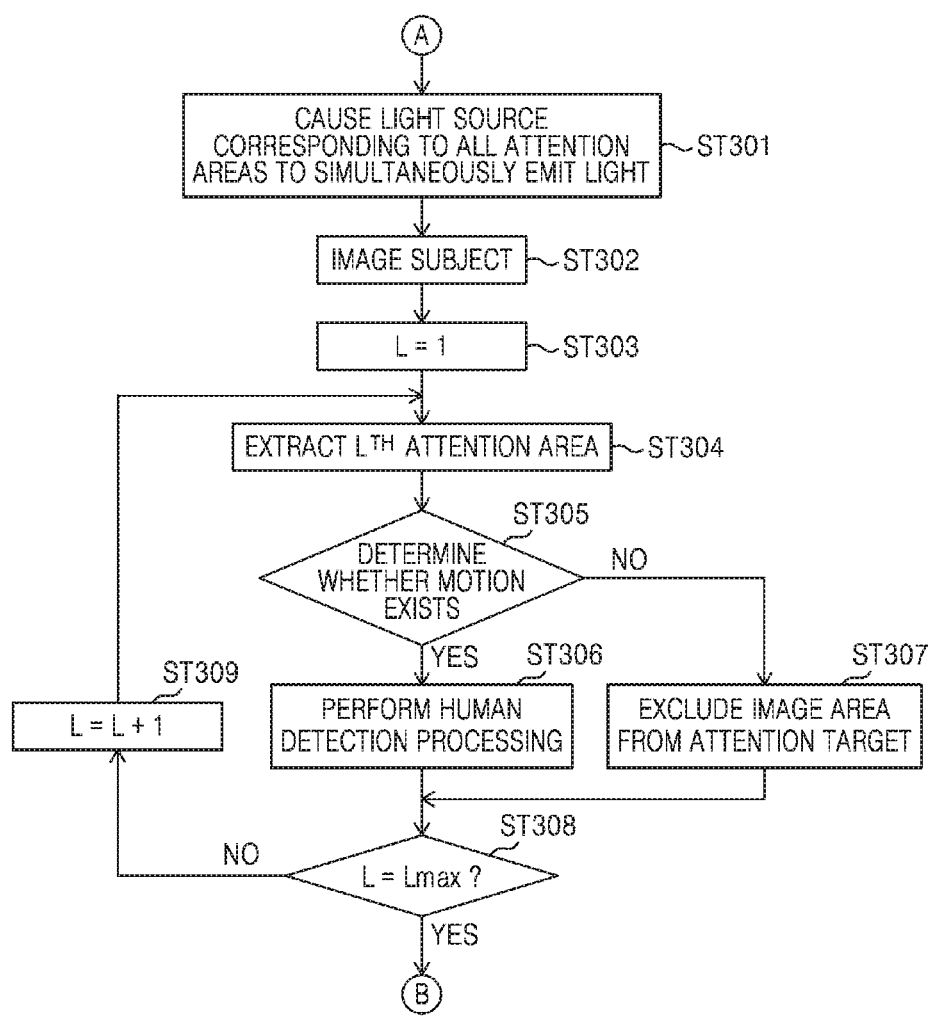
FIG. 10 is a flowchart for explaining an operation of the imaging device according to Modification 1 of Embodiment 2.

Next, an operation of the imaging device 10 according to Modification 1 of Embodiment 2 will be described with reference to FIG. 10. In the imaging device 10 according to Modification 1 of Embodiment 2, an operation of FIG. 10, instead of an operation of FIG. 7, is performed. Also, in the present embodiment, a determination order of attention areas (an order of selecting an attention area to be determined) is pre-determined. Numbers (numbers indicating a selection order) are allocated to a plurality of attention areas based on a selection order of the attention areas. Also, in the following description, a variable L is an integer equal to or greater than 1 and equal to or less than an upper limit Lmax, and indicates a number of an attention area to be processed.

The upper limit Lmax is an integer equal to or greater than 2 and equal to or less than the upper limit Kmax, and corresponds to the number of attention areas.

《Steps ST301 and ST302》

When it is determined in step ST202 that attention areas exist, the controller 14 causes all of the light sources 11 corresponding to all of the attention areas from among the plurality of light sources 11a through 11d to simultaneously emit light and causes the imaging circuitry 12 to image a subject. In detail, the controller 14 causes the imaging circuitry 12 to continuously image the subject N times so that a captured image sequence including N captured images 20 that are continuous in time series is obtained in a period where all of the light sources 11 corresponding to all of the attention areas from among the plurality of light sources 11a through 11d simultaneously emit light.

《Step ST303》

Next, the controller 14 sets the variable L to 1. That is, the controller 14 selects an attention area that is firstly selected in a pre-determined selection order (a determination order of attention areas) as an attention area to be processed this time.

《Step ST304》

Next, the determiner 15 extracts the image area 21 that is an $L^{th}$ attention area from the captured image 20 obtained in step ST302. In detail, the determiner 15 extracts the image area 21 that is the $L^{th}$ attention area from each of the N captured images 20 constituting the captured image sequence obtained in step ST302, and obtains a partial image sequence including the extracted N image areas (the image areas 21 that are the $L^{th}$ attention areas).

《Step ST305》

Next, the determiner 15 determines whether a detection target (a motion in the present embodiment) exists in the image area 21 that is the $L^{th}$ attention area extracted in step ST304. Also, a method of determining whether the detection target exists may be the same as a determination method of step ST216. When it is determined that the detection target exists in the image area 21 that is the $L^{th}$ attention area, the operation proceeds to step ST306, and otherwise, the operation proceeds to step ST307.

《Step ST306》

Next, the detector 16 detects the object 100 (a human in the present embodiment) from the captured image 20 including the image area 21 that is the attention area determined in step ST305 to include the detection target. Also, a method of detecting the object 100 may be the same as a detection method of step ST217. Next, the operation proceeds to step ST308.

《Step ST307》

When it is determined in step ST305 that the detection target does not exist, the controller 14 excludes the image area 21 that is the attention area determined not to include the detection target from an attention target (i.e., the attention area). Next, the operation proceeds to step ST308.

《Step ST308》

Next, the controller 14 determines whether the variable L reaches the upper limit Lmax. That is, the controller 14 determines whether an attention area not selected as an object to be processed from among the plurality of attention areas remains. When the variable L does not reach the upper limit Lmax, the operation proceeds to step ST309, and when the variable L reaches the upper limit Lmax, the operation proceeds to step ST219.

《Step ST309》

When it is determined in step ST308 that the variable L does not reach the upper limit Lmax, the controller 14 adds 1 to the variable L. That is, the controller 14 selects an attention area selected next to the attention area to be processed this time in the pre-determined selection order (the determination order of the attention areas) as an attention area to be processed next time. Next, the operation proceeds to step ST304.

<Light Emission Pattern of Light Source>

Figure 11:
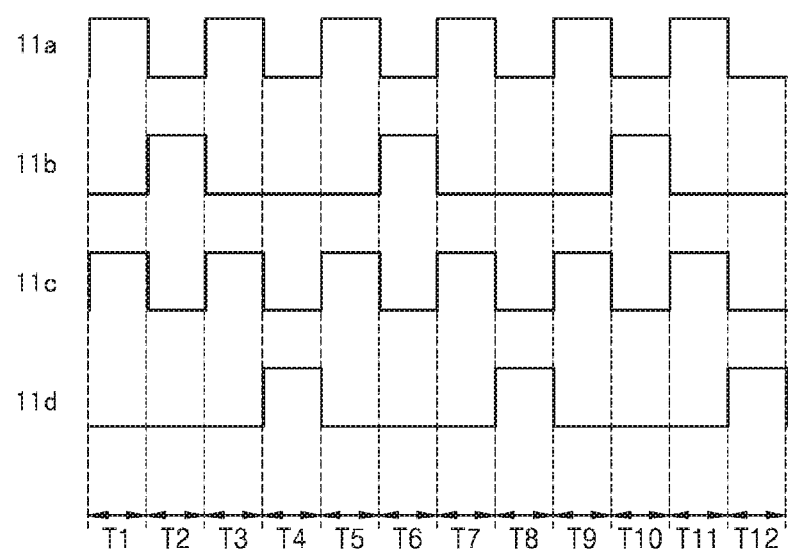
FIG. 11 is a timing chart illustrating a light emission pattern of the light source in the imaging device according to Modification 1 of Embodiment 2.

FIG. 11 illustrates a light emission pattern of the light source 11 when a plurality of attention areas exist in Modification 1 of Embodiment 2. In FIG. 11, two light sources (11a and 11c) respectively correspond to two image areas 21 that are attention areas, and two light sources (11b and 11d) respectively correspond to two image areas 21 that are not attention areas. As shown in FIG. 11, in Modification 1 of Embodiment 2, when a plurality of attention areas exist, light emission control is performed so that a first light-emitting operation in which the plurality of light sources 11 (the light sources 11a and 11c in FIG. 11) respectively corresponding to the plurality of attention areas simultaneously emit light and a second light-emitting operation in which one light source 11 from among the light sources 11 (the light sources 11b and 11d in FIG. 11) corresponding to the image areas 21 other than the attention areas emits light based on a pre-determined light emission order are alternately performed. Referring to FIG. 11, the light sources 11a and 11c corresponding to the attention areas emit light in a cycle of one time interval per two time intervals by simultaneously emitting light during the time intervals T1, T3, T5, T7, T9, and T11, and the light sources 11b and 11d not corresponding to the attention areas emit light each in a cycle of one time interval per four time intervals by sequentially emitting light during the time intervals T2, T4, T6, T8, and T10.

Effect of Modification 1 of Embodiment 2

As described above, since a plurality of light sources 11 respectively corresponding to a plurality of attention areas (a plurality of image areas 21 determined by the determiner 15 to include a detection target) simultaneously emit light in a first light-emitting operation, a time needed for the first light-emitting operation may be reduced to be less than that when the plurality of light sources 11 emit light at different timings in the first light-emitting operation. Accordingly, an imaging time may be reduced.

Modification 2 of Embodiment 2

Alternatively, in the imaging device 10 according to Embodiment 2, the controller 14 may be configured to perform light emission control so that a plurality of light sources 11 respectively corresponding to a plurality of attention areas (a plurality of image areas 21 determined by the determiner 15 to include a detection target) sequentially emit light in a first light-emitting operation.

<Operation>

Figure 12:
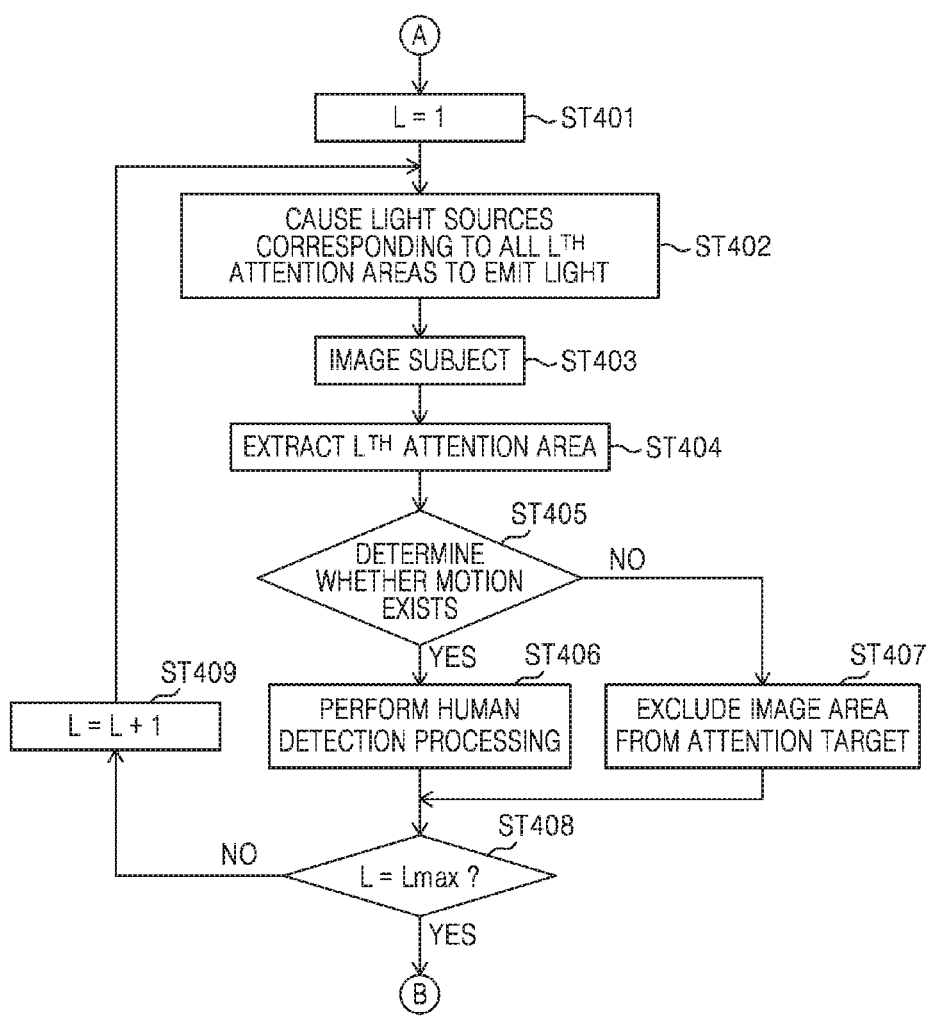
FIG. 12 is a flowchart for explaining an operation of the imaging device according to Modification 2 of Embodiment 2.

Next, an operation of the imaging device 100 according to Modification 2 of Embodiment 2 will be described with reference to FIG. 12. In the imaging device 10 according to Modification 2 of Embodiment 2, an operation of FIG. 12, instead of an operation of FIG. 7, is performed. Also, in the present embodiment, a determination order of attention areas (an order of selecting an attention area to be determined) is pre-determined. Numbers (numbers indicating a selection order) are allocated to a plurality of attention areas based on the selection order of the attention areas. Also, in the following description, the variable L is an integer equal to or greater than 1 and equal to or less than the upper limit Lmax, and indicates a number of an attention area to be processed. The upper limit Lmax is an integer equal to or greater than 2 and equal to or less than the upper limit Kmax, and corresponds to the number of attention areas.

《Step ST401》

When it is determined in step ST202 that attention areas exist, the controller 14 sets the variable L to 1. That is, the controller 14 selects an attention area that is firstly selected in a pre-determined selection order (a determination order of attention areas) as an attention area to be processed this time.

《Steps ST402 and ST403》

Next, the controller 14 causes the light source 11 corresponding to an $L^{th}$ attention area from among the plurality of light sources 11a through 11d to emit light and causes the imaging circuitry 12 to image a subject. In detail, the controller 14 causes the imaging circuitry 12 to continuously image the subject N times so that a captured image sequence including N captured images 20 that are continuous in time series is obtained in a period where the light source 11 corresponding to the $L^{th}$ attention area from among the plurality of light sources 11a through 11d emits light.

《Step ST404》

Next, the controller 14 extracts the image area 21 that is the $L^{th}$ attention area from the captured image 20 obtained in step ST403. In detail, the determiner 15 extracts the image area 21 that is the $L^{th}$ attention area from each of the N captured images 20 constituting the captured image sequence obtained in step ST403, and obtains a partial image sequence including the extracted N image areas 21 (the image areas 21 that are the $L^{th}$ attention areas).

《Step ST405》

Next, the determiner 15 determines whether a detection target (motion in the present embodiment) exists in the image area 21 that is the $L^{th}$ attention area extracted in step ST404. Also, a method of determining whether the detection target exists may be the same as a determination method of step ST216. When it is determined that the detection target exists in the image area 21 that is the $L^{th}$ attention area, the operation proceeds to step ST406, and otherwise, the operation proceeds to step ST407.

《Step ST406》

Next, the detector 16 detects the object 100 (a human in the present embodiment) from the captured image 20 including the image area 21 that is the attention area determined in step ST405 to include the detection target. Also, a method of detecting the object 100 may be the same as a detection method of step ST217. Next, the operation proceeds to step ST408.

《Step ST407》

When it is determined in step ST405 that the detection target does not exist, the controller 14 excludes the image area 21 that is the attention area determined not to include the detection target from an attention target (i.e., the attention area). The operation proceeds to step ST408.

《Step ST408》

Next, the controller 14 determines whether the variable L reaches the upper limit Lmax. That is, the controller 14 determines whether an attention area not selected as an object to be processed from among the plurality of attention areas remains. When the variable L does not reach the upper limit Lmax, the operation proceeds to step ST409, and when the variable L reaches the upper limit Lmax, the operation proceeds to step ST219.

《Step ST409》

When it is determined in step ST408 that the variable L does not reach the upper limit Lmax, the controller 14 adds 1 to the variable L. That is, the controller 14 selects an attention area selected next to the attention area to be processed this time in the pre-determined selection order (the determination order of the attention areas) as an attention area to be processed next time. Next, the operation proceeds to step ST402.

<Light Emission Pattern of Light Source>

Figure 13:
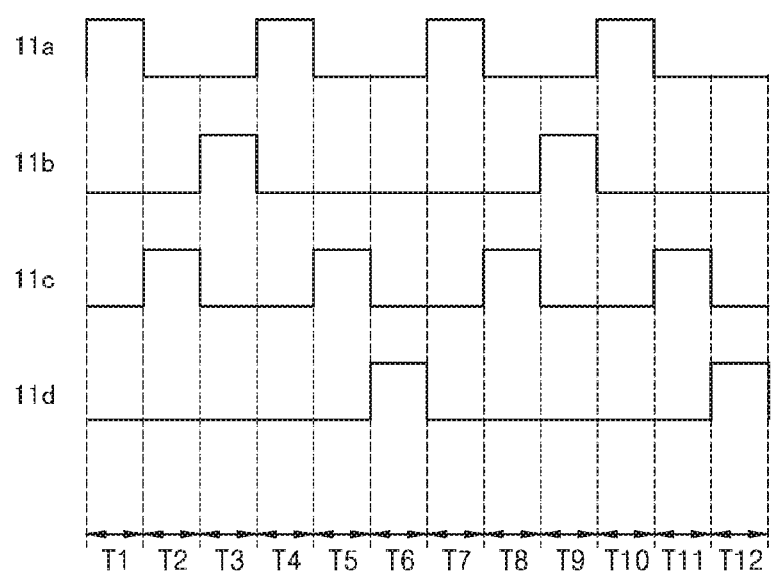
FIG. 13 is a timing chart illustrating a light emission pattern of the light source in the imaging device according to Modification 2 of Embodiment 2.

FIG. 13 illustrates a light emission pattern of the light source 11 when a plurality of attention areas exist in Modification 2 of Embodiment 2. In FIG. 13, two light sources (11a and 11c) respectively correspond to two image areas 21 that are attention areas, and two light sources (11b and 11d) respectively correspond to two image areas 21 that are not attention areas. As shown in FIG. 13, in Modification 2 of Embodiment 2, when a plurality of attention areas exist, light emission control is performed so that a first light-emitting operation in which the plurality of light sources 11 (the light sources 11a and 11c in FIG. 13) respectively corresponding to the plurality of attention areas sequentially emit light and a second light-emitting operation in which one light source 11 from among the light sources 11 (the light sources 11b and 11d in FIG. 13) corresponding to the image areas 21 other than the attention areas emits light based on a pre-determined light emission order are alternately performed. Referring to FIG. 13, the light sources 11a and 11c corresponding to the attention areas emit light each in a cycle of one time interval per three time intervals by sequentially emitting light during the time intervals T1, T2, T4, T5, T7, T8, T10, and T11, and the light sources 11b and 11d not corresponding to the attention areas emit light each in a cycle of one time interval per six time intervals by sequentially emitting light during the time intervals T3, T6, T9, and T12.

Effect of Modification 2 of Embodiment 2

As described above, since a plurality of light sources 11 respectively corresponding to a plurality of attention areas (a plurality of image areas 21 determined by the determiner 15 to include a detection target) sequentially emit light in a first light-emitting operation, pieces of light simultaneously emitted from two light sources 11 corresponding to two adjacent image areas 21 may be prevented from overlapping on a subject. Accordingly, a change in an illuminance of the subject caused by overlapping of pieces of light may be avoided, and the subject may be accurately monitored (whether the detection target exists may be accurately determined).

Embodiment 3

An operation of the imaging device 10 according to Embodiment 3 is different from an operation of the imaging device 10 according to Embodiment 1. In Embodiment 3, the detector 16 is configured to, when a portion of an attention area (the image area 21 determined by the determiner 15 to include a detection target) determined by the determiner 15 to include the detection target is an edge portion of the attention area, detect the object 100 from a candidate area 30 including the attention area and an adjacent area (the image area 21 adjacent to the edge portion of the attention area). Also, other elements of Embodiment 3 are the same as those of Embodiment 1.

<Operation>

Figure 14:
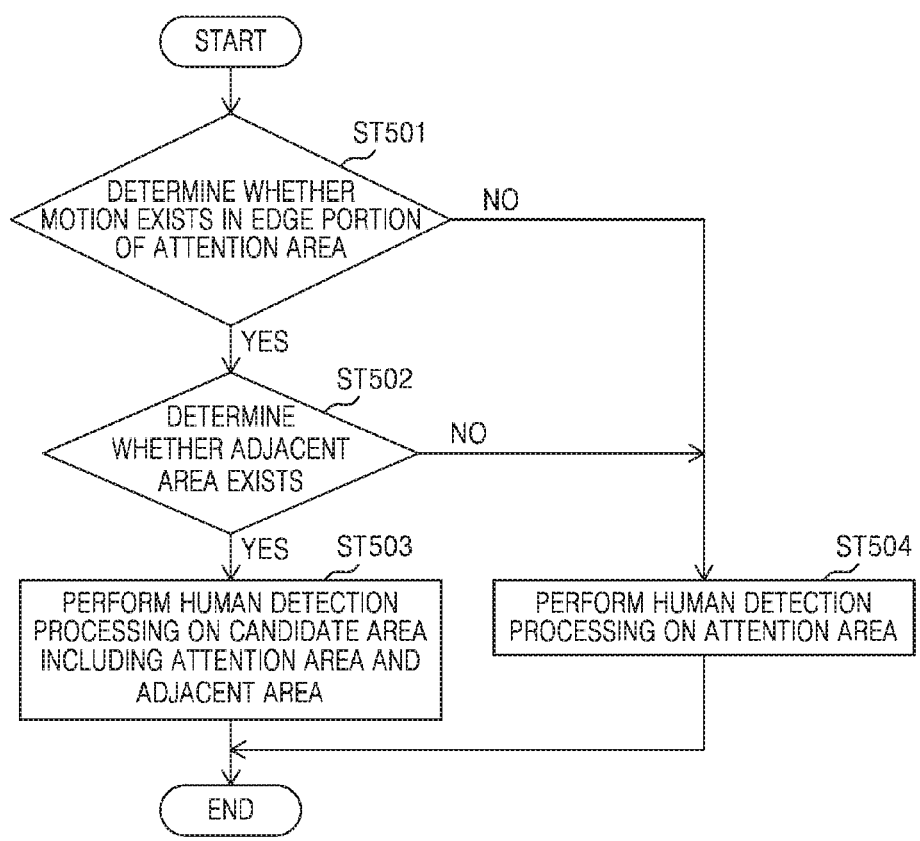
FIG. 14 is a flowchart for explaining an operation of the imaging device according to Embodiment 3.

Next, an operation of the imaging device 10 according to Embodiment 3 will be described with reference to FIG. 14. In the imaging device 10 according to Embodiment 3, the detector 16 is configured to perform processing of FIG. 14, instead of processing of step ST106 of FIG. 4.

《Step ST501》

When it is determined in step ST105 that a detection target (a motion in the present embodiment) exists in the K$^{th}$ image area 21, the detector 16 determines whether a portion of an attention area (i.e., the K$^{th}$ image area 21 determined by the determiner 15 to include the detection target) determined to include the detection target is an edge portion of the attention area. When the portion determined to include the detection target is the edge portion of the attention area, the operation proceeds to step ST502, and otherwise, the operation proceeds to step ST504.

《Step ST502》

Next, the detector 16 determines whether an adjacent area that is the image area 21 adjacent to the edge portion (the edge portion including the portion determined to include the detection target) of the attention area that is the K$^{th}$ image area 21 exists. When the adjacent area exists, the operation proceeds to step ST503, and otherwise, the operation proceeds to step ST504.

《Step ST503》

Figure 15:
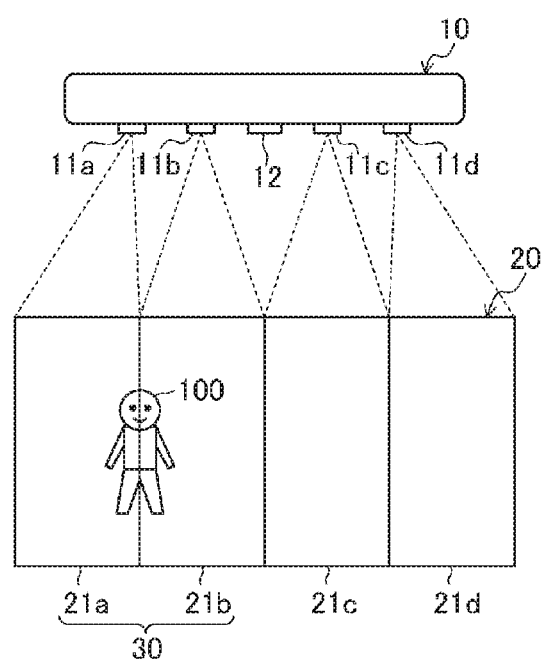
FIG. 15 is a conceptual diagram for explaining a candidate area including an attention area and an adjacent area.

Next, the detector 16 performs object detection processing (human detection processing in the present embodiment) on the candidate area 30 including the attention area that is the K$^{th}$ image area 321 and the adjacent area that is the image area 21 adjacent to the edge portion of the attention area. For example, as shown in FIG. 15, when it is determined by the determiner 15 that a detection target (a motion in the present embodiment) exists in a right edge portion of the image area 21*a* that is an attention area, the detector 16 sets the image area 21*b* adjacent to the right edge portion as the image area 21 that is an adjacent area, and performs object detection processing on the candidate area 30 including the image area 21*a* that is the attention area and the image area 21*b* that is the adjacent area. Also, a method of detecting the object 100 may be the same as a detection method of step ST106.

《Step ST504》

When it is determined in step ST501 that the portion determined to include the detection target is not the edge portion of the attention area, or when it is determined in step ST502 that the adjacent area that is the image area 21 adjacent to the edge portion of the attention area does not exist, the detector 16 performs object detection processing (human detection processing in the present embodiment) on the K$^{th}$ image area 21 that is the attention area. Also, a method of detecting the object 100 may be the same as a detection method of step ST106.

Effect of Embodiment 3

As described above, when a portion of an attention area (the image area 21 determined by the determiner 15 to include a detection target) determined by the determiner 15 to include the detection target is an edge portion of the attention area, since the object 100 is detected from the candidate area 30 including the attention area and an adjacent area (an image area adjacent to the edge portion of the attention area), the adjacent area adjacent to the attention area may be auxiliarily used in object detection processing. Accordingly, detection precision of the object 100 may be improved to be better than that when object detection processing is performed only on the attention area.

Embodiment 4

Figure 16:
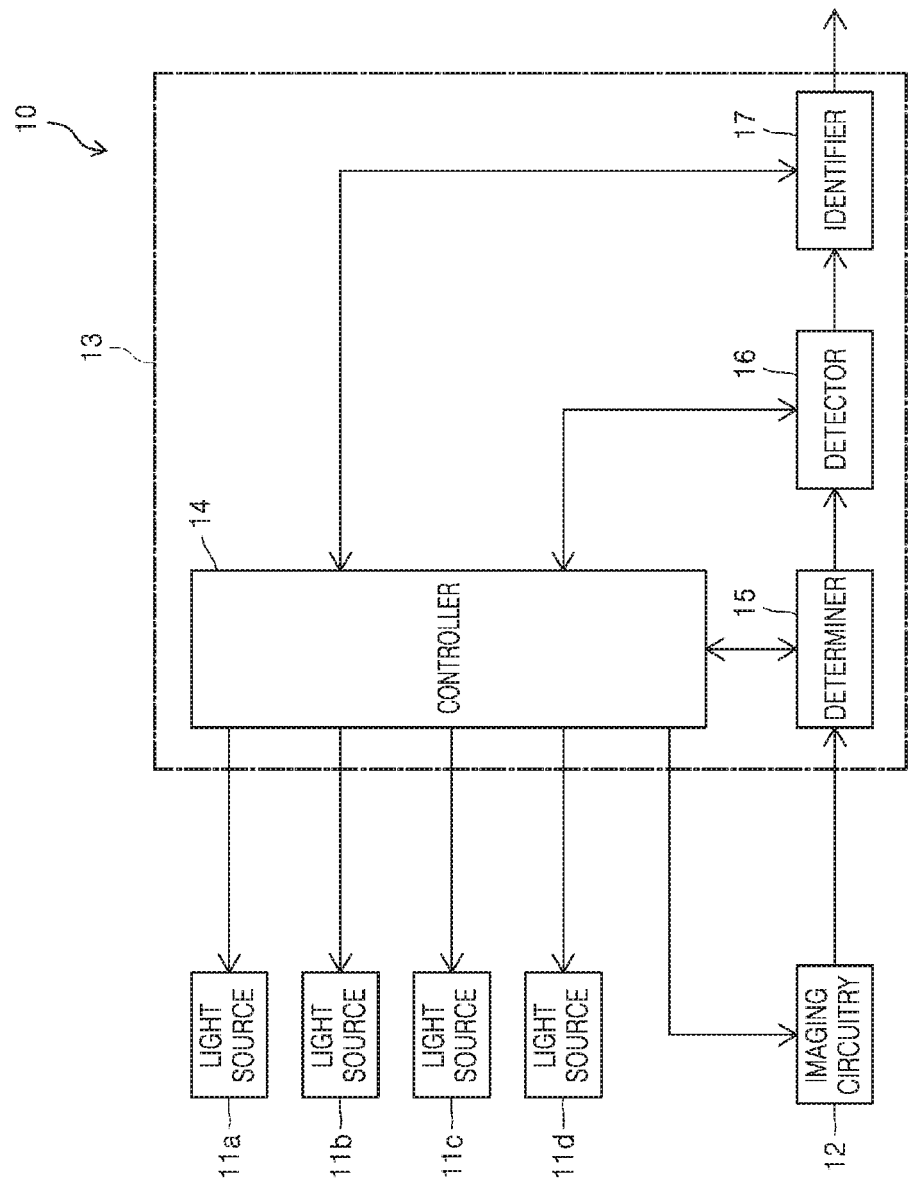
FIG. 16 is a block diagram illustrating a configuration of the imaging device according to Embodiment 4.

FIG. 16 illustrates a configuration of the imaging device 10 according to Embodiment 4. In Embodiment 4, the processing circuit 13 includes an identifier 17, in addition to the controller 14, the determiner 15, and the detector 16 of FIG. 2. Other elements of Embodiment 4 are the same as those of Embodiment 1.

<Identifier>

The identifier 17 is configured to extract an object area 40 from the captured image 20 and identify the object 100 by combining the object area 40 with a combination image that is pre-registered. The identifier 17 may include an appropriate logic, circuit, interface, and/or code for such an operation.

Figure 17:
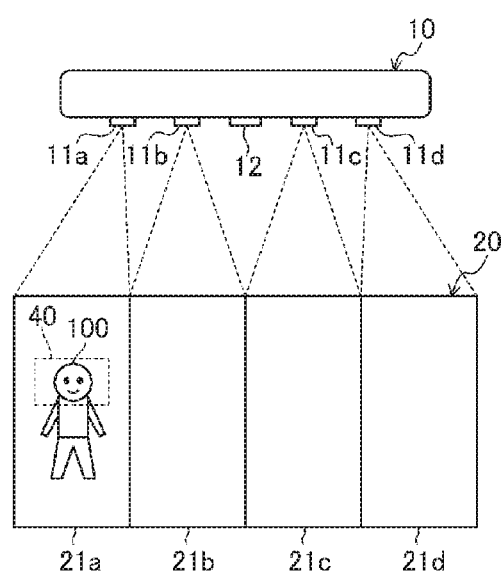
FIG. 17 is a conceptual diagram for explaining an object area.

As shown in FIG. 17, the object area 40 is a part of the captured image 20, and corresponds to an area (an image area) including the object 100 detected by the detector 16. In the present embodiment, the object 100 is a face of a human and the combination image is a face image including the face of the human, and the identifier 17 performs personal identification by combining the face of the human included in the object area 40 with a face of a human that is pre-registered. Also, the identifier 17 is configured to output an identification result to the outside.

Also, the identifier 17 may be configured to extract the object area 40 by using a method (a method according to comparison of luminance distributions) disclosed in Non-Patent Document 2 ("Paul Viola and Michael Jones, "Rapid Object Detection using a Boosted Cascade of Simple Features, "Proc. of CVPR2001, vol. 1, pp. 511-518, 2001"). Also, the identifier 17 may be configured to perform combination processing (combination of the object area 40 with the combination image) by using a support vector machine or a mutual subspace method.

Effect of Embodiment 4

As described above, since the object area 40 (an area that is a part of the captured image 20 and includes the object 100 detected by the detector 16) is extracted from the captured image 20 and the object 100 is identified by combining the object area 40 with a combination image that is pre-registered, the object 100 may be efficiently identified.

Modification of Embodiment 4

Also, in the imaging device 10 according to Embodiment 4, the controller 14 may be configured to, when the object area 40 extracted by the identifier 17 extends over an attention area (the image area 21 determined by the determiner 15 to include a detection target) and an adjacent area (the image area 21 adjacent to an edge portion of the attention area), cause the light sources 11 corresponding to the attention area and the adjacent area from among the plurality of light sources 11*a* through 11*d* to emit light and cause the imaging circuitry 12 to image a subject system. Also, the identifier 17 may be configured to, when the light source 11 corresponding to the attention area emits light, extract the object area 40 from the captured image 20 obtained by the imaging circuitry 12 and combine the object area 40 with a combination image (a first combination image); and when the light sources 11 corresponding to the attention area and the adjacent area emit light, extract the object area 40 from the captured image 20 obtained by the imaging circuitry 12 and combine the object area 40 with a combination image (a second combination image); and identify the object 100 based on a combination result.

<Operation>

Figure 18:
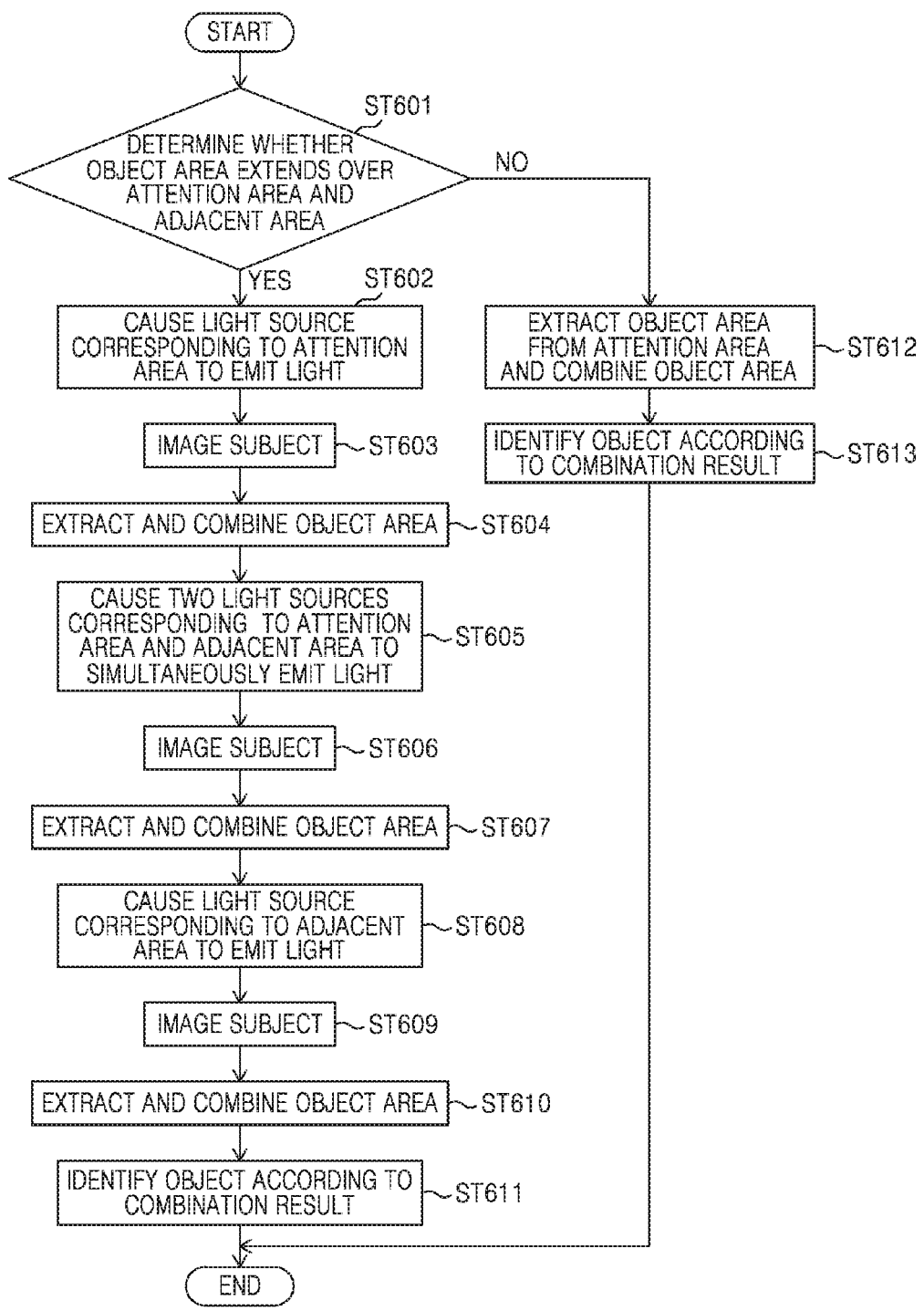
FIG. 18 is a flowchart for explaining an operation of the imaging device according to Modification of Embodiment 4.

Next, an operation of the imaging device 10 according to Modification of Embodiment 4 will be described with reference to FIG. 18. The imaging device 10 according to Modification of Embodiment 4 is configured to perform an operation of FIG. 18 along with an operation (a monitoring operation) of FIG. 4.

⟨Step ST601⟩

The controller 14 determines whether the object area 40 extracted by the identifier 17 extends over an attention area (the image area 21 determined by the determiner 15 to include a detection target) and an adjacent area (the image area 21 adjacent to an edge portion of the attention area). When the object area 40 extends over the attention area and the adjacent area, the operation proceeds to step ST602, and otherwise, the operation proceeds to step ST612.

⟨Steps ST602, ST603, and ST604⟩

Next, the controller 14 stops an operation (a monitoring operation) of FIG. 4. The controller 14 causes a light source corresponding to the attention area from among the plurality of light sources 11a through 11d to emit light, and the imaging circuitry 12 to image a subject. Next, the identifier 17 extracts the object area 40 from the captured image 20 obtained step ST603, and combines the object area 40 with a first combination image that is pre-registered. Also, the first combination image is an image corresponding to the object 100 (a face of a human in the present embodiment) whose half corresponding to the attention area is illuminated by light and remaining half corresponding to the adjacent area is not illuminated by light.

Figure 19:
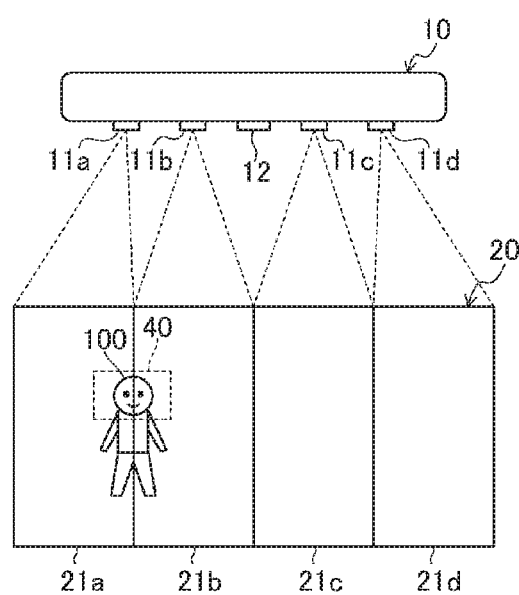
FIG. 19 is a conceptual diagram for explaining an object area including an attention area and an adjacent area.

For example, as shown in FIG. 19, when the object 100 is detected at an edge portion of the image area 21a that is an attention area, the controller 14 causes the light source 11a corresponding to the image area 21a to emit light and the imaging circuitry 12 to image the subject system. Also, since the object 100 is located at the edge portion of the image area 21a that is the attention area, and thus the light source 11 emits light and the imaging circuitry 12 images the subject, the captured image 20 is obtained in a state where a portion of the object 100 corresponding to the image area 21a is relatively bright whereas a portion of the object 100 corresponding to the image area 21b is relatively dark. The identifier 17 combines the object area 40 extracted from the captured image 20 with the first combination image indicating the face of the human whose half (left half in FIG. 19) corresponding to the image area 21a is illuminated by light and remaining half (right half in FIG. 19) corresponding to the image area 21b is not illuminated by light.

⟨Steps ST605, ST606, and ST607⟩

Next, the controller 14 causes a plurality of light sources corresponding to the attention area and an adjacent area from among the plurality of light sources 11a through 11d to emit light and the imaging circuitry 12 to image the subject. Next, the identifier 17 extracts the object area 40 from the captured image 20 obtained in step ST605, and combines the object area 40 with a second combination image that is pre-registered. Also, the second combination image is an image indicating the object 100 (the face of the human in the present embodiment) that is entirely illuminated by light emitted by the plurality of light sources corresponding to the attention area and the adjacent area.

⟨Steps ST608, ST609, and ST610⟩

Next, the controller 14 causes a plurality of light sources corresponding to the adjacent area from among the plurality of light sources 11a through 11d to emit light and the imaging circuitry 12 to image the subject system. Next, the identifier 17 extracts the object area 40 from the captured image 20 obtained in step ST605, and combines the object area 40 with a third combination image that is pre-registered. Also, the third combination image is an image indicating the object 100 (the face of the human in the present embodiment) whose half (left half in FIG. 19) corresponding to the attention area is not illuminated by light and remaining half (right half in FIG. 19) corresponding to the adjacent area is illuminated by light.

For example, as shown in FIG. 19, when the object 100 is detected at the edge portion of the image area 21a that is the attention area, the controller 14 causes the light source 11b corresponding to the image area 21b that is the adjacent area to emit light and the imaging circuitry 12 to image the subject system. Also, since the object 100 is located at the edge portion of the image area 21a that is the attention area, and thus the light source 11b emits light and the imaging circuitry 12 images the subject, the captured image 20 is obtained in a state where a portion of the object 100 corresponding to the image area 21a is relatively dark whereas a portion of the object 100 corresponding to the image area 21b is relatively bright. The identifier 17 combines the object area 40 extracted from the captured image 20 with the third combination image indicating the face of the human whose half (left half in FIG. 19) corresponding to the image area 21a is not illuminated by light and remaining half (right half in FIG. 19) corresponding to the image area 21b is illuminated by light.

⟨Step ST611⟩

Next, the identifier 17 identifies the object 100 based on a combination result of step ST604, a combination result of step ST607, and a combination result of step ST610. Also, when identification processing by the identifier 17 is completed, the controller 14 resumes an operation (a monitoring operation) of FIG. 4.

⟨Step ST612⟩

When it is determined in step ST601 that the object area 40 does not extend over the attention area and the adjacent area, the identifier 17 extracts the object area 40 from the attention area and combines the object area 40 with the first combination image. Also, the identifier 17 may be configured to combine the object area 40 with the second combination image, instead of combining the object area 40 with the first combination image.

⟨Step ST613⟩

Next, the identifier 17 identifies the object 100 based on a combination result of step ST612.

Effect of Modification of Embodiment 4

As described above, since the object 100 is identified based on a combination result (a first combination result) of the object area 40 extracted from the captured image 20 obtained by the imaging circuitry 12 when the light source 11 corresponding to the attention area emits light and a combination result (a second combination result) of the object area 40 extracted from the captured image 20 obtained by the imaging circuitry 12 when the light sources 11 corresponding to the attention area and the adjacent area emit light, identification precision of the object 100 may be improved to be better than that when the object 100 is identified only based on the first combination result.

Also, since a combination result (a third combination result) of the object area 40 extracted from the captured image 20 obtained by the imaging circuitry 12 when the light source 11 corresponding to the adjacent area emits light, in addition to the first and second combination results, is used to identify the object 100, identification precision of the object 100 may be further improved.

Overview of Embodiments 1 Through 4

In the above description, although the plurality of image areas 21a through 21d are arranged so that each edge portion does not overlap an edge portion of an adjacent image area 21, the plurality of image areas 21a through 21d may be arranged so that each edge portion overlaps an edge portion of an adjacent image area 21.

Also, in the above description, although the plurality of light sources 11a through 11d are arranged horizontally in parallel, an arrangement of the plurality of light sources 11a through 11d is not limited thereto. For example, the plurality of light sources 11a through 11d may be vertically arranged in parallel, or may be arranged in parallel to have a circular shape surrounding the imaging circuitry 12.

Also, in the above description, although the controller 14, the determiner 15, the detector 16, and the identifier 17 are included in one processing circuit 13, the controller 14, the determiner 15, the detector 16, and the identifier 17 may be distributed in two or more processing circuits.

Embodiment 5

Some conventional imaging devices use a global shutter or a rolling shutter as disclosed in Japanese Patent Application Publication No. 2010-093729, Japanese Patent Application Publication No. 2010-262224, and Japanese Patent Application Publication No. 2012-095214. The patent documents describe that display unevenness in a captured image surface is reduced by turning on a strobe (a light source).

The prior art focuses on light emission of a strobe (a light source) so as to prevent a shade difference over an entire image surface. The inventors of the present disclosure have found that, in human detection by light emission of a strobe (a light source), power consumed by the strobe (the light source) may not be ignored. The inventors of the present disclosure have found that power needed to turn on the strobe (the light source) may be reduced by detecting a human by using a part in a captured image surface, although display unevenness exists due to turn-on of the strobe (the light source).

<Structure of Imaging Device>

Figure 20:
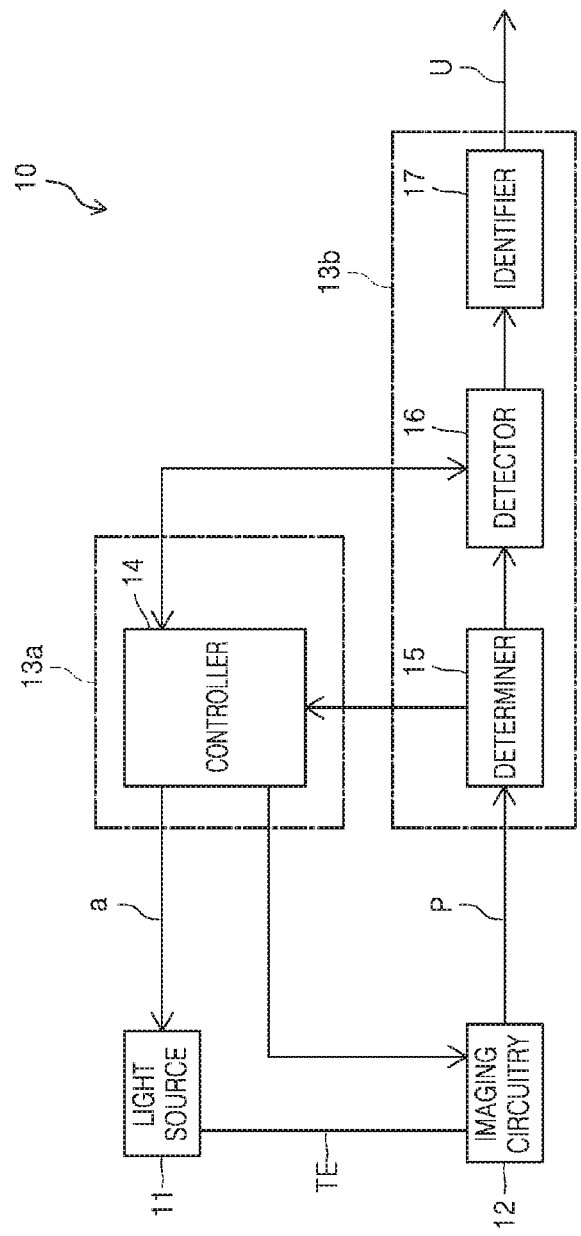
FIG. 20 is a block diagram illustrating a configuration of the imaging device according to Embodiment 5.

FIG. 20 is a schematic view of the imaging device 10 according to Embodiment 5. The imaging device 10 includes the light source 11 (e.g., a strobe), the imaging circuitry 12 (e.g., an imaging element), a control unit 13a, and a detection unit 13b. The imaging device 10 is a device for determining whether a person exists in an image surface captured by using motion detection. The imaging device 10 may be a part of a home appliance such as a television (TV). In this case, the imaging device 10 may provide a personalized service by detecting and recognizing a user in front of the imaging device 10. Also, the imaging device 10 may be configured to perform only user detection and not to perform user recognition. Also, the imaging device 10 may be used as a surveillance camera detecting an outsider who enters a surveillance area of a building or a site.

<Light Source>

The light source 11 is a light-emitting element that instantly emits light to a subject (a subject). The light source 11 is also referred to as a flash. The subject (the subject) includes a person (e.g., an outsider) that exists in a surveillance area and is to be detected and a matter (e.g., a wall of a building) other than the person. The light source 11 may be, for example, a xenon tube or a light-emitting diode (LED). The light source 11 receives a timing signal TE from the imaging circuitry 12 and synchronizes a turn-on timing with an imaging timing. As such, the light source 11 is configured to emit light to the subject system.

<Imaging Circuitry>

The imaging circuitry 12 is an element including a light sensor group arranged in a matrix on a two-dimensional (2D) plane that images a predetermined surveillance area. The imaging circuitry 12 is, for example, a CCD or a CMOS device. The imaging circuitry 12 is, for example, an element using a rolling shutter. A frame rate of the imaging circuitry 12 is, for example, 60 i (interlaced)/sec. A lens for receiving light from the subject is provided in front of the imaging circuitry 12.

As such, the imaging circuitry 12 is configured to image the subject and obtain a captured image. Also, in the present embodiment, the imaging circuitry 12 is configured to be driven by a rolling shutter method. In detail, the imaging circuitry 12 has a light receiving surface (not shown) on which a plurality of light sensors are arranged in a matrix and is configured so that n lines are exposed sequentially beginning from a line of a first row (a line including two or more light sensors arranged in a row direction) that is a leading line to a line of an $n^{th}$ row (N is an integer equal to or greater than 2) that is a final line.

<Control Unit>

The control unit 13a performs control so that an exposure timing of the imaging circuitry 12 and a turn-on timing of the light source 11 have the following relationship. The control unit 13a receives a signal indicating the exposure timing from the imaging circuitry 12, and outputs a trigger signal 'a' for turning on the light source 11 at an appropriate timing. The control unit 13a may be an integrated circuit (IC) (e.g., an application-specific IC) for performing such a function. Alternatively, the control unit 13a may include a processor, a memory coupled to the processor, and software (programs or instructions) stored in the memory.

As such, the control unit 13a is configured to control each component of the imaging device 10 such as the light source 11 and the imaging circuitry 12. Also, in the present embodiment, the control unit 13a includes the controller 14. The controller 14 is configured to cause the light source 11 to emit light and the imaging circuitry 12 to image the subject (the subject illuminated by the light-emitting light source 11). An operation of the controller 14 will be described below.

<Detection Unit>

The detection unit 13b receives a signal P indicating an image output from the imaging circuitry 12, and determines whether a person (an example of an object) exists in a captured image surface. Also, in the present embodiment, the detection unit 13b determines whether an outsider who is not allowed to enter a surveillance area exists in the captured image surface. The detection unit 13b outputs a signal U indicating a determination result. Also, the detection unit 13b may be provided outside the imaging device 10. The detection unit 13b may be an IC (e.g., an application-specific IC) for performing such a function. Alternatively, the detection unit 13b may include a processor, a memory coupled to the processor, and software (programs or instructions) stored in the memory.

As such, the detection unit 13b is configured to process a captured image (an image indicated by the signal P) obtained by the imaging circuitry 12. Also, in the present embodiment, the detection unit 13b includes the determiner 15, the detector 16, and the identifier 17.

The determiner 5 is configured to determine whether a pre-determined detection target (a motion in the present embodiment) exists in the captured image (the image indicated by the signal P) obtained by the imaging circuitry 12. The detector 16 is configured to detect a pre-determined object (a face of a human in the present embodiment) from the captured image (the image indicated by the signal P) determined by the determiner 15 to include the detection target. The identifier 17 is configured to extract an object area (an image area including the object detected by the detector 16) from the captured image (the image indicated by the signal P), and identify the object by combining the object area with a combination image that is pre-registered. In the present embodiment, the object is the face of the human and the combination image is a face image including the face of the human, and the identifier 17 performs personal identification (face recognition) by combining the face of the human included in the object area with a face of a human that is pre-registered. Also, the identifier 17 is configured to output an identification result (the signal U indicating a result) to the outside. Also, operations of the determiner 15, the detector 16, and the identifier 17 will be described below.

<Operation of Imaging Device>

Figure 21:
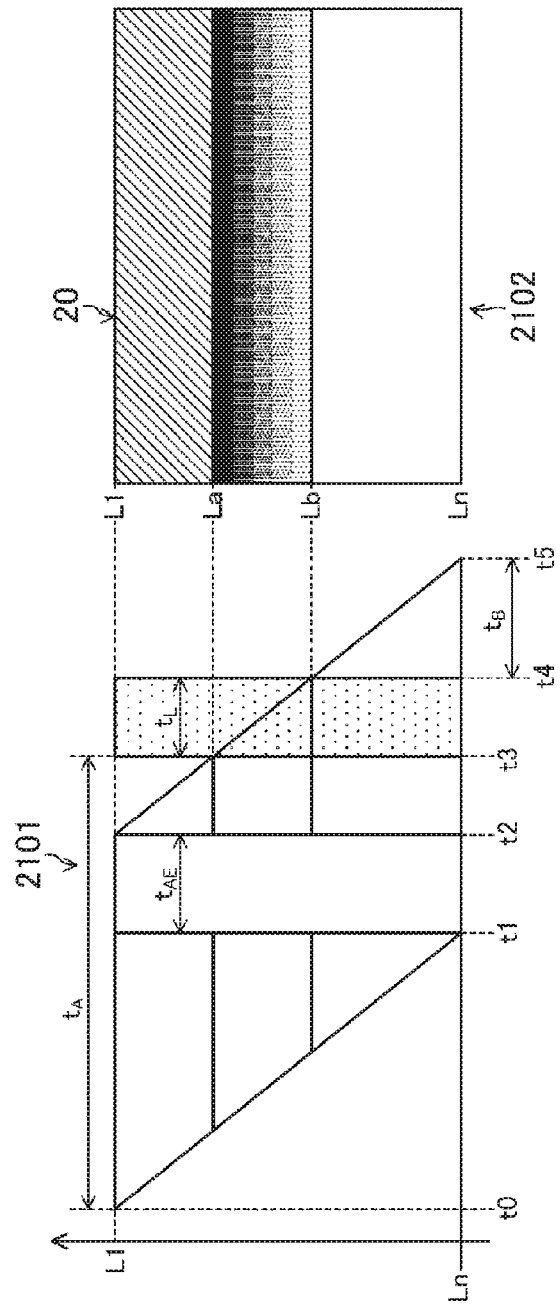
FIG. 21 is a diagram for explaining control of the light source by a control unit in Embodiment 5.

FIG. 21 illustrates control of the light source 11 by the control unit 13a in Embodiment 5. A chart 2101 shows a timing between exposure of the imaging circuitry 12 and turn-on of the light source 11. In the chart 2101, a vertical axis represents lines L1 through Ln (n is a total number) in an image surface (a light receiving surface on which light sources are arranged in a matrix) of the imaging circuitry 12, and a horizontal axis represents a time t. The first line L1 of the image surface is exposed between times t0 through t2. The last line Ln of the image surface is exposed between times t1 through t5. The imaging circuitry 12 exposes all lines in the image surface, between the times t1 through t2 (i.e., an all line exposure period $t_{AE}$). The light source 11 is turned on between times t3 through t4 (i.e., a turn-on period $t_L$). In other words, the light source 11 is turned off between the times t0 through t3 (i.e., a turn-off period $t_A$) and between the times t4 through t5 (i.e., a turn-off period $t_B$).

A schematic diagram 2101 shows an intensity distribution of emitted light of the light source 11 in the image surface of the imaging circuitry 12. In the schematic diagram 2102, a vertical axis corresponds to the lines L1 through Ln of the chart 2101, and a horizontal axis represents a horizontal position of the image surface (the captured image 20). In the lines L1 through La, since the light source 11 is not turned on during exposure, an intensity of emitted light is zero. In the lines La through Lb, since a period where the light source 11 is turned on during exposure increases toward a lower line, an intensity of emitted light increases from zero to a maximum level. In the lines Lb through Ln, since a period where the light source 11 is turned on during exposure is the entire turn-on period tL (maximum), an intensity of emitted light is constant at the maximum level.

The control unit 13a turns on the light source 11 so that the turn-on period tL where the light source 11 is turned on and the turn-off periods $t_A$ and $t_B$ where the light source 11 is turned off exist in a period other than the all line exposure period $t_{AE}$ where all lines of a rolling shutter are simultaneously exposed. Accordingly, for example, as shown in the schematic diagram 2102 of FIG. 21, an intensity of emitted light of the light source 11 may be the maximum at a lower portion of the image surface (a lower portion of the captured image 20) and may be zero at an upper portion of the image surface (an upper portion of the captured image 20). As a result, assuming that the light source 11 is driven with the same amount of power, strong light may be emitted to a part of the image surface when compared to a case where light is uniformly emitted to the entire image surface. In other words, when compared to a case where light is uniformly emitted, light may be emitted to a part of the image surface more efficiently, that is, with less power, and power consumed by the light source 11 may be reduced.

<Motion Estimation Mode and Face Recognition Mode>

In Embodiment 5, the imaging device 10 detects a person in a surveillance area while reducing power consumption by causing the light source 11 to emit light only to a part of an image surface (i.e., by turning on the light source 11 so that a turn-on period and a turn-off period exist in a period other than an all line exposure period). This operation mode is referred to as a motion estimation mode. In the motion estimation mode, the detection unit 13b performs motion detection (determines whether a detection target exists) by performing, for example, an interframe differential method, on an area (an image area that is a part of the captured image 20 and corresponds to the turn-on period $t_L$ of the light source 11) in a frame corresponding to the turn-on period $t_L$ where the light source 11 is turned on.

In the motion estimation mode, when a motion is detected, the imaging device 10 proceeds to a face recognition mode. In the face recognition mode, the control unit 13a controls the light source 11 to emit stronger light in a period corresponding to an area where the motion is detected, and the detection unit 13b performs face recognition (identification of an object) on the area where the motion is detected.

In the motion estimation mode, human detection is mainly performed with relatively weak light, and once a person is detected, the motion estimation mode is changed to the face recognition mode. In the face recognition mode, face recognition is performed with relatively strong light to determine whether the person is an outsider or an allowed person. Since two modes are changed, two operations, that is, human detection and face recognition, may be performed while reducing power.

Figure 22:
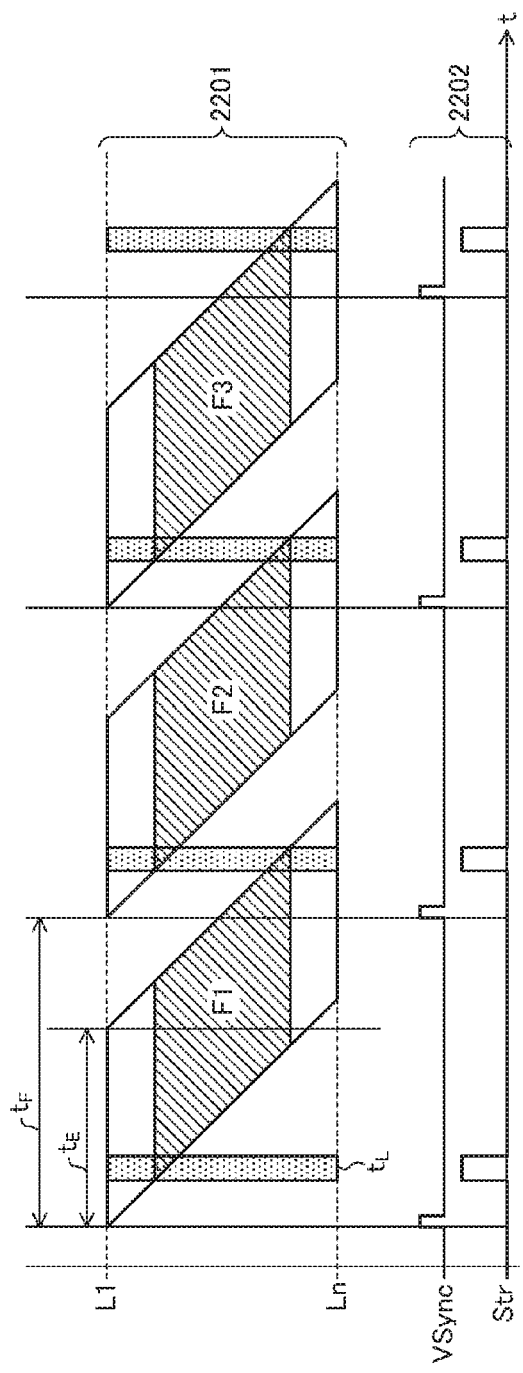
FIG. 22 is a diagram for explaining control (control in a motion estimation mode) of the light source by the control unit in Embodiment 5.

FIG. 22 illustrates control (control in a motion estimation mode) of the light source 11 by the control unit 13a in Embodiment 5. A chart 2201 shows a timing between exposure of the imaging circuitry 12 and turn-on of the light source 11. A chart 2202 shows a synchronization signal VSync corresponding to a start time of each of a frame period $t_F$ and an exposure period $t_E$, and a strobe signal Str corresponding to the turn-on period $t_L$ of the light source 11. Although the charts 2201 and 2202 show only three consecutive frames F1 through F3, frames (captured images) are continuously repeated as long as a motion estimation mode is continued during actual operation of the imaging device 10.

As shown in FIG. 22, in each frame, a timing of the turn-on period $t_L$ of the light source 11 for the exposure period $t_E$ is the same. Accordingly, light is emitted only to the same portion (in this case, an upper end portion and a lower end portion of the image surface) in the captured image surface when the light source 11 is turned on.

Figure 23:
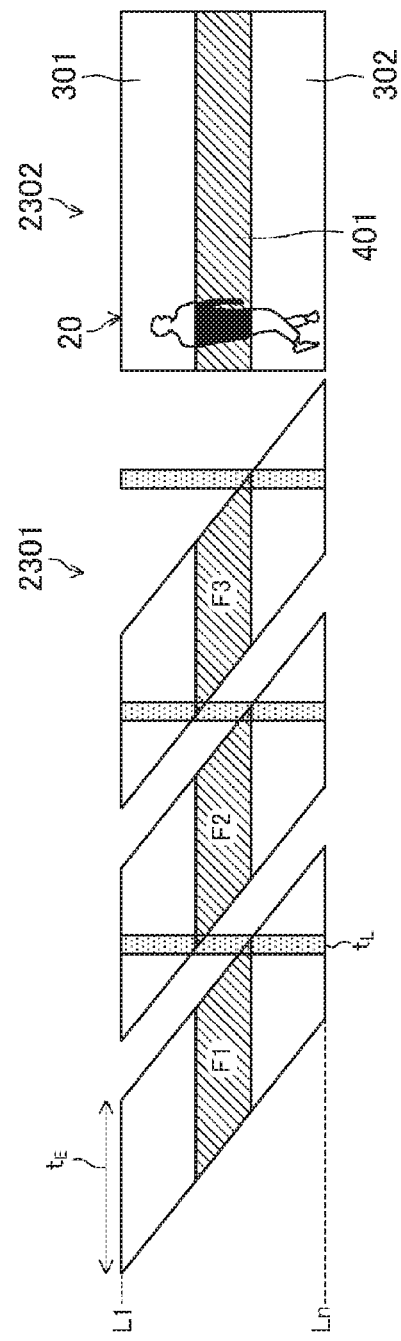
FIG. 23 is a diagram for explaining another example of control (control in a motion estimation mode) of the light source by the control unit in Embodiment 5.

FIG. 23 illustrates another example of control (control in a motion estimation mode) of the light source 11 by the control unit 13a in Embodiment 5. A chart 2301 shows a timing between exposure of the imaging circuitry 12 and turn-on of the light source 11. In the frames F1 through F3, a timing of the turn-on period $t_L$ of the light source 11 for the exposure period $t_E$ is the same.

A schematic diagram 2302 shows an intensity distribution of emitted light in an image surface of the imaging circuitry 12. In the schematic diagram 2302, a vertical axis corresponds to the lines L1 through Ln of the chart 2301, and a horizontal axis represents a horizontal position of the image surface. As shown in the chart 2301, when the light source 11 is turned on, emission areas 301 and 302 of the light source 11 and a non-emission area 401 are formed in the image surface. Accordingly, in a motion estimation mode, motion detection is performed and a person is detected in the emission areas 301 and 302.

Figure 24:
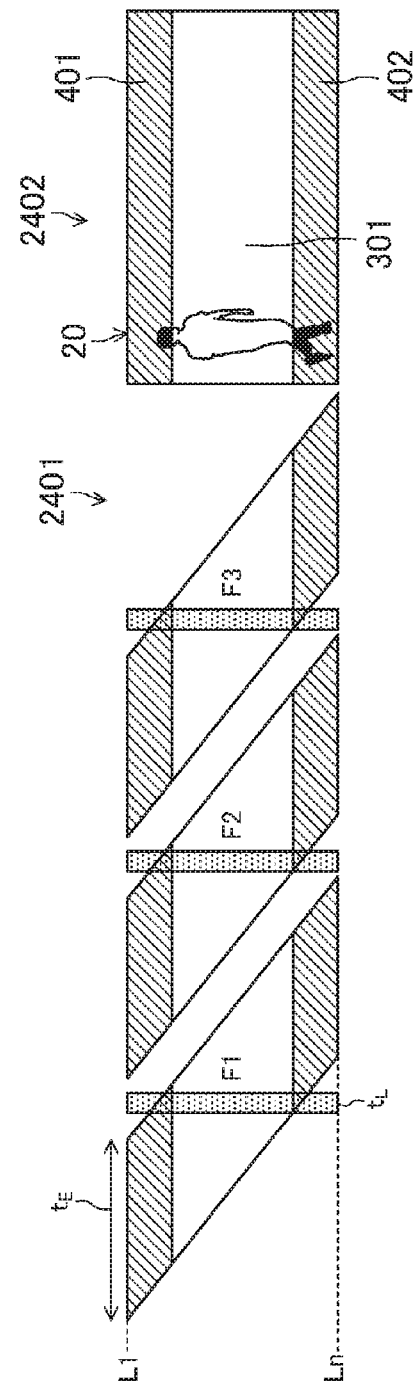
FIG. 24 is a diagram for explaining another example of control (control in a motion estimation mode) of the light source by the control unit in Embodiment 5.

FIG. 24 illustrates another example of control (control in a motion estimation mode) of the light source 11 by the control unit 13a in Embodiment 5. A chart 2401 shows a timing between exposure of the imaging circuitry 12 and turn-on of the light source 11. In the frames F1 through F3, a timing of the turn-on period $t_L$ of the light source 11 for the exposure period $t_E$ is the same.

A schematic diagram 2402 shows an intensity distribution of emitted light of the light source 11 in an image surface. In the schematic diagram 2402, a vertical axis corresponds to the lines L1 through Ln of the chart 2401, and a horizontal axis represents a horizontal position of the image surface. As shown in the chart 2401, when the light source 11 is turned on, the emission area 301 of the light source 11 and non-emission areas 401 and 402 are formed in the image surface. Accordingly, in a motion estimation mode, motion detection is performed and a person is detected in the emission area 301.

Figure 25:
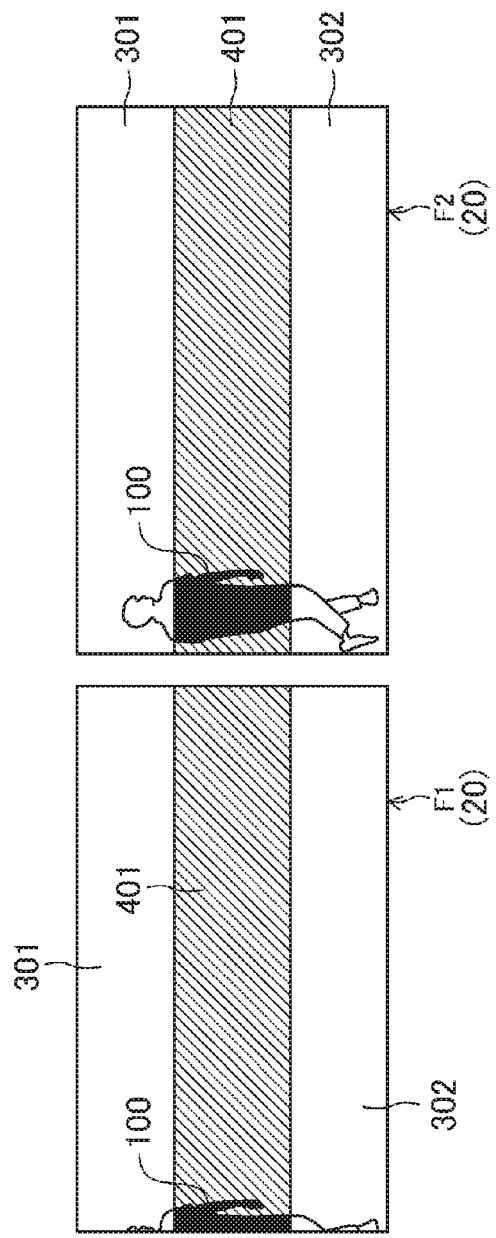
FIG. 25 is a diagram for explaining an interframe differential method in a motion estimation mode in Embodiment 5.

FIG. 25 is a diagram for explaining an interframe differential method in a motion estimation mode. The detection unit 13b performs motion detection by performing an interframe differential method on an area (an image area that is a part of the captured image 20 and corresponds to the turn-on period $t_L$ of the light source 11) in the frames F1 and F2 corresponding to the turn-on period $t_L$ where the light source 11 is turned on. The frames F1 and F2 are two consecutive frames (captured images 20). As shown in FIG. 25, the emission areas 301 and 302 and the non-emission area 401 are formed in the frame F1 by turning on the light source 11. Likewise, the emission areas 301 and 302 and the non-emission area 401 are formed in the frame F2.

The detection unit 13b performs motion detection based on a differential between the emission area 301 of the frame F1 and the emission area 301 of the frame F2. As time passes, a person (an example of the object 100) moves from a left end of an image surface toward the center of the image surface. Accordingly, based on the differential between the emission area 301 of the frame F1 and the emission area 301 of the frame F2, it is determined that a motion exists. Likewise, the detection unit 13b performs motion detection based on a differential between the emission area 302 of the frame F1 and the emission area 302 of the frame F2. Based on the differential between the emission area 302 of the frame F1 and the emission area 302 of the frame F2, it is determined that a motion exists.

Figure 26:
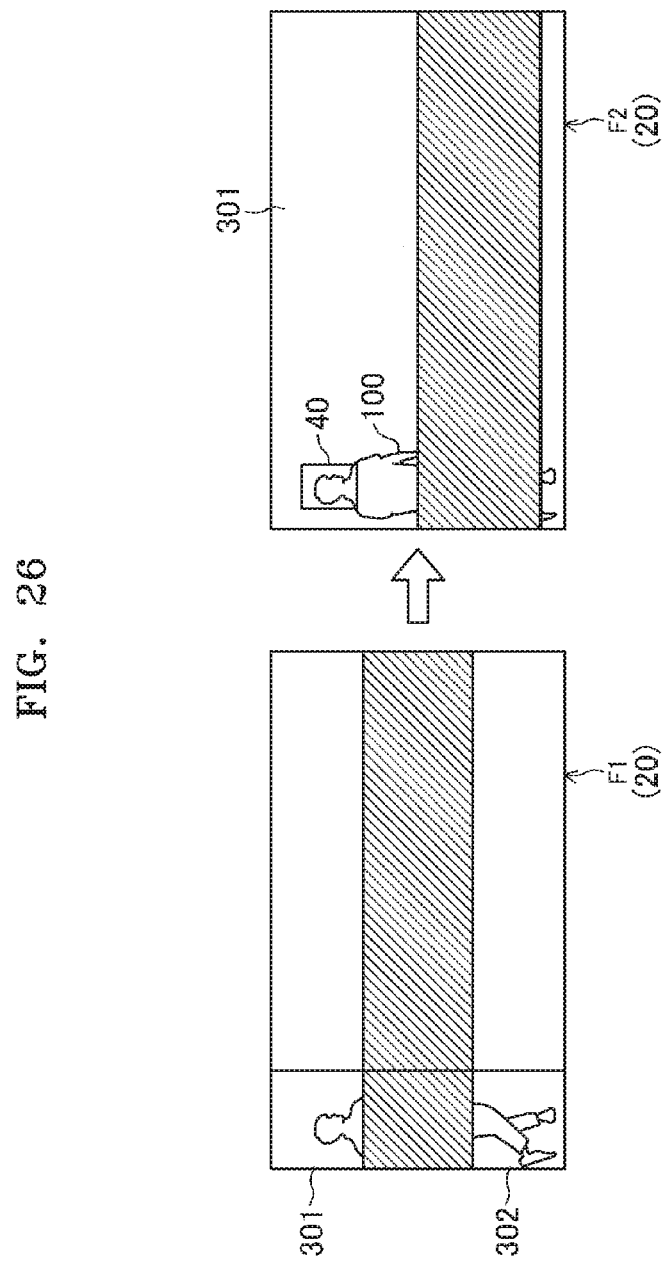
FIG. 26 is a diagram for explaining a change from a motion estimation mode to a face recognition mode in Embodiment 5.

FIG. 26 is a diagram for explaining a change from a motion estimation mode to a face recognition mode. In a period to the frame F1, motion estimation is performed on the emission areas 301 and 302. When a motion is detected in the frame F1, a mode is changed to a face recognition mode in the frame F2. In the face recognition mode, light of the light source 11 is emitted to an area with a high probability that a face (the object 100) of a person exists within the frame F2. This is possible by controlling the light source 11 at, for example, a turn-on timing of FIG. 20. In the face recognition mode, an intensity of light of the light source 11 in the emission area 302 may be greater than that in the motion estimation mode. Accordingly, stronger light emission of the light source 11 may be used in the face recognition mode while reducing power consumption of the light source 11 in the motion estimation mode. In the face recognition mode, it is determined whether the person is an outsider or an allowed person according to whether a face portion of the person (a face of the person included in the object area 40) is identical to a face of a person that is registered.

Figure 27:
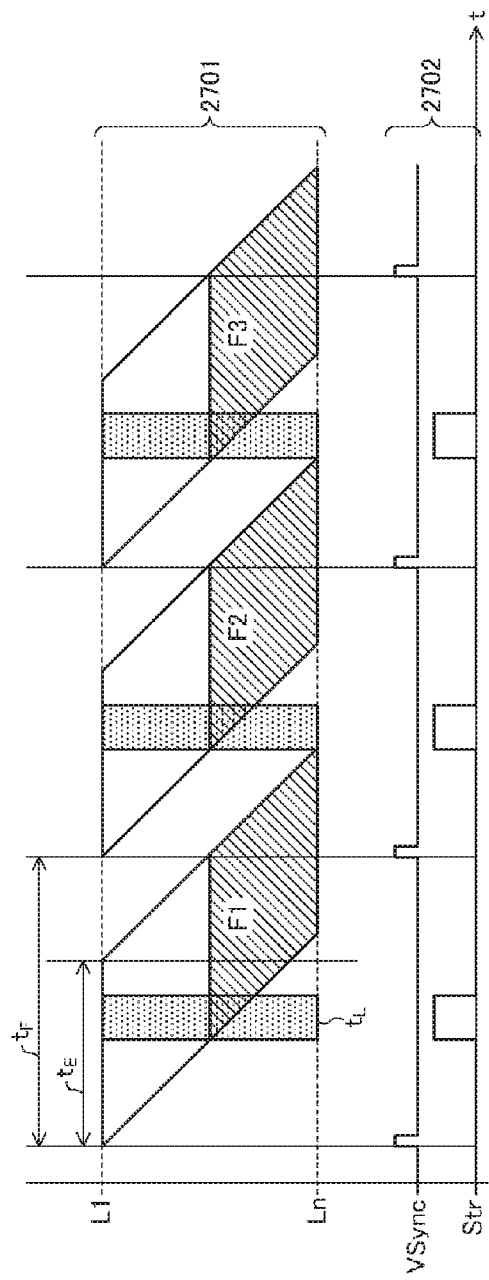
FIG. 27 is a diagram for explaining control (control in a face recognition mode) of the light source by the control unit in Embodiment 5.

FIG. 27 illustrates control (control in a face recognition mode) of the light source 11 by the control unit 13a in Embodiment 5. A chart 2701 shows a timing between exposure of the imaging circuitry 12 and turn-on of the light source 11. A chart 2702 shows the synchronization signal VSync corresponding to a start time of each of the frame period $t_F$ and the exposure period $t_E$ and the strobe signal Str corresponding to the turn-on period $t_L$ of the light source 11. Although the charts 2701 and 2702 show only three consecutive frames F1 through F3, frames (captured image) are continuously repeated as long as a face recognition mode is continued during actual operation of the imaging device 10.

As shown in FIG. 27, in each frame, a timing of the turn-on period $t_L$ of the light source 11 for the exposure period $t_E$ is the same. Accordingly, light is emitted only to the same portion (in this case, an upper portion of an image surface) in the captured image surface when the light source 11 is turned on.

Figure 28:
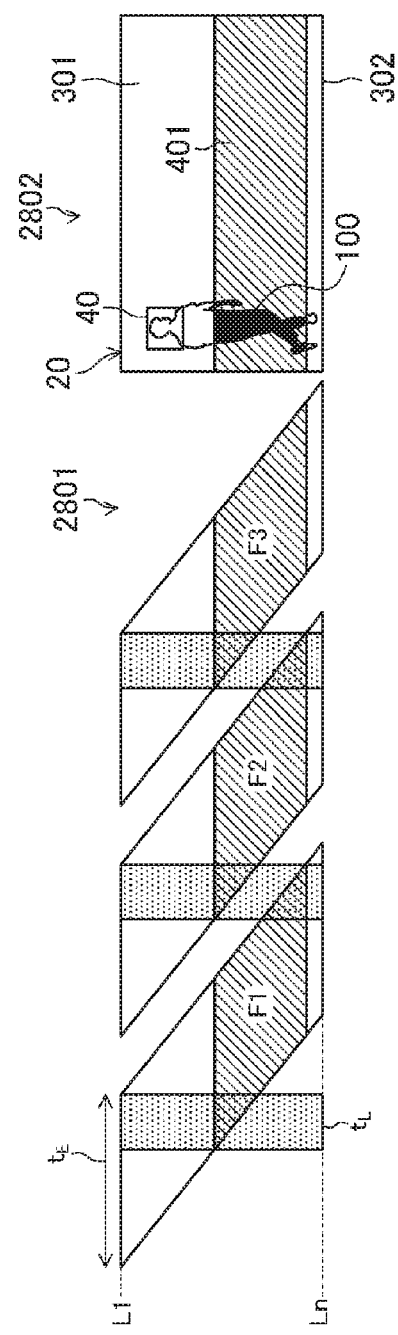
FIG. 28 is a diagram for explaining another example of control (control in a face recognition mode) of the light source by the control unit in Embodiment 5.

FIG. 28 illustrates another example of control (control in a face recognition mode) of the light source 11 by the control unit 13a in Embodiment 5. A chart 2801 shows a timing between exposure of the imaging circuitry 12 and turn-on of the light source 11. In the frames F1 through F3, a timing of the turn-on period $t_L$ of the light source 11 for the exposure period $t_E$ is the same.

A schematic diagram 2802 shows an intensity distribution of emitted light of the light source 11 in an image surface of the imaging circuitry 12. In the schematic diagram 2802, a vertical axis corresponds to the lines L1 through Ln of the chart 2801, and a horizontal axis represents a horizontal position of the image surface. As shown in the chart 2801, when the light source 11 is turned on, the emission areas 301 and 302 and the non-emission area 401 of the light source 11 are formed in the image surface. In the present embodiment, a probability that a face portion (the object 100) of a person exists in the emission area 301 is high. Accordingly, it is determined whether the face portion (a face of the person included in the object area 40) detected in the emission area 301 is the same as a face of a person that is registered, and thus it is determined that the person is an outsider or an allowed person.

Figure 29:
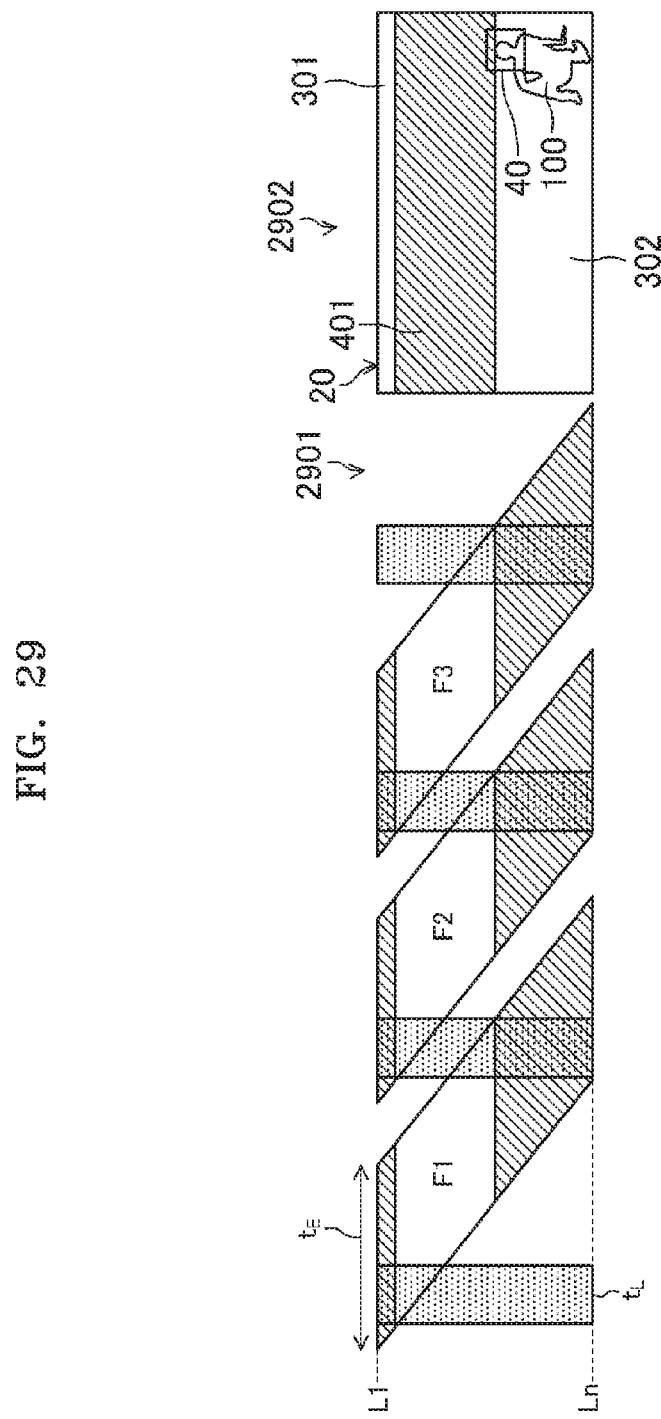
FIG. 29 is a diagram for explaining another example of control (control in a face recognition mode) of the light source by the control unit in Embodiment 5.

FIG. 29 illustrates another example of control (control in a face recognition mode) of the light source 11 by the control unit 13a in Embodiment 5. A chart 2901 shows a timing between exposure of the imaging circuitry 12 and turn-on of the light source 11. In the frames F1 through F3, a timing of the turn-on period $t_L$ of the light source 11 for the exposure period $t_E$ is the same.

A schematic diagram 2902 shows an intensity distribution of emitted light of the light source 11 in an image surface of the imaging circuitry 12. In the schematic diagram 2902, a vertical axis corresponds to the lines L1 through Ln of the chart 2901, and a horizontal axis represents a horizontal position of the image surface. As shown in the chart 2901, when the light source 11 is turned on, the emission areas 301 and 302 and the non-emission area 401 of the light source 11 are formed in the image surface. In the present embodiment, a probability that a face portion (the object 100) of a person exists in the emission area 302 is high. Accordingly, it is determined whether the face portion (a face of the person included in the object area 40) detected in the emission area 301 is the same as a face of a person that is registered, and thus it is determined whether the person is an outsider or an allowed person.

Also, in Embodiment 5, when the light source 11 is turned on so that an exposure time (e.g., the exposure period $t_E$ of FIG. 3B) is a multiple of a turn-on period (e.g., the turn-on period $t_L$ of FIG. 3B) of the light source 11, intensity unevenness (shown as stripes on the image surface) of emitted light in an emission area may be removed.

As described above, in the imaging device 10 according to Embodiment 5, the controller 14 causes the light source 11 to emit light and the imaging circuitry 12 to image a subject so that a period (the turn-on period $t_L$) where the light source 11 is turned on and a period (the turn-off periods $t_O$ and $t_B$) where the light source 11 is turned off exist in a period other than a period (the all line exposure period $t_{AE}$) where all lines of the imaging circuitry 12 are simultaneously exposed.

Also, in the imaging device 10 according to Embodiment 5, the determiner 15 determines whether a detection target (a motion in the present embodiment) by performing an inter-frame differential method on an image area that is a part of the captured image 20 obtained by the imaging circuitry 12 and corresponds to a period (the turn-on period $t_L$) where the light source 11 is turned on.

Also, the image area (the emission area 301) corresponding to the period (the turn-on period $t_L$) where the light source 11 is turned on includes a portion of the subject imaged by a line exposed when the light source 11 from among all lines (n lines) of the imaging circuitry 12 is turned on. That is, the portion of the subject included in the image area corresponding to the turn-on period $t_L$ is illuminated by the light source 11 that is turned on in the turn-on period $t_L$.

Also, in the imaging device 10 according to Embodiment 5, when it is determined by the determiner 15 that the detection target exists (the motion exists in the present embodiment), the controller 14 controls the light source 11 so that stronger light is emitted in a period (the turn-on period $t_L$) corresponding to the image area determined to include the detection target. In detail, the controller 14 controls the light source 11 so that a light emission amount of the light source 11 in a period (the turn-on period $t_L$) corresponding to the image area determined by the determiner 15 to include the detection target is greater than a light emission amount of the light source 11 in a period (the turn-on period $t_L$) corresponding to an image area not determined by the determiner 15 to include the detection target. The light emission amount refers to a total amount of light emitted from the light source 11 in a predetermined cycle (e.g., a frame cycle needed to obtain one captured image), and corresponds to an amount obtained by integrating a light emission intensity of the light source 11 over time.

Also, in the imaging device 10 according to Embodiment 5, when it is determined by the determiner 15 that the detection target (the motion in the present embodiment) exists, the identifier 17 performs identification (face recognition in the present embodiment) of an object in the image area determined to include the detection target. In detail, the detector 16 detects a pre-determined object (a face of a human in the present embodiment) from the captured image determined by the determiner 15 to include the detection target, and the identifier 17 extracts an object area (an image area including the object detected by the detector 16) from the captured image determined by the determiner 15 to include the detection target and identifies the object by combining the object area with a combination image that is pre-registered (an image including the face of the human in the present embodiment).

Overview of Embodiment 5

Any function used in the embodiments of the present disclosure may be performed by using hardware, software, or a combination thereof. The function may be performed by a single processor or a plurality of processors.

For example, a turn-on timing of the light source 11 for exposure of the imaging circuitry 12 of FIGS. 21 and 22 is realized by a large-scale integrated circuit (LSI). Alternatively, the turn-on timing is realized by a processor, a memory coupled to the processor, and instructions that perform various functions stored in the memory.

Embodiment 6

Some conventional imaging devices use a camera using a rolling shutter method and a flash light source (e.g., see Japanese Patent Application Publication No. 2010-093729, Japanese Patent Application Publication No. 2010-262224, and Japanese Patent Application Publication No. 2012-95214).

However, the above patent documents describe only a method for removing a shade difference shown as horizontal stripes in an image surface during imaging by using a flash light source. That is, the above patent documents do not describe that a light emission amount of a strobe (a light source) is obtained based on a brightness of an image captured when the strobe (the light source) does not emit light.

Considering the above problems, the inventors of the present disclosure have proposed an apparatus and method for achieving correct exposure by obtaining a light emission amount of a strobe (a light source) based on a brightness of an image captured when the strobe (the light source) does not emit light.

Also, in the following description, exposure refers to the amount of light exposed by adjusting the amount of light corresponding to an imaging circuitry (an imaging element) according to a brightness of a subject (a subject). Exposure where a brightness of the subject (the subject) imaged by the imaging circuitry is appropriate is referred to as "correct exposure". Exposure where the amount of exposed light is small and the subject (the subject) is too dark is referred to as "underexposure". Exposure where the amount of exposed light is large and the subject (subject) is too bright is referred to as "overexposure".

<Structure of Imaging Device>

Figure 30:
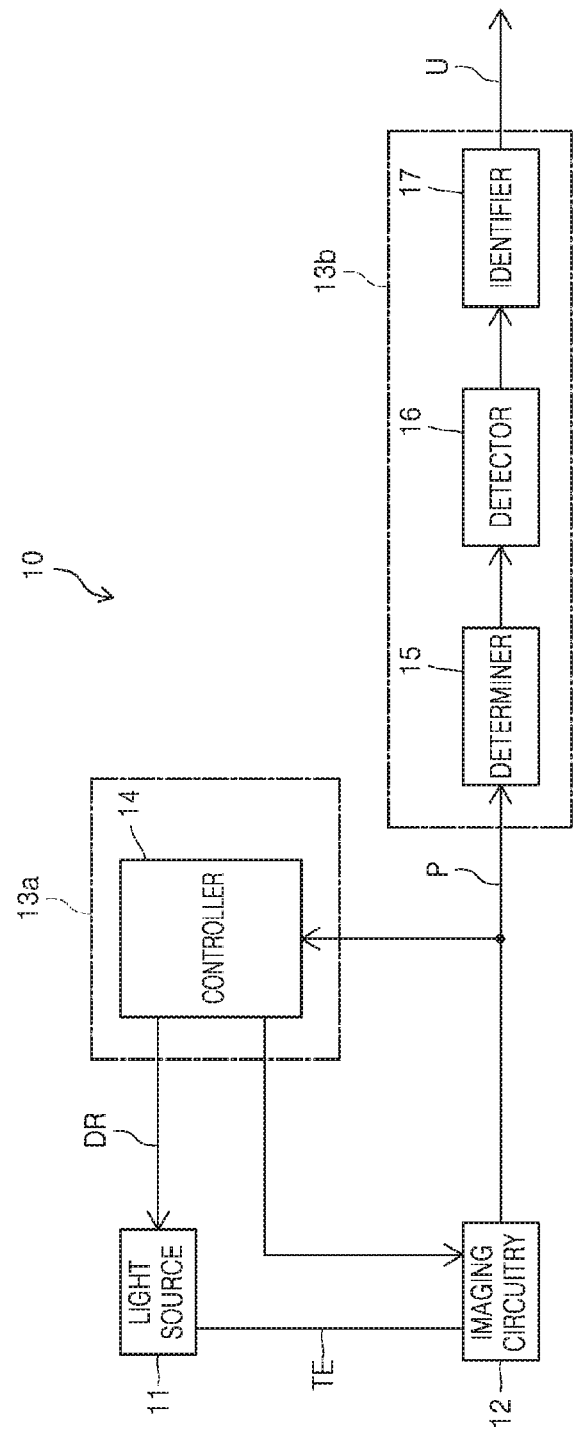
FIG. 30 is a block diagram illustrating a configuration of the imaging device according to Embodiment 6.

FIG. 30 is a schematic diagram of the imaging device 10 according to Embodiment 6. The imaging device 10 includes the light source 11 (e.g., a strobe), the imaging circuitry 12 (e.g., an imaging element), the control unit 13a, and the detection unit 13b. The imaging device 10 is included in a home appliance (e.g., a TV) and determines whether a user exists in a captured image surface by using, for example, motion detection. At least a part of an operation of the home appliance including the imaging device 10 may be changed according to whether a user exists around the home appliance. Accordingly, the home appliance may perform a more user-friendly operation.

<Light Source>

The light source 11 is a light-emitting element that instantly emits light to a subject (a subject). The light source 11 is also referred to as a flash. The subject (the subject) includes a person (e.g., a user of a home appliance) that exists in a surveillance area and is to be detected and a matter (e.g., a foreground or a background) other than the person.

The light source 11 may be an arbitrary appropriate flash light source (e.g., an LED). Alternatively, the light source 11 is a laser diode. The light source 11 emits, for example, infrared light or visible light. That is, the light source 11 may be configured to emit infrared light, or may be configured to emit visible light. The light source 11 receives the timing signal TE indicating an exposure timing from the imaging circuitry 12 and synchronizes a light emission timing with an imaging timing.

As such, the light source 11 is configured to emit light to the subject system. Also, the light source 11 is configured to be capable of changing a light emission amount. The light emission amount is a total amount of light emitted from the light source 11 in a predetermined cycle (e.g., a frame cycle), and corresponds to an amount obtained by integrating a light emission intensity of the light source 11 over time. In the present embodiment, the light source 11 is configured to be capable of changing a light emission duty ratio, and may change the light emission amount of the light source 11 by changing the light emission duty ratio of the light source 11. Also, the light emission duty ratio is a ratio of a turn-on period (a period where the light source 11 is turned on) in a predetermined cycle.

<Imaging Circuitry>

The imaging circuitry 12 is an element including a light sensor group arranged in a matrix on a 2D plane. The imaging circuitry 12 is, for example, an element using a rolling shutter. The imaging circuitry 12 is, for example, a CMOS device. However, the present disclosure is not limited thereto, and the imaging circuitry 12 may be a CCD. The imaging circuitry 12 images a predetermined surveillance area near a home appliance including the imaging device 10. A frame rate of the imaging circuitry 12 is, for example, 30/sec. A lens for receiving light from the subject is provided in front of the imaging circuitry 12. As such, the imaging circuitry 12 is configured to image the subject and obtain a captured image.

<Control Unit>

The control unit 13a performs control so that an exposure timing of the imaging circuitry 12 and a light emission timing of the light source 11 have the following relationship. The control unit 13a receives the signal P from the imaging circuitry 12 and outputs a signal DR indicating a duty ratio to the light source 11. The control unit 13a may be an IC (e.g., an application-specific IC) for performing such a function. Alternatively, the control unit 13a may include a processor, a memory coupled to the processor, and software (programs or instructions) stored in the memory.

As such, the control unit 13a is configured to control each component of the imaging device 10 such as the light source 11 and the imaging circuitry 12. Also, in the present embodiment, the control unit 13a includes the controller 14. The controller 14 is configured to cause the light source 11 to emit light and the imaging circuitry 12 to image the subject (the subject illuminated by the light-emitting light source 11). An operation of the controller 14 will be described below.

<Detector>

The detection unit 13b receives the signal P indicating an image output from the imaging circuitry 12, and determines whether a user (an example of an object) exists in a captured image surface. The detection unit 13b outputs the detection signal U indicating a determination result. Also, the detection unit 13b may be provided outside the imaging device 10. When the imaging device 10 includes the detection unit 13b, the imaging device 10 may be referred to as a user detection device. The detection unit 13b may be an IC (e.g., an application-specific IC) for performing such a function. Alternatively, the detection unit 13b may include a processor, a memory coupled to the processor, and software (programs and instructions) stored in the memory.

As such, the detection unit 13b is configured to process a captured image (an image indicated by the signal P) obtained by the imaging circuitry 12. Also, in the present embodiment, the detection unit 13b includes the determiner 15, the detector 16, and the identifier 17.

The determiner 15 is configured to determine whether a pre-determined detection target (a motion in the present embodiment) exists in the captured image (the image indicated by the signal P) obtained by the imaging circuitry 12. The detector 16 is configured to detect a pre-determined object (a face of a human in the present embodiment) from the captured image (the image indicated by the signal P) determined by the determiner 15 to include the detection target. The identifier 17 is configured to extract an object area (an image area including the object detected by the detector 16) from the captured image (the image indicated by the signal P), and identify the object by combining the object area with a combination image that is pre-registered. In the present embodiment, the object is the face of the human and the combination image is a face image including the face of the human, and the identifier 17 performs personal identification (face recognition) by combining the face of the human included in the object area with a face of a human that is pre-registered. Also, the identifier 17 is configured to output an identification result (the signal U indicating a result) to the outside.

<Summary of Imaging Device>

In a state where the light source 11 does not emit light, the imaging circuitry 12 performs imaging and inputs an image P (a captured image) to the control unit 13a. The control unit 13a calculates an average luminance APL of pixels in the image P, obtains a duty ratio DR based on the average luminance APL, and outputs the duty ratio DR to the light source 11. The imaging circuitry 12 outputs the timing signal TE indicating an exposure timing to the light source 11.

A turn-on state and a turn-off state of the light source 11 are periodically repeated. The control unit 13a controls a light emission amount of the light source 11 by using pulse width modulation (PWM) based on the duty ratio DR. The duty ratio DR is a ratio of a turn-on period in a cycle of a turn-on state and a turn-off state (i.e., a PWM cycle TP). In other words, a light emission amount (a total amount of light emitted from the light source 11 in the PWM cycle TP) of the light source 11 is controlled by the duty ratio DR output by the control unit 13a. As such, the control unit 13a changes a light emission amount of the light source 11 by using PWM.

The light source 11 sets the PWM cycle TP so that a multiple of the PWM cycle TP is the same as the exposure period $t_E$, and emits light under PWM control based on the input duty ratio DR.

The imaging circuitry 12 obtains an image in a period where the light source 11 emits light and outputs the image P (the captured image). The image P is input to the detection unit 13b that is located at a rear end. The detection unit 13b performs human detection based on a differential between consecutive frames of the image P. For example, the detection unit 13b may perform human detection by detecting a shape of a face or a shape of a person of the image P. In addition to human detection, the detection unit 13b may perform personal identification. The detection unit 13b outputs the detection signal U. A home appliance (e.g., a TV) that receives the detection signal U may change at least a part of an operation based on the detection signal U. Accordingly, the home appliance may change an operation according to whether a user exists around the home appliance. For example, when no user exists around the home appliance, the home appliance may automatically perform a power-off operation or the like.

In Embodiment 6, as described below, a light emission amount of the light source 11 may be controlled in accordance with a brightness of a captured area. As a result, the imaging device 10 may obtain the image P (the captured image 20) having an appropriate brightness.

<Operation of Imaging Device>

Figure 31:
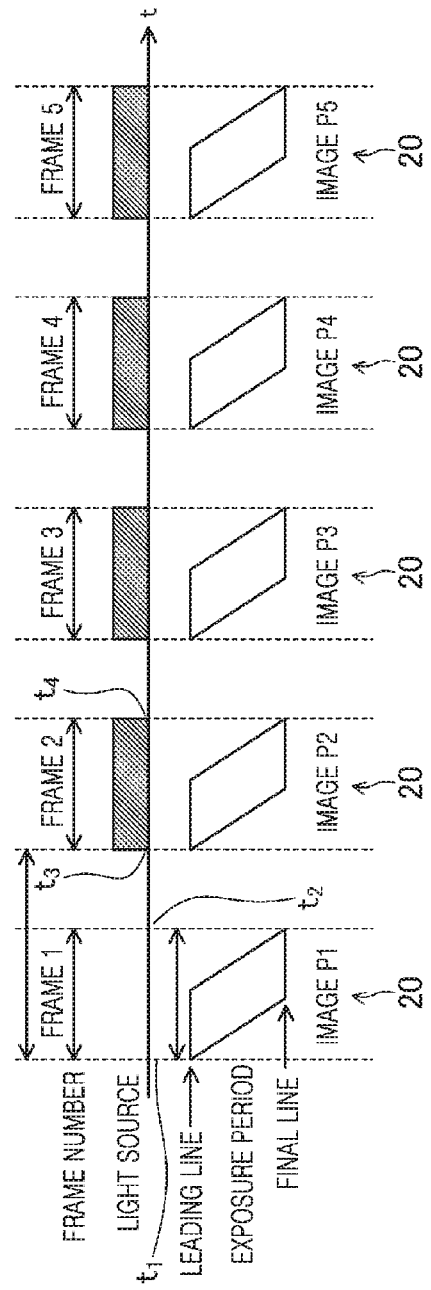
FIG. 31 is a diagram for explaining an operation of the imaging device according to Embodiment 6.

FIG. 31 is a diagram for explaining an operation of the imaging device 10 according to Embodiment 6. A vertical axis of FIG. 31 represents sequentially a frame number, a light emission pulse of the light source 11, and an exposure period of the imaging circuitry 12, and a horizontal axis of FIG. 31 represents a time t. The imaging circuitry 12 is typically an element using a rolling shutter such as a CMOS imaging element. A parallelogram in each of images P1 through P5 of FIG. 31 corresponds to an exposure period in each of frames 1 through 5. Since the imaging circuitry 12 is a rolling shutter, start times of exposure periods of lines from a leading line to a final line become gradually later than a start time of an exposure period of the leading line. As a result, exposure periods of the images P1 through P5 are shown as parallograms in FIG. 31. As understood by one of ordinary skill in the art, an image obtained by the imaging circuitry 12 typically has a rectangular shape (including a square shape). Although the imaging circuitry 12 uses a rolling shutter, the present disclosure is not limited thereto and the imaging circuitry 12 may use a global shutter. That is, the imaging circuitry 12 may be configured to be driven by a rolling shutter method, or may be configured to be driven by a global shutter method.

In the frame 1 (i.e., a period between times $t_1$ through $t_2$), the light source 11 does not emit light and the imaging circuitry 12 obtains an image. In other words, a brightness of environment light may be measured by obtaining an image without illumination (the captured image 20). Next, in the frame 2 (i.e., a period between times $t_3$ through $t_4$), the light source 11 emits light and the imaging circuitry 12 obtains an image. Accordingly, an image with illumination (the captured image 20) may be obtained. For example, a length of a period between the times $t_1$ through $t_3$ is 33 ms and a length of a period between the times $t_1$ and $t_2$ is 10 ms.

In FIG. 31, in the first frame 1, an image without illumination is obtained, the duty ratio DR of the light source 11 is calculated, and the duty ratio DR is used in the frames 2 through 5. Also, the present disclosure is not limited thereto, and the image without illumination may be obtained regularly or irregularly, and the duty ratio DR of the light source 11 may be updated. Accordingly, since illumination of an appropriate brightness may be performed according to a change in a brightness of the environment, an image having an appropriate brightness may be obtained.

Figure 32:
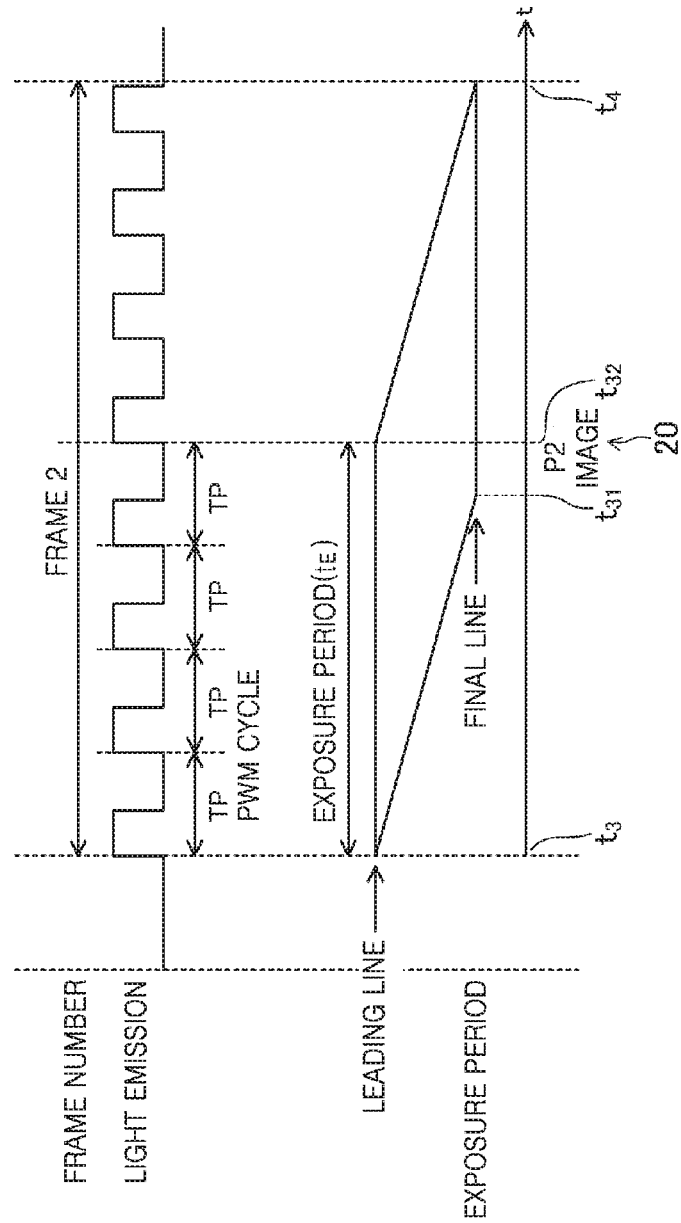
FIG. 32 is a diagram illustrating a light-emitting operation of the light source in Embodiment 6.

FIG. 32 is a diagram illustrating a light-emitting operation of the light source 11 in Embodiment 6, and is an enlarged diagram illustrating a portion (i.e., a period between the times $t_3$ and $t_4$) corresponding to the frame 2 of FIG. 31. The exposure period $t_E$ of a leading line of the image P2 is a period between the time $t_3$ and a time $t_{32}$. The exposure period $t_E$ of a final line of the image P2 is a period between a time $t_{31}$ and the time $t_{32}$.

The PWM cycle TP is set so that a line exposure period (the exposure period $t_E$) of the imaging circuitry 12 is 4 times the PWM cycle TP of the light source 11. In this case, all lines from a leading line to a final line are exposed during a period that is 4 times the PWM cycle TP. Accordingly, brightnesses of all lines of the frame 2 may be uniform. Although the exposure period $t_E$ is 4 times the PWM cycle TP in FIG. 32, the present disclosure is not limited thereto, and the exposure period $t_E$ may be N (N is an integer equal to or greater than 1) times the PWM cycle TP. Accordingly, a shade difference shown as horizontal stripes may be avoided, and thus a uniform captured image may be obtained. Also, in order to achieve uniform brightnesses of all lines, a start time of the frame 2 of FIG. 32 may not be the same as a start time of the exposure period $t_E$. That is, although a light emission period of the light source 11 and line exposure of the imaging circuitry 12 are synchronized in FIG. 32, the present disclosure is not limited thereto, and the light emission period of the light source 11 and the line exposure of the imaging circuitry 12 may be synchronized with each other.

Figure 33:
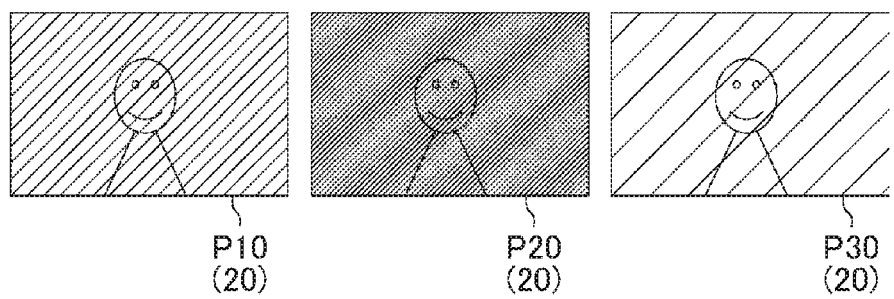
FIG. 33 is a diagram illustrating an image without illumination and an image with illumination.

FIG. 33 is a diagram illustrating an image without illumination and an image with illumination described with reference to FIG. 31. An age P10 (the captured image 20) is an image without illumination in a bright environment. For example, the image P10 corresponds to a case where a room in which external light comes in the day is imaged. An image P20 (the captured image 20) is an image without illumination in a dark environment. For example, the image P20 corresponds to a case where a room in which interior lights are not turned on in the night is imaged. An image P30 (the captured image 20) is an image with illumination and a desired brightness to be finally obtained.

In this case, when compared to the image P30 to be finally obtained, a brightness of the image P10 is slightly insufficient and a brightness of the image P20 is greatly insufficient.

<Control of Light Emission Amount of Light Source>

Figure 34:
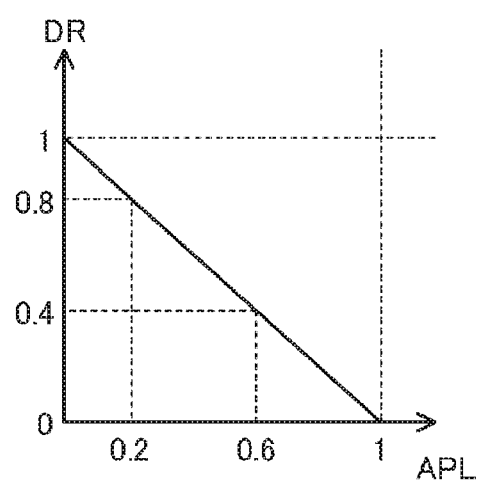
FIG. 34 is a graph for explaining an operation of the control unit in Embodiment 6.

FIG. 34 is a graph for explaining an operation of the control unit 13a in Embodiment 6.

A horizontal axis of the graph represents the average luminance APL of an image without illumination, and a vertical axis represents the duty ratio DR of PWM control of the light source 11. In the graph of FIG. 34, control is performed so that the duty ratio DR increases as the average luminance APL decreases, and decreases as the average luminance APL increases. That is, control is performed so that illumination increases in a dark environment and decreases in a bright environment. In other words, in Embodiment 6, a light emission amount (the duty ratio DR in the present embodiment) of the light source 11 is obtained based on a brightness of an image captured when the light source 11 does not emit light, and imaging is performed by using the light emission amount. As a result, according to Embodiment 6, correct exposure may be achieved and human detection precision of the detection unit 13b may be further improved.

For example, when the average luminance APL of the image P10 of FIG. 33 (an image in a bright environment) is 0.6, the duty ratio DR in this case is 0.4. When the average luminance APL of the image P20 of FIG. 33 (an image in a dark environment) is 0.2, the duty ratio DR in this case is 0.8. As such, the control unit 13a outputs the duty ratio DR based on the average luminance APL of the image P without illumination. A relationship between the average luminance APL of FIG. 34 and the duty ratio DR is plotted as a straight line.

Figure 35:
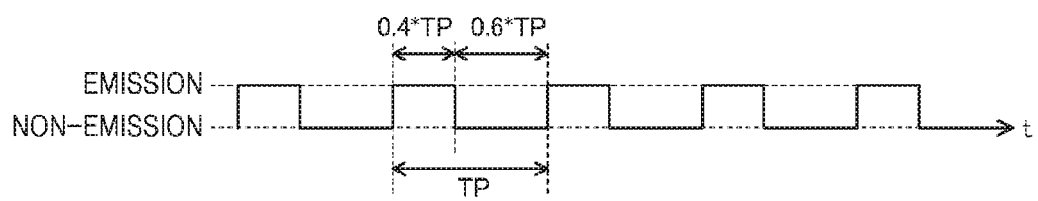
FIG. 35 is a diagram for explaining an operation of the light source in Embodiment 6.
Figure 36:
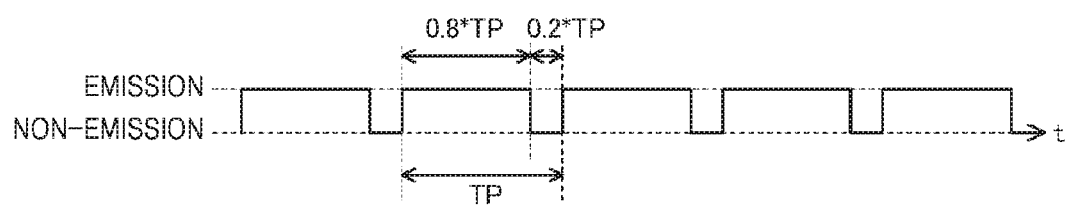
FIG. 36 is a diagram for explaining an operation of the light source in Embodiment 6.

FIGS. 35 and 36 are diagrams for explaining an operation of the light source 11 according to Embodiment 6. The light source 11 emits light under PWM control based on the duty ratio DR input from the control unit 13a.

FIG. 35 illustrates a state where the light source 11 emits light based on the duty ratio DR of 0.4 calculated based on the image P10 (an image without illumination in a bright environment) of FIG. 33. A turn-on period is 0.4 TP and a turn-off period is 0.6 TP in the PWM cycle TP.

FIG. 36 illustrates a state where the light source 11 emits light based on the duty ratio DR of 0.8 calculated based on the image P20 (an image without illumination in a dark environment) of FIG. 33. A turn-on period is 0.8 TP and a turn-off period is 0.2 TP in the PWM cycle TP.

As shown in FIGS. 35 and 36, control is made so that illumination increases in a dark environment and decreases in a bright environment. The image P30 (an image having a desired brightness to be finally obtained) of FIG. 33 may be obtained.

Figure 37:
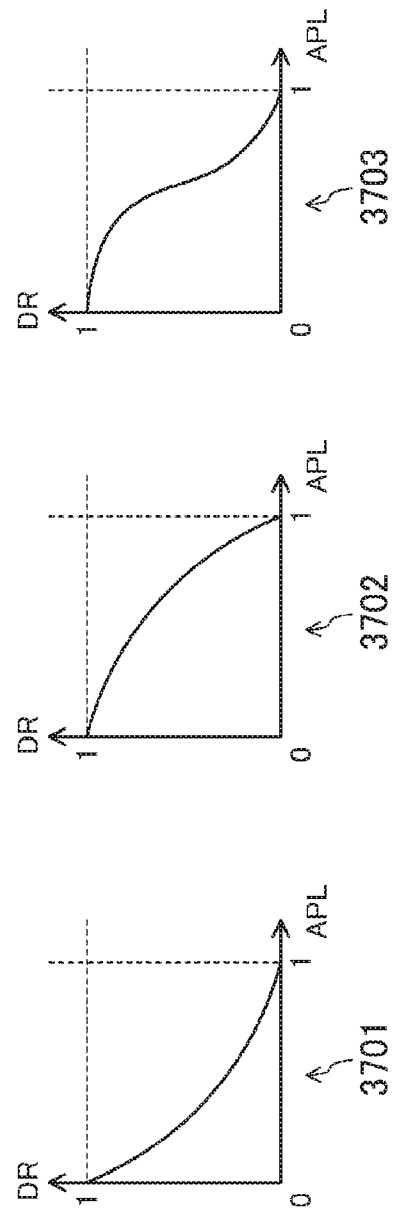
FIG. 37 is a diagram for explaining another example of an operation of the control unit in Embodiment 6.

FIG. 37 is a diagram for explaining another example of an operation of the control unit 13a in Embodiment 6. Although linear conversion characteristics are illustrated in FIG. 34, non-linear conversion characteristics as shown in graphs 3701, 3702, and 3703 of FIG. 37 may be used according to sensitivity characteristics of an imaging circuitry and illumination.

As described above, in the imaging device 10 according to Embodiment 6, the controller 14 sets a light emission amount of the light source 11 based on a brightness (an average value of brightnesses of all pixels in the captured image 20 in the present embodiment) of the captured image 20 obtained by the imaging circuitry 12 when the light source 11 does not emit light. In detail, the controller 14 sets a light emission amount of the light source 11 based on a brightness of the captured image 20 obtained by the imaging circuitry 12 when the light source 11 does not emit light so that the light emission amount of the light source 11 decreases as the brightness of the captured image 20 obtained by the imaging circuitry 12 when the light source 11 does not emit light increases.

Overview of Embodiment 6

Any function used in the embodiments of the present disclosure may be performed by using hardware, software, or a combination thereof. The function may be performed by a single processor or a plurality of processors. For example, a function of the imaging device 10 of FIGS. 30 and 31 is performed by an LSI. Alternatively, a function of the imaging device 10 is performed by a processor, a memory coupled to the processor, and instructions that perform various functions stored in the memory.

Description of Embodiments 7 and 8

A conventional imaging device for imaging and monitoring a subject is known. For example, a sensor camera with a sensor added to an interphone device, etc. is disclosed in Japanese Patent Application Publication No. 2007-318673. The sensor camera is provided with an imaging means which images a predetermined region, an image processing means which detects a movable matter from a captured image of the imaging means, a means which outputs a pickup image signal, a luminosity determination means which judges a surrounding luminosity, and a luminosity control means which controls a light volume of an illumination means while turning on the illumination means when a luminosity which the luminosity determination means judges is less than a fixed level.

However, in the above imaging device, when a distance to an object is short and a light emission amount of a light source is too large (e.g., when a light emission intensity is too high), a luminance value of a captured image obtained by imaging is saturated and whether a detection target exists may not be accurately determined. Also, when a distance to the object is long and a light emission amount of the light source is too small (e.g., when a light emission intensity is too low), a luminance value of the captured image obtained by imaging is too low and whether the detection target exists may not be accurately determined. As such, it is difficult to image a subject at a light emission intensity suitable to determine whether the detection target exists. Also, a light emission amount of the light source is a total amount of light emitted from the light source in a predetermined cycle, and corresponds to an amount obtained by integrating a light emission intensity of the light source over time.

Accordingly, an objective of the present disclosure is to provide an imaging device for imaging a subject at a light emission amount (e.g., a light emission intensity) suitable to determine whether a detection target exists.

Embodiment 7

Figure 38:
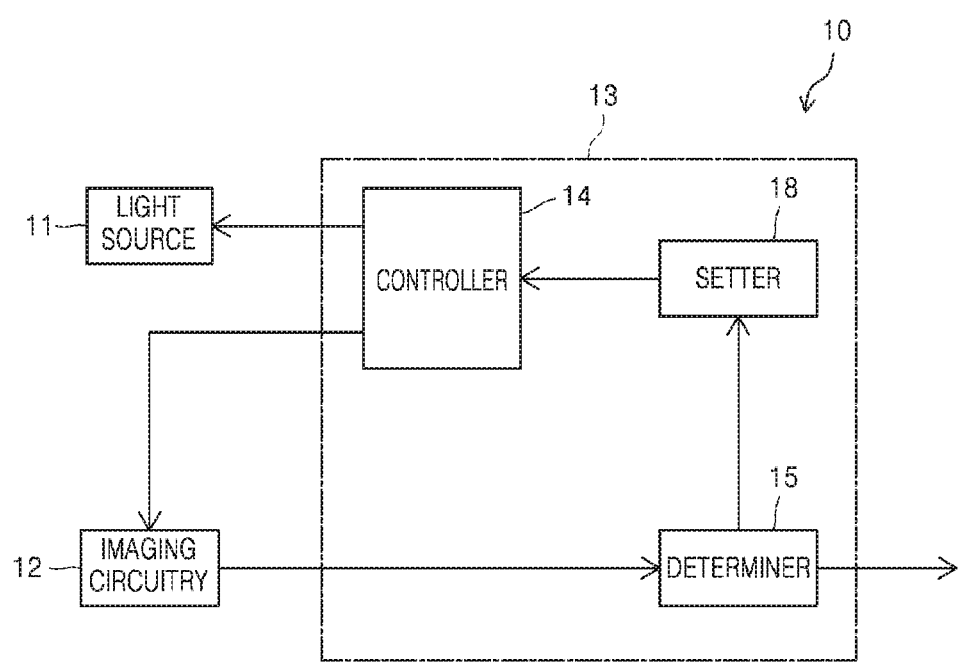
FIG. 38 is a block diagram illustrating a configuration of the imaging device according to Embodiment 7.
Figure 39:
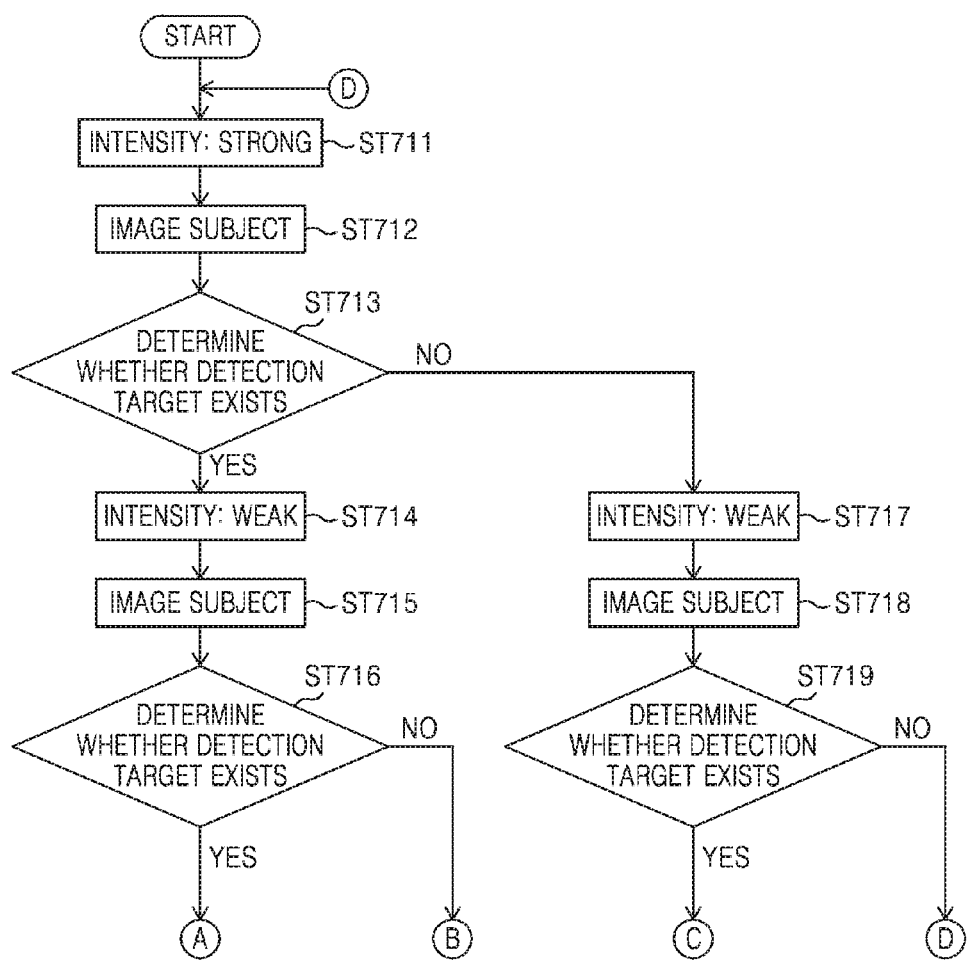
FIG. 39 is a flowchart for explaining an operation of the imaging device according to Embodiment 7.
Figure 40:
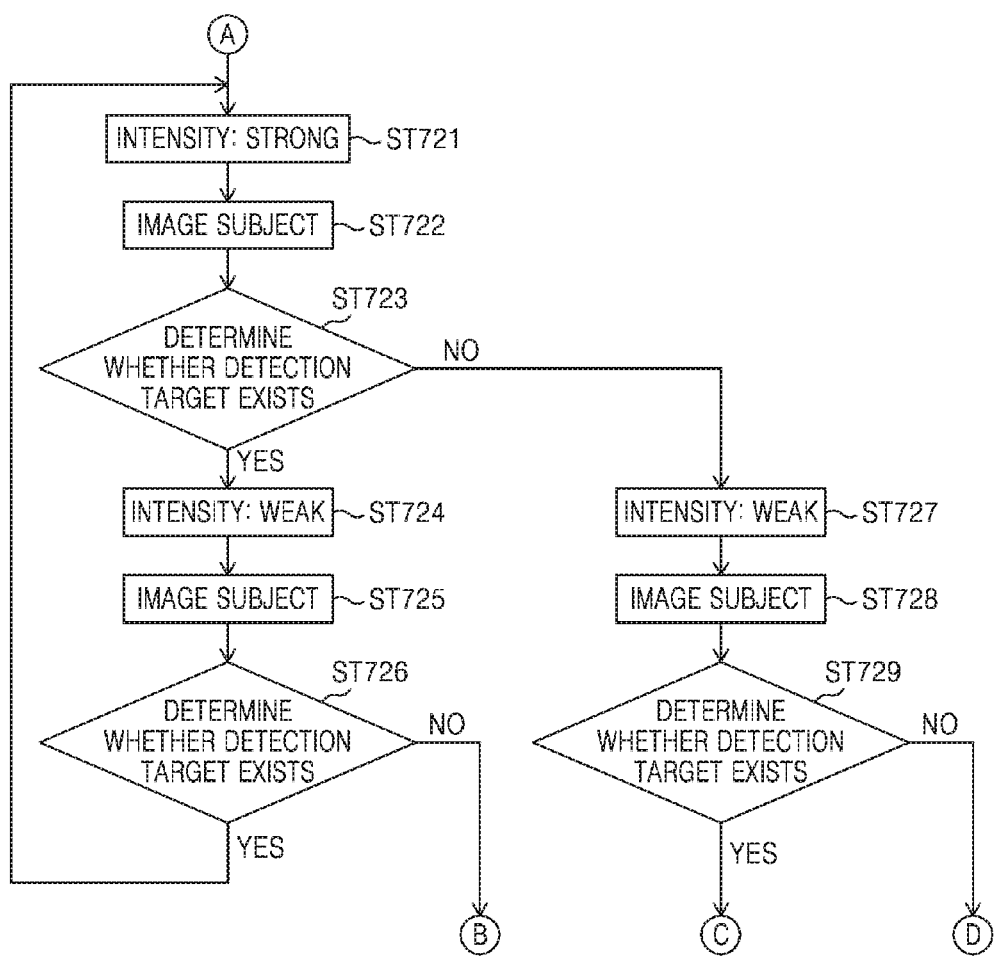
FIG. 40 is a flowchart for explaining an operation of the imaging device according to Embodiment 7.
Figure 41:
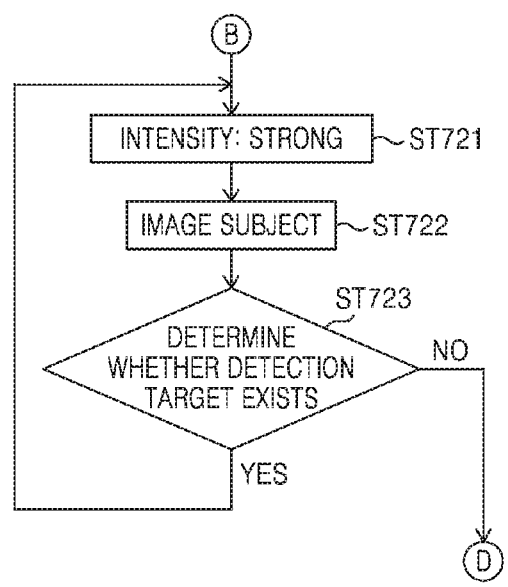
FIG. 41 is a flowchart for explaining an operation of the imaging device according to Embodiment 7.
Figure 42:
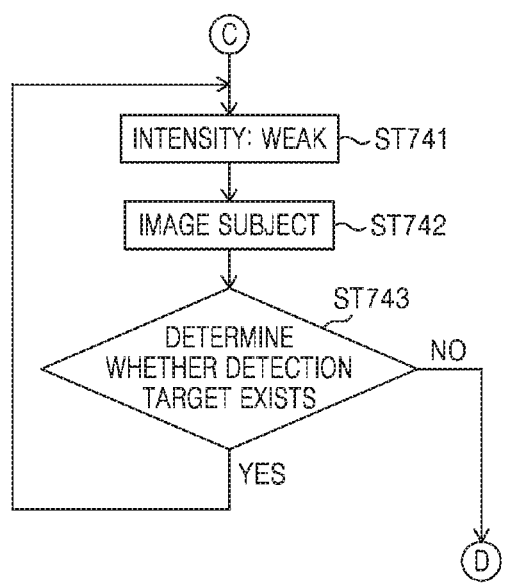
FIG. 42 is a flowchart for explaining an operation of the imaging device according to Embodiment 7.

FIG. 38 illustrates a configuration of the imaging device 10 according to Embodiment 7. The imaging device 10 is configured to image and monitor a subject, and, for example, is provided in an electronic product (e.g., a flat-panel display) installed indoors. In the present embodiment, the imaging device 10 includes the light source 11, the imaging circuitry 12, and the processing circuit 13.

<Light Source>

The light source 11 is configured to illuminate the subject and to be capable of changing a light emission intensity into a plurality of light emission intensities. In the present embodiment, the light source 11 is configured to be capable of changing a light emission intensity into two different light emission intensities (i.e., "strong" and "weak"). For example, the light source 11 may include an LED, or may include a laser diode. Also, light emitted from the light source 11 may be infrared light or visible light.

Also, a light emission amount of the light source 11 may be changed into a plurality of light emission amounts by changing a light emission intensity of the light source 11 into a plurality of light emission intensities. A light emission amount of the light source 11 is a total amount of light emitted from the light source 11 in a predetermined cycle (e.g., a frame cycle needed to obtain one captured image), and corresponds to an amount obtained by integrating a light emission intensity of the light source 11 over time. That is, the light source 11 is configured to be capable of changing a light emission amount.

Also, two different light emission intensities (i.e., "strong" and "weak") of the light source 11 respectively correspond to two different light emission amounts (i.e., "large" and "small") of the light source 11. That is, in the present embodiment, the light source 11 is configured to be capable of changing a light emission amount into two different light emission amounts (i.e., "large" and "small").

The following will be described on the assumption that the light source 11 is configured to be capable of changing a light emission intensity into a plurality of light emission intensities (i.e., a light emission amount of the light source 11 is changed by changing a light emission intensity of the light source 11).

<Imaging Circuitry>

The imaging circuitry 12 is configured to image the subject and obtain a captured image. For example, the imaging circuitry 12 may include a CMOS or a CCD.

<Processing Circuit>

The processing circuit 13 is configured to control each component of the imaging device 10 such as the light source 11 and the imaging circuitry 12. For example, the processing circuit 13 includes a CPU or a memory. Also, in the present embodiment, the processing circuit 13 includes the controller 14, the determiner 15, and a setter 18.

《Controller》

The controller 14 is configured to perform a first operation when a light emission intensity (a light emission amount) to be set for the light source 11 is not determined and perform a second operation when the light emission intensity to be set for the light source 11 is determined. In detail, the controller 14 may be configured to determine whether a light emission intensity registered in the setter 18 (a memory area) exists as a light emission intensity to be set from among a plurality of light emission intensities, and to perform the first operation when the light emission intensity registered in the setter 18 as a light emission intensity to be set does not exist and the second operation when the light emission intensity registered in the setter 18 as a light emission intensity to be set exists.

In the first operation, the controller 14 sequentially changes a light emission intensity of the light source 11 into a plurality of light emission intensities and causes the imaging circuitry 12 to image the subject illuminated by the light source 11 that emits light at the changed light emission intensity. That is, in the first operation, the controller 14 sets a light emission intensity of the light source 11 as a light emission intensity selected from among the plurality of light emission intensities in a pre-determined order, and causes the imaging circuitry 12 to image the subject illuminated by the light source 11 that emits light at the selected light emission intensity. In the second operation, the controller 14 sets a light emission intensity of the light source as a light emission intensity to be set and causes the imaging circuitry 12 to illuminate the subject illuminated by the light source 11 that emits light at the light emission intensity to be set.

In the present embodiment, the controller 14 performs the following processing in the first operation. That is, the controller 14 sets a light emission intensity of the light source 11 as a first light emission intensity (e.g., "strong") and causes the imaging circuitry 12 to image the subject illuminated by the light source 11 that emits light at the first light emission intensity, and then sets a light emission intensity of the light source 11 as a second light emission intensity (e.g., "less") and causes the imaging circuitry 12 to image the subject illuminated by the light source 11 that emits light at the second light emission intensity.

Also, in the present embodiment, the controller 14 performs the following processing in the second operation. That is, when the first light emission intensity (e.g., "strong") is determined as a light emission intensity to be set, the controller 14 sets a light emission intensity of the light source 11 as the first light emission intensity and causes the imaging circuitry 12 to image the subject illuminated by the light source 11 that emits light at the first light emission intensity. When the second light emission intensity (e.g., "less") is determined as a light emission intensity to be set, the controller 14 sets a light emission intensity of the light source 11 as the second light emission intensity and causes the imaging circuitry 12 to image the subject illuminated by the light source 11 that emits light at the second light emission intensity. When both the first and second light emission intensities are determined as light emission intensities to be set, the controller 14 alternately changes a light emission intensity of the light source 11 into the first and second light emission intensities and causes the imaging circuitry 12 to image the subject illuminated by the light source 11 that emits light at the changed light emission intensity.

Also, the first light emission intensity (e.g., "strong") and the second light emission intensity (e.g., "weak") respectively correspond to a first light emission amount (e.g., "large") and a second light emission amount (e.g., "small").

《Determiner》

The determiner 15 is configured to determine whether a detection target exists in a captured image obtained by the imaging circuitry 12. For example, the determiner 15 may be configured to perform whether the detection target exists by using a detection method (a detection method based on machine learning of luminance gradient histogram features) disclosed in Non-Patent Document 1 ("Navneetdalal and Bill Triggs, "Histograms of Oriented Gradients for Human Detection, "Proc. of CVPR 2005, vol. 1, pp. 886-893, 2005"). Also, the determiner 15 is configured to output a detection result to the outside.

《Setter》

The setter 18 is configured to set a light emission intensity (a light emission amount) of the light source 11 during imaging for obtaining a captured image determined by the determiner 15 to include a detection target as a light emission intensity to be set. In detail, the setter 18 may be configured to determine a light emission intensity of the light source 11 during imaging for obtaining the captured image determined by the determiner 15 to include the detection target as a light emission intensity to be set and register the light emission intensity as a light emission intensity to be set in the setter 18 (the memory area).

Also, when it is determined by the determiner 15 that the captured image obtained by the second operation of the controller 14 does not include the detection target, the setter 18 cancels the determining of the light emission intensity (light emission amount) of the light source 11 during imaging for obtaining the captured image as a light emission intensity to be set. In detail, the setter 18 may be configured to cancel the registering of the light emission intensity, of the light source 11 during imaging for obtaining the captured image obtained by the second operation of the controller 14 and determined by the determiner 15 not to include the detection target, (as a light emission intensity to be set) in the setter 18 (the memory area). The setter 18 may include an appropriate logic, circuit, interface, and/or code for the above operation.

<Operation>

Next, an operation of the imaging device 10 according to Embodiment 7 will be described with reference to FIGS. 39, 40, 41, and 42. Also, an operation of FIG. 39 corresponds to an operation (a first operation) performed when both light emission intensities "strong" and "weak" are not determined as light emission intensities to be set. An operation of FIG. 40 corresponds to an operation (a second operation) performed when both the light emission intensities "strong" and "weak" are determined as light emission intensities to be set. An operation of FIG. 41 corresponds to an operation (the second operation) performed when only the light emission intensity "strong" from among the light emission intensities "strong" and "weak" is determined as a light emission intensity to be set. An operation of FIG. 42 corresponds to an operation (the second operation) performed when only the light emission intensity "weak" from among the light emission intensities "strong" and "weak" is determined as a light emission intensity to be set.

《Steps ST711 and ST712》

When both light emission intensities "strong" and "weak" are not determined as light emission intensities to be set, the controller 14 sets a light emission intensity of the light source 11 as "strong". The controller 14 causes the imaging circuitry 12 to image a subject illuminated by the light source 11 whose light emission intensity is set as "strong". In detail, the controller 14 causes the imaging circuitry 12 to image the subject at least one time so that at least one captured image is obtained in a period where the subject is illuminated by the light source 11 whose light emission intensity is set as "strong".

《Step ST713》

Next, the determiner 15 determines whether a detection target exists in the captured image obtained in step ST712. When it is determined that the detection target exists in the captured image, the setter 18 determines the light emission intensity "strong" as a light emission intensity to be set. In detail, the setter 18 registers the light emission intensity "strong" as a light emission intensity to be set in the setter 18 (a memory area). Next, the operation proceeds to step ST714.

When it is determined that the detection target does not exist in the captured image, the setter 18 does not set the light emission intensity "strong" as a light emission intensity to be set. In detail, the setter 18 does not register the light emission intensity "strong" as a light emission intensity to be set in the setter 18 (the memory area). Next, the operation proceeds to step ST717.

《Steps ST714 and ST715》

When it is determined in step ST713 that the detection target exists, the controller 14 sets a light emission intensity of the light source 11 as "weak", and causes the imaging circuitry 12 to image the subject illuminated by the light source 11 whose light emission intensity is set as "weak".

《Step ST716》

Next, the determiner 15 determines whether the detection target exists in the captured image obtained in step ST715. When it is determined that the detection target exists in the captured image, the setter 18 determines the light emission intensity "weak" as a light emission intensity to be set. In detail, the setter 18 registers the light emission intensity "weak" as a light emission intensity to be set in the setter 18 (the memory area). Accordingly, both the light emission intensities "strong" and "weak" are determined as light emission intensities to be set. In detail, both the light emission intensities "strong" and "weak" are registered as light emission intensities to be set in the setter 18 (the memory area). Next, the operation proceeds to step ST721 (see FIG. 40).

When it is determined that the detection target does not exist in the captured image, the setter 18 does not set the light emission intensity "weak" as a light emission intensity to be set. In detail, the setter 18 does not register the light emission intensity "weak" as a light emission intensity to be set in the setter 18 (the memory area). Accordingly, only the light emission intensity "strong" from among the light emission intensities "strong" and "weak" is determined as a light emission intensity to be set. In detail, only the light emission intensity "strong" from among the light emission intensities "strong" and "weak" is registered as a light emission intensity in the setter 18 (the memory area). Next, the operation proceeds to step ST731 (see FIG. 41).

《Steps ST717 and ST718》

When it is determined in step ST713 that the detection target does not exist, the controller 14 sets a light emission intensity of the light source 11 as "weak" and causes the imaging circuitry 12 to image the subject illuminated by the light source 11 whose light emission intensity is set as "weak". In detail, the controller 14 causes the imaging circuitry 12 to image the subject at least one time so that at least one captured image is obtained in a period where the subject is illuminated by the light source 11 whose light emission intensity is set as "weak".

《Step ST719》

Next, the determiner 15 determines whether the detection target exists in the captured image obtained in step ST718. When it is determined that the detection target exists in the captured image, the setter 18 determines the light emission intensity "weak" as a light emission intensity to be set. Accordingly, only the light emission intensity "weak" from among the light emission intensities "strong" and "weak" is determined as a light emission intensity to be set. In detail, only the light emission intensity "weak" from among the light emission intensities "strong" and "weak" is registered as a light emission intensity to be set in the setter 18 (the memory area). Next, the operation proceeds to step ST741 (see FIG. 42).

When it is determined that the detection target does not exist in the captured image, the setter 18 does not determine the light emission intensity "weak" as a light emission intensity to be set. Accordingly, both the light emission intensities "strong" and "weak" are not determined as light emission intensities to be set. In detail, both the light emission intensities "strong" and "weak" are not registered as light emission intensities to be set in the setter 18 (the memory area). Next, the operation proceeds to step ST711.

《Steps ST721 and ST722》

When both the light emission intensities "strong" and "weak" are determined as light emission intensities to be set, the controller 14 sets a light emission intensity of the light source 11 as "strong", and causes the imaging circuitry 12 to image the subject illuminated by the light source 11 whose light emission intensity is set as "strong".

《Step ST723》

Next, the determiner 15 determines whether the detection target exists in the captured image obtained in step ST722. When it is determined that the detection target exists in the captured image, the setter 18 maintains the determining of the light emission intensity "strong" as a light emission intensity to be set. In detail, the setter 18 maintains the registering of the light emission intensity "strong" (as a light emission intensity to be set) in the setter 18 (the memory area). Next, the operation proceeds to step ST724.

When it is determined that the detection target does not exist in the captured image, the setter 18 cancels the determining of the light emission intensity "strong" as a light emission intensity to be set. In detail, the setter 18 cancels the registering of the light emission intensity "strong" (as a light emission intensity to be set) in the setter 18 (the memory area). Next, the operation proceeds to step ST727.

《Steps ST724 and ST725》

When it is determined in step ST723 that the detection target exists, the controller 14 sets a light emission intensity of the light source 11 as "weak", and causes the imaging circuitry 12 to image the subject illuminated by the light source 11 whose light emission intensity is set as "weak".

《Step ST726》

Next, the determiner 15 determines whether the detection target exists in the captured image obtained in step ST725. When it is determined that the detection target exists in the captured image, the setter 18 maintains the determining of the light emission intensity "weak" as a light emission intensity to be set. In detail, the setter 18 maintains the registering of the light emission intensity "weak" (as a light emission intensity to be set) in the setter 18 (the memory area). Accordingly, a state where both the light emission intensities "strong" and "weak" are determined as light emission intensities to be set is maintained. In detail, a state where both the light emission intensities "strong" and "weak" are registered as light emission intensities to be set in the setter 18 (the memory area) is maintained. Next, the operation proceeds to step ST721.

When it is determined that the detection target does not exist in the captured image, the setter 18 cancels the determining of the light emission intensity "weak" as a light emission intensity to be set. In detail, the setter 18 cancels the registering of the light emission intensity "weak" (as a light emission intensity to be set) in the setter 18 (the memory area). Accordingly, only the light emission intensity "strong" from among the light emission intensities "strong" and "weak" is determined as a light emission intensity to be set. In detail, only the light emission intensity "strong" from among the light emission intensities "strong" and "weak" is registered as a light emission intensity to be set in the setter 18 (the memory area). Next, the operation proceeds to step ST731 (see FIG. 41).

⟨Steps ST727 and ST728⟩

When it is determined in step ST723 that the detection target does not exist, the controller 14 sets a light emission intensity of the light source 11 as "weak", and causes the imaging circuitry 12 to image the subject illuminated by the light source 11 whose light emission intensity is set as "weak".

⟨Step ST729⟩

Next, the determiner 15 determines whether the detection target exists in the captured image obtained in step ST728. When it is determined that the detection target exists in the captured image, the setter 18 maintains the determining of the light emission intensity "weak" as a light emission intensity to be set. Accordingly, only the light emission intensity "weak" from among the light emission intensities "strong" and "weak" is determined as a light emission intensity to be set. In detail, only the light emission intensity "weak" from among the light emission intensities "strong" and "weak" is registered as a light emission intensity to be set in the setter 18 (the memory area). Next, the operation proceeds to step ST741 (see FIG. 42).

When it is determined that the detection target does not exist in the captured image, the setter 18 cancels the determining of the light emission intensity "weak" as a light emission intensity to be set. Accordingly, both the light emission intensities "strong" and "weak" are not determined as light emission intensities to be set. In detail, both the light emission intensities "strong" and "weak" are not registered as light emission intensities to be set in the setter 18 (the memory area). The operation proceeds to step ST711 (see FIG. 39).

⟨Steps ST731 and ST732⟩

When it is determined that only the light emission intensity "strong" from among the light emission intensities "strong" and "weak" is determined as a light emission intensity to be set, the controller 14 sets a light emission intensity of the light source 11 as "strong" and causes the imaging circuitry 12 to image the subject illuminated by the light source 11 whose light emission intensity is set as "strong".

⟨Step ST733⟩

Next, the determiner 15 determines whether the detection target exists in the captured image obtained in step ST732. When it is determined that the detection target exist in the captured image, the setter 18 maintains the determining of the light emission intensity "strong" as a light emission intensity to be set. Accordingly, a state where only the light emission intensity "strong" from among the light emission intensities "strong" and "weak" is determined as a light emission intensity to be set is maintained. Next, the operation proceeds to step ST731.

When it is determined that the detection target does not exist in the captured image, the setter 18 cancels the determining of the light emission intensity "strong" as a light emission intensity to be set. Accordingly, both the light emission intensities "strong" and "weak" are not determined as light emission intensities to be set. Next, the operation proceeds to step ST711 (see FIG. 39).

⟨Steps ST741 and ST742⟩

When only the light emission intensity "weak" from among the light emission intensities "strong" and "weak" is determined as a light emission intensity to be set, the controller 14 sets a light emission intensity of the light source 11 as "weak", and causes the imaging circuitry 12 to image the subject illuminated by the light source 11 whose light emission intensity is set as "weak".

⟨Step ST743⟩

Next, the determiner 15 determines whether the detection target exists in the captured image obtained in step ST742. When it is determined that the detection target exists in the captured image, the setter 18 maintains the determining of the light emission intensity "weak" as a light emission intensity to be set. Accordingly, a state where only the light emission intensity "weak" from among the light emission intensities "strong" and "weak" is determined as a light emission intensity to be set is maintained. Next, the operation proceeds to step ST741.

When it is determined that the detection target does not exist in the captured image, the setter 18 cancels the determining of the light emission intensity "weak" as a light emission intensity to be set. Accordingly, both the light emission intensities "strong" and "weak" are not determined as light emission intensities to be set. Next, the operation proceeds to step ST711 (see FIG. 39).

Effect of Embodiment 7

As described above, when a light emission intensity (a light emission amount) to be set for the light source 11 is not determined, since a first operation in which a light emission intensity is sequentially changed into a plurality of light emission intensities and a captured image is obtained by imaging a subject illuminated by the light source 11 that emits light at the changed light emission intensity (i.e., the first operation in which a light emission intensity of the light source 11 is set as a light emission intensity selected from among the plurality of light emission intensities in a predetermined order and the imaging circuitry 12 images the subject illuminated by the light source 11 that emits light at the selected light emission intensity) is performed, it is determined whether a detection target exists in the obtained captured image, and a light emission intensity of the light source 11 during imaging for obtaining the captured image determined to include the detection target is determined as a light emission intensity to be set, a light emission intensity (a light emission amount) suitable to determine whether the detection target exists may be determined.

When the light emission intensity (the light emission amount) to be set for the light source 11 is determined, since a second operation in which a light emission intensity of the light source 11 is set as a light emission intensity to be set and a captured image is obtained by imaging the subject illuminated by the light source 11 that emits light at the light emission intensity to be set is performed, the subject may be imaged at a light emission intensity (a light emission amount) suitable to determine whether the detection target exists.

Also, when it is determined by the determiner 15 that the captured image obtained by the second operation of the controller 14 does not include the detection target, since the determining of the light emission intensity (the light emission amount) of the light source 11 during imaging for obtaining the captured image as a light emission intensity to be set is canceled, the imaging at a light emission intensity (a light emission amount) not suitable to determine whether the detection target exists may be stopped.

Embodiment 8

An operation of the imaging device 10 according to Embodiment 8 is different from an operation of the imaging device 10 according to Embodiment 1. Also, the light source 11 is configured to be capable of changing a light emission intensity into two or more light emission intensities. That is, the light source 11 is configured to be capable of changing a light emission amount into two or more light emission amounts. Other elements of Embodiment 8 are the same as those of Embodiment 7.

<Operation>

Figure 43:
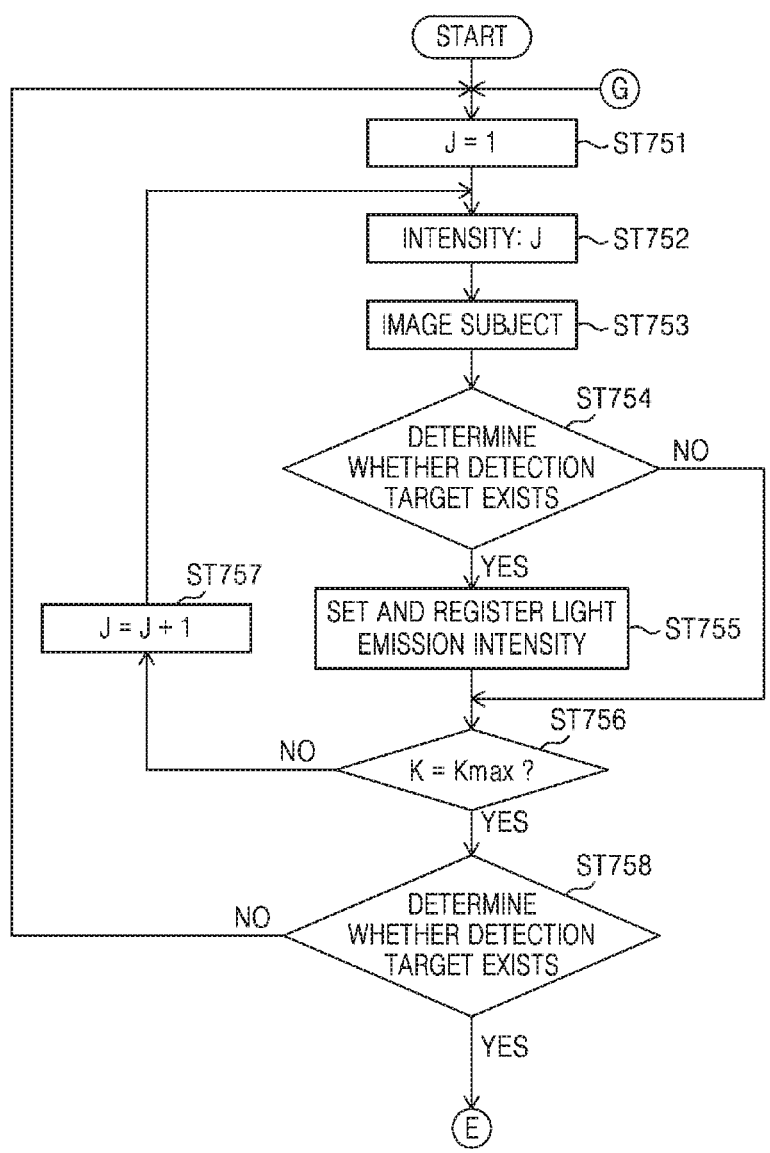
FIG. 43 is a flowchart for explaining an operation of the imaging device according to Embodiment 8.
Figure 44:
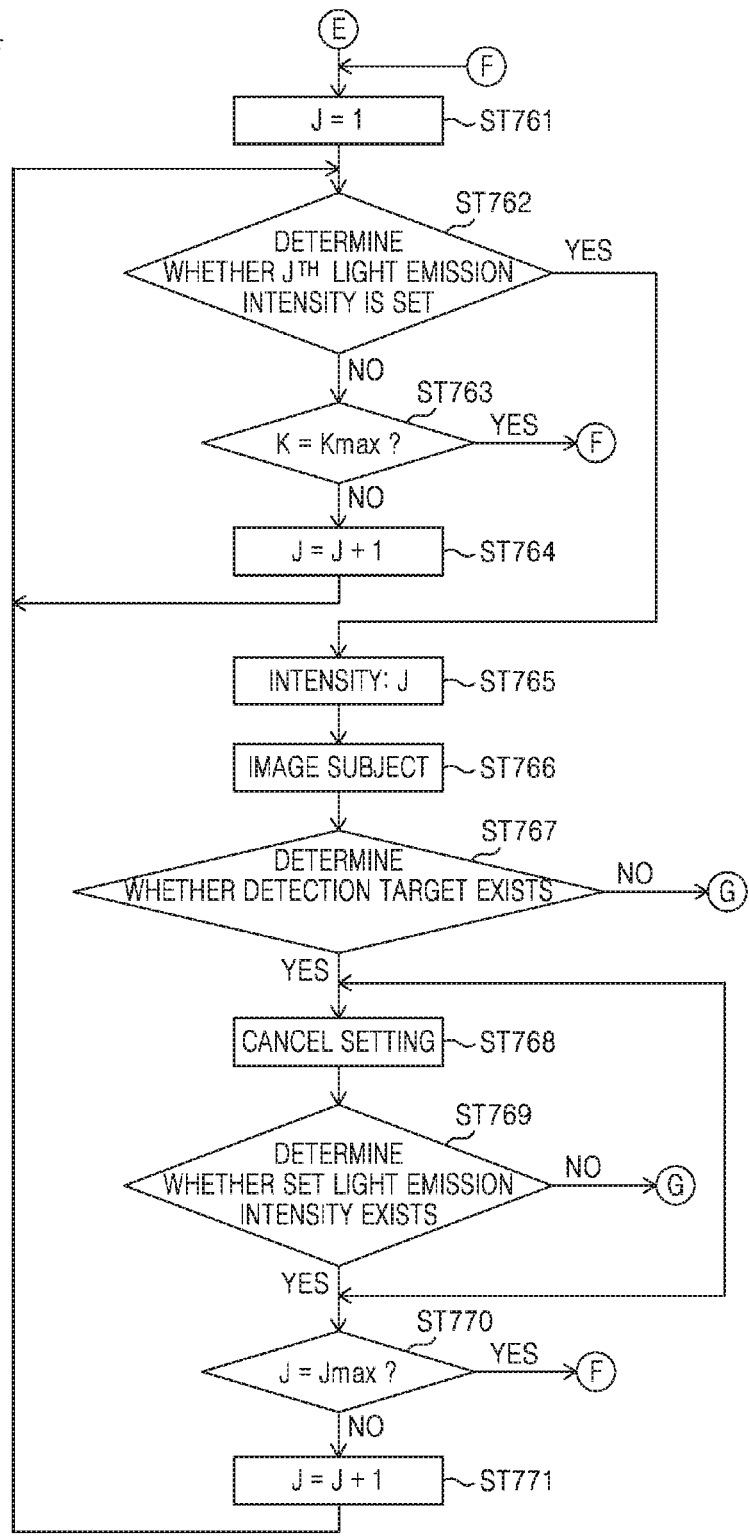
FIG. 44 is a flowchart for explaining an operation of the imaging device according to Embodiment 8.

Next, an operation of the imaging device 10 according to Embodiment 8 will be described with reference to FIGS. 43 and 44. Also, an operation of FIG. 43 corresponds to an operation (a first operation) performed when a light emission intensity to be set for the light source 11 is not determined. An operation of FIG. 44 corresponds to an operation (a second operation) performed when a light emission intensity to be set for the light source 11 is determined. Also, in the following description, a variable J is an integer equal to or greater than 1 and equal to or less than an upper limit Jmax, and indicates a number (e.g., a number indicating a level of a light emission intensity) of a light emission intensity to be processed. The upper limit Jmax is an integer equal to or greater than 2, and corresponds to the number (e.g., the number of light emission intensity changeable levels) of settable light emission intensities of the light source 11.

《Step ST751》

When a light emission intensity to be set for the light source 11 is not determined, the controller 14 sets the variable J to 1. That is, the controller 14 selects a first light emission intensity as an object to be processed this time.

《Steps ST752 and ST753》

Next, the controller 14 sets a light emission intensity of the light source 11 as a $J^{th}$ light emission intensity. The controller 14 causes the imaging circuitry 12 to image a subject illuminated by the light source 11 whose light emission intensity is set as the $J^{th}$ light emission intensity. In detail, the controller 14 causes the imaging circuitry 12 to image the subject at least one time so that at least one captured image is obtained in a period where the subject is illuminated by the light source 11 whose light emission intensity is set as the $J^{th}$ light emission intensity.

《Step ST754》

Next, the determiner 15 determines whether a detection target exists in the captured image obtained in step ST753. When it is determined that the detection target exists in the captured image, the operation proceeds to step ST755, and otherwise, the operation proceeds to step ST756.

《Step ST755》

Next, the setter 18 determines the light emission intensity (i.e., the $J^{th}$ light emission intensity set in step ST752 as a light emission intensity of the light source 11) of the light source 11 during imaging for obtaining the captured image determined in step ST754 to include the detection target as a light emission intensity to be set. In detail, the setter 18 registers the $J^{th}$ light emission intensity as a light emission intensity to be set in the setter 18 (a memory area). Next, the operation proceeds to step ST756.

《Step ST756》

Next, the controller 14 determines whether the variable J reaches the upper limit Jmax. That is, the controller 14 determines whether a light emission intensity not selected as an object to be processed from among a plurality of light emission intensities remains. When the variable J does not reach the upper limit Jmax, the operation proceeds to step ST757, and when the variable K reaches the upper limit Jmax, the operation proceeds to step ST758.

《Step ST757》

When it is determined in step ST756 that the variable J does not reach the upper limit Jmax, the operation proceeds to step ST757. In step ST757, the controller 14 adds 1 to the variable J. That is, the controller 14 selects a light emission intensity not selected yet from among the plurality of light emission intensities as an object to be processed next time. Next, the operation proceeds to step ST752.

《Step ST758》

When it is determined in step ST756 that the variable J reaches the upper limit Jmax, the controller 14 determines whether a light emission intensity to be set for the light source 11 is determined. In detail, the controller 14 determines whether a light emission intensity registered in the setter 18 (the memory area) exists as a light emission intensity to be set from among the plurality of light emission intensities. When a light emission intensity to be set is determined, the operation proceeds to step ST761, and otherwise, the operation proceeds to step ST751.

《Step ST761》

When a light emission intensity to be set for the light source 11 is determined, the controller 14 sets the variable J to 1. That is, the controller 14 selects a first light emission intensity as an object to be processed this time.

《Step ST762》

Next, the controller 14 determines whether a $J^{th}$ light emission intensity (i.e., a light emission intensity to be processed this time) is determined as a light emission intensity to be set. When the $J^{th}$ light emission intensity is not determined as a light emission intensity to be set, the operation proceeds to step ST763, and when the $J^{th}$ light emission intensity is determined as a light emission intensity to be set, the operation proceeds to step ST765.

《Step ST763》

Next, the controller 14 determines whether the variable J reaches the upper limit Jmax. When the variable J does not reach the upper limit Jmax, the operation proceeds to step ST764, and when the variable J reaches the upper limit Jmax, the operation proceeds to step ST761.

《Step ST764》

When it is determined in step ST763 that the variable J does not reach the upper limit Jmax, the controller 14 adds 1 to the variable J. Next, the operation proceeds to step ST762.

《Steps ST765 and ST766》

When it is determined in step ST762 that the $J^{th}$ light emission intensity is determined as a light emission intensity to be set, the controller 14 sets a light emission intensity of the light source 11 as the $J^{th}$ light emission intensity. The controller 14 causes the imaging circuitry 12 to image the subject illuminated by the light source 11 whose light emission intensity is set as the $J^{th}$ light emission intensity.

《Step ST767》

Next, the determiner 15 determines whether the detection target exists in the captured image obtained in step ST766. When it is determined that the detection target does not exist in the captured image, the operation proceeds to step ST768, and when it is determined that the detection target exists in the captured image, the operation proceeds to step ST770.

《Step ST768》

Next, the setter 18 cancels the determining of the light emission intensity (the $J^{th}$ light emission intensity set in step ST765 as a light emission intensity of the light source) of the light source 11 during imaging for obtaining the captured image determined in step ST767 to include the detection target as a light emission intensity to be set. In detail, the setter 18 cancels the registering of the $J^{th}$ light emission intensity (as a light emission intensity to be set) in the setter 18 (the memory area). Next, the operation proceeds to step ST769.

《Step ST769》

Next, the controller 14 determines whether a light emission intensity to be set for the light source 11 is determined. When a light emission intensity to be set is determined, the operation proceeds to step ST770, and otherwise, the operation proceeds to step ST751.

《Steps ST770 and ST771》

When a light emission intensity to be set for the light source 11 is determined in step ST769, the controller 14 determines whether the variable J reaches the upper limit Jmax. When the variable J does not reach the upper limit Jmax, the controller 14 adds 1 to the variable J. Next, the operation proceeds to step ST762. When the variable J reaches the upper limit Jmax, the operation proceeds to step ST761.

Effect of Embodiment 8

Even in the above configuration, like in Embodiment 7, when a light emission intensity (a light emission amount) to be set for the light source 11 is not determined, a light emission intensity (a light emission amount) suitable to determine whether a detection target exists may be determined, and when the light emission intensity (the light emission amount) to be set for the light source 11 is determined, a subject may be imaged at the light emission intensity (the light emission amount) suitable to determine whether the detection target exists.

Also, like in Embodiment 7, when it is determined by the determiner 15 that a captured image obtained by a second operation of the controller 14 does not include the detection target, since determining of a light emission intensity (a light emission amount) of the light source 11 during imaging for obtaining the captured image as a light emission intensity to be set is canceled, imaging at a light emission intensity (a light emission amount) not suitable to determine whether the detection target exists may be stopped.

Overview of Embodiments 7 and 8

Also, in the above description, the determiner 15 may be configured to perform detection processing (determine whether a detection target exists) based on a plurality of captured images that are continuous (or discrete) in time series. In this case, it is preferable that the determiner 15 is configured to classify the plurality of captured images obtained by the imaging circuitry 12 into light emission intensities (light emission amounts) of the light source 11 during imaging for obtaining the captured images, and determine whether the detection target exists based on a plurality of captured images belonging to each of the light emission intensities. In this configuration, it may be determined whether the detection target exists based on the plurality of captured images per light emission intensity (light emission amount), and a light emission intensity (a light emission amount) suitable to determine whether the detection target exists may be determined based on a determination result.

Also, in the above description, the detection target of the determiner 15 is not limited to a human, and for example, may be a motion of a moving body.

Also, in the above description, although the controller 14, the determiner 15, and the setter 18 are included in one processing circuit 13, the controller 14, the determiner 5, and the setter 18 may be distributed in two or more processing circuits.

Also, in the above description, although the light source 11 is configured to be capable of changing a light emission intensity (i.e., a light emission amount of the light source 11 is changed by changing a light emission intensity of the light source 11), the light source 11 may be configured to be capable of changing a light emission duty ratio into a plurality of light emission duty ratios. The light emission duty ratio is a ratio of a turn-on period (a period where the light source 11 is turned on) in a predetermined cycle (e.g., a frame cycle needed to obtain one captured image). Even in this configuration, a light emission amount of the light source 11 may be changed by changing a light emission duty ratio of the light source 11.

Embodiment 9

Figure 45:
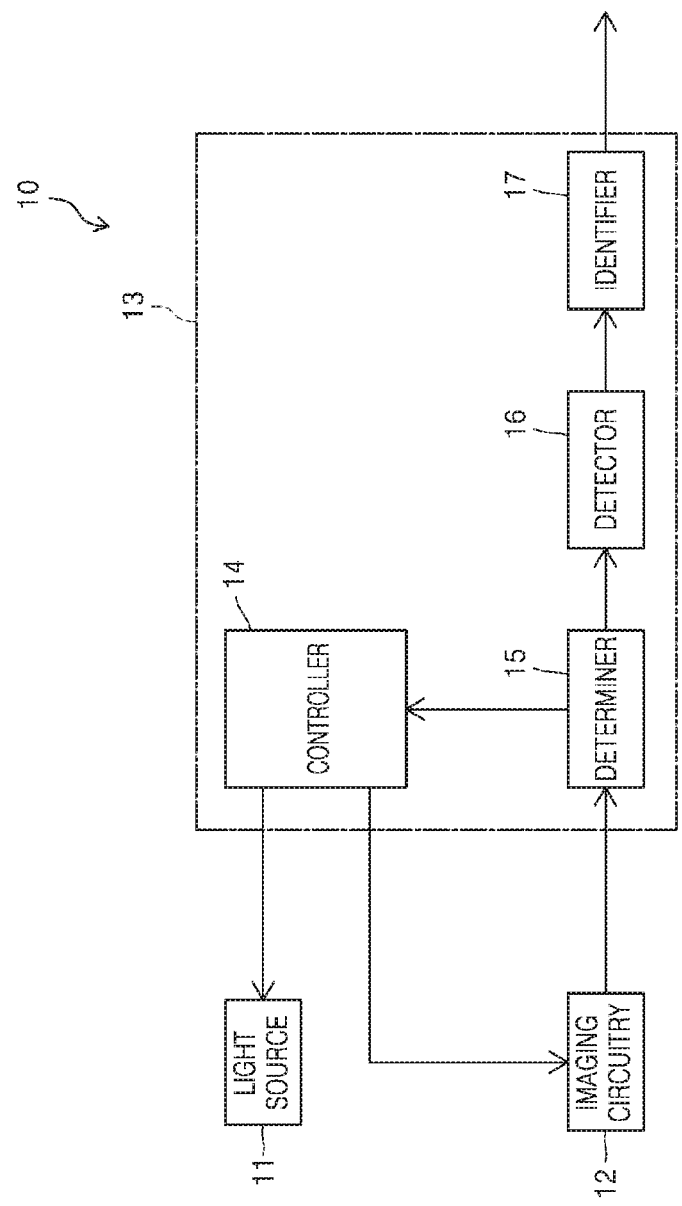
FIG. 45 is a block diagram illustrating a configuration of the imaging device according to Embodiment 9.

FIG. 45 illustrates a configuration of the imaging device 10 according to Embodiment 9. The imaging device 10 is configured to image and monitor a subject, and, for example, is provided in an electronic product (e.g., a flat-panel display) installed indoors. In the present embodiment, the imaging device 10 includes the light source 11, the imaging circuitry 12, and the processing circuit 13.

<Light Source>

The light source 11 is configured to illuminate the subject. Also, the light source 11 is configured to be capable of changing a light emission amount. In detail, the light source 11 is configured to be capable of changing at least one of a light emission intensity and a light emission duty ratio. The light emission amount is a total amount of light emitted from the light source 11 in a predetermined cycle (e.g., a frame cycle needed to obtain one captured image), and corresponds to an amount obtained by integrating a light emission intensity of the light source 11 over time. The light emission duty ratio is a ratio of a turn-on period (a period where the light source 11 is turned on) in the predetermined cycle. For example, the light source 11 may include an LED, or a laser diode. Also, light emitted from the light source 11 may be infrared light or visible light.

In the present embodiment, the light source 11 is configured to be capable of changing a light emission amount into two different light emission amounts (a first light emission amount and a second light emission amount less than the first light emission amount). In detail, the light source 11 may be configured to be capable of changing a light emission intensity into two different light emission intensities (a first light emission intensity and a second light emission intensity weaker than the first light emission intensity). Alternatively, the light source 11 may be configured to be capable of changing a light emission duty ratio into two different light emission duty ratios (a first light emission duty ratio and a second light emission duty ratio less than the first light emission duty ratio).

<Imaging Circuitry>

The imaging circuitry 12 is configured to image the subject and obtain a captured image. Also, the imaging circuitry 12 is configured to be capable of changing an exposure time. In detail, the imaging circuitry 12 is configured to be capable of changing an exposure time into two different exposure times (a first exposure time and a second exposure time longer than the first exposure time). For example, the imaging circuitry 12 may include a CMOS or a CCD. Also, the imaging circuitry 12 may be configured to be driven by a rolling shutter method, or may be configured to be driven by a global shutter method.

<Processing Circuit>

The processing circuit 13 is configured to control each component of the imaging device 10 such as the light source 11 and the imaging circuitry 12. For example, the processing circuit 13 includes a CPU or a memory. Also, in the present embodiment, the processing circuit 13 includes the controller 14, the determiner 15, the detector 16, and the identifier 17.

《Controller》

The controller 14 is configured to cause the light source 11 to emit light and the imaging circuitry 12 to image the subject (the subject illuminated by the light source 11). Also, the controller 14 is configured to change a light emission amount of the light source 11 and an exposure time of the imaging circuitry 12 according to a determination result of the determiner 15.

《Determiner》

The determiner 15 is configured to determine whether a detection object (e.g., a motion) exists in the captured image obtained by the imaging circuitry 12.

《Detector》

The detector 16 is configured to detect a pre-determined object (e.g., a face of a human) from the captured image determined by the determiner 15 to include the detection target. For example, the detector 16 may be configured to perform object detection processing (human detection processing in the present embodiment) by using a detection method (a detection method based on machine learning of luminance gradient histogram features) disclosed in Non-Patent Document 1 ("Navneetdalal and Bill Triggs, "Histograms of Oriented Gradients for Human Detection, "Proc. of CVPR 2005, vol. 1, pp. 886-893, 2005").

《Identifier》

The identifier 17 is configured to extract an object area from the captured image obtained by the imaging circuitry 12, and identify an object by combining the object area with a combination image that is pre-registered. Also, the object area is an area (an image area) that is a part of the captured image and includes the object detected by the detector 16. For example, the object is a face of a human and the combination image is a face image including the face of the human, and the identifier 17 performs personal identification by combining the face of the human included in the object area with a face of a human that is pre-registered. Also, the identifier 17 is configured to output an identification result to the outside.

For example, the identifier 17 may be configured to extract the object area by using a method (a method according to comparison of luminance distributions) disclosed in Non-Patent Document 2 ("Paul Viola and Michael Jones, "Rapid Object Detection using a Boosted Cascade of Simple Features, "Proc. of CVPR2001, vol. 1, pp. 511-518, 2001"). Also, the identifier 17 may be configured to perform combination processing (combine the object area with the combination image) by using a support vector machine or a mutual subspace method.

<Operation>

Figure 46:
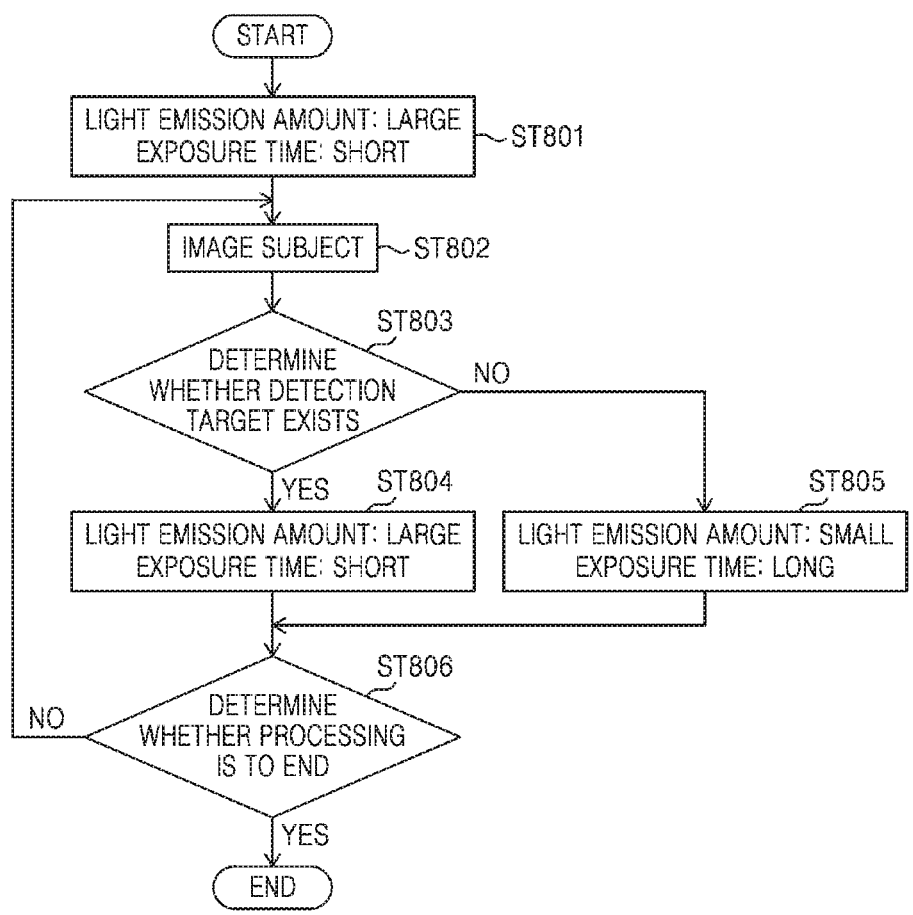
FIG. 46 is a flowchart for explaining an operation of the imaging device according to Embodiment 9.

Next, an operation of the imaging device 10 according to Embodiment 9 will be described with reference to FIG. 46.

《Step ST801》

First, the controller 14 sets a light emission amount of the light source 11 as a first light emission amount (i.e., "large"), and sets an exposure time of the imaging circuitry 12 as a first exposure time (i.e., "short").

《Step ST802》

Next, the controller 14 causes the light source 11 to emit light at a preset light emission amount (in detail, a light emission amount set in steps ST801, ST804, and ST805). Also, the controller 14 causes the imaging circuitry 12 to image a subject (a subject illuminated by the light source 11) by exposing the imaging circuitry 12 at a preset exposure time (in detail, an exposure time set in steps ST801, ST804, and ST805).

For example, the controller 14 causes the imaging circuitry 12 to continuously image the subject N times so that a captured image sequence including N (N is an integer equal to or greater than 2) captured images that are continuous in time series is obtained in a period where the light source 11 emits light at the preset light emission amount.

《Step ST803》

Next, the determiner 15 determines whether a detection target exists in the captured image obtained in step ST803. When it is determined that the detection target exists in the captured image, the operation proceeds to step ST804, and otherwise, the operation proceeds to step ST805.

For example, the determiner 15 calculates N−1 differential images from the N captured images constituting the captured image sequence obtained in step ST803. Also, an $X^{th}$ (X is an integer equal to or greater than 1 and equal to or less than N−1) corresponds to a differential image between a captured image at an $X^{th}$ position in time series and a captured image at an $(X+1)^{th}$ position in the time series from among the N captured images constituting the captured image sequence. Next, the determiner 15 calculates a differential average image (an image indicating an average value of N−1 pixel values) by averaging pixel values of the N−1 differential images for each pixel. When a percentage (a proportion to a total number of pixels included in the differential average image) of the number of pixel values greater than a pre-determined differential threshold value from among a plurality of pixel values included in the differential average image is greater than a pre-determined percentage threshold value, it is determined that a motion (a detection target) exists in the captured image. Otherwise, it is determined that the motion (the detection target) does not exist in the captured image. Also, the differential threshold value and the percentage threshold value are respectively set as a pixel value and a percentage when it is assumed that the motion exists.

《Step ST804》

When it is determined in step ST105 that the detection target exists, the controller 14 sets a light emission amount of the light source 11 as the first light emission amount (i.e., "large") and sets an exposure time of the imaging circuitry 12 as the first exposure time (i.e., "short"). Next, the operation proceeds to step ST806.

《Step ST805》

When it is determined in step ST105 that the detection target does not exist, the controller 14 sets a light emission amount of the light source as a second light emission amount (i.e., "small"), and sets an exposure time of the imaging circuitry 12 as a second exposure time (i.e., "long"). Next, the operation proceeds to step ST806.

《Step ST806》

Next, when processing is to end, the processing ends, and when the processing is to continue, the operation proceeds to step ST805.

As such, the controller 14 is configured to, when it is determined by the determiner 15 that the detection target exists, set a light emission amount of the light source 11 as the first light emission amount and set an exposure time of the imaging circuitry 12 as the first exposure time, and when it is determined by the determiner 15 that the detection target exists, set a light emission amount of the light source 11 as a second light emission intensity (a light emission amount less than the first light emission amount) and set an exposure time of the imaging circuitry 12 as the second exposure time (an exposure time longer than the first exposure time).

<Relationship Among Brightness of Captured Image, Light Emission Amount of Light Source, and Exposure Time of Imaging Circuitry>

A brightness (a luminance value) of a captured image depends on a light emission amount of the light source 11 and an exposure time of the imaging circuitry 12. In detail, as a light emission amount of the light source 11 increases, a brightness of the captured image tends to increase. As a light emission amount of the light source 11 decreases, a brightness of the captured image tends to decrease. Also, as an exposure time of the imaging circuitry 12 increases, a brightness of the captured image tends to increase. As an exposure time of the imaging circuitry 12 decreases, a brightness of the captured image tends to decrease.

Effect of Embodiment 9

As described above, when it is determined by the determiner 15 that a detection target exists, since a light emission amount of the light source 11 is set as a first light emission amount and an exposure time of the imaging circuitry 12 is set as a first exposure time, imaging of a subject by the imaging circuitry 12 may be more rapidly performed than when a light emission amount of the light source 11 is always set as a second light emission amount (a light emission amount less than the first light emission amount) and an exposure time of the imaging circuitry 12 is always set as a second exposure time (an exposure time longer than the first exposure time).

Also, when it is determined by the determiner that the detection target does not exist, since a light emission amount of the light source 11 is set as the second light emission amount (a light emission amount less than the first light emission amount) and an exposure time of the imaging circuitry 12 is set as the second exposure time (an exposure time longer than the first exposure time), a light emission amount of the light source 11 may be reduced and an exposure time of the imaging circuitry 12 may be increased more than when it is determined by the determiner 15 that the detection target exists (i.e., when a light emission amount of the light source 11 is set as the first light emission amount and an exposure time of the imaging circuitry 12 is set as the first exposure time). Accordingly, power consumption of the light source 11 may be reduced. Also, since an exposure time of the imaging circuitry 12 is increased by reducing a light emission amount of the light source 11, a reduction in a brightness of a captured image due to a reduction in a light emission amount of the light source 11 may be compensated.

Overview of Embodiment 9

In the above description, although a light emission amount of the light source 11 is set as a first light emission amount (i.e., "large") and an exposure time of the imaging circuitry 12 is set as a first exposure time (i.e., "short") in step ST801, the controller 14 may be configured to set a light emission amount of the light source 11 as a second light emission amount (i.e., "small") and set an exposure time of the imaging circuitry 12 as a second exposure time (i.e., "long") in step ST801.

Also, in the above description, although the controller 14, the determiner 15, the detector 16, and the identifier 17 are included in one processing circuit 13, the controller 14, the determiner 15, the detector 16, and the identifier 17 may be distributed in two or more processing circuits.

Embodiment 10

Figure 47:
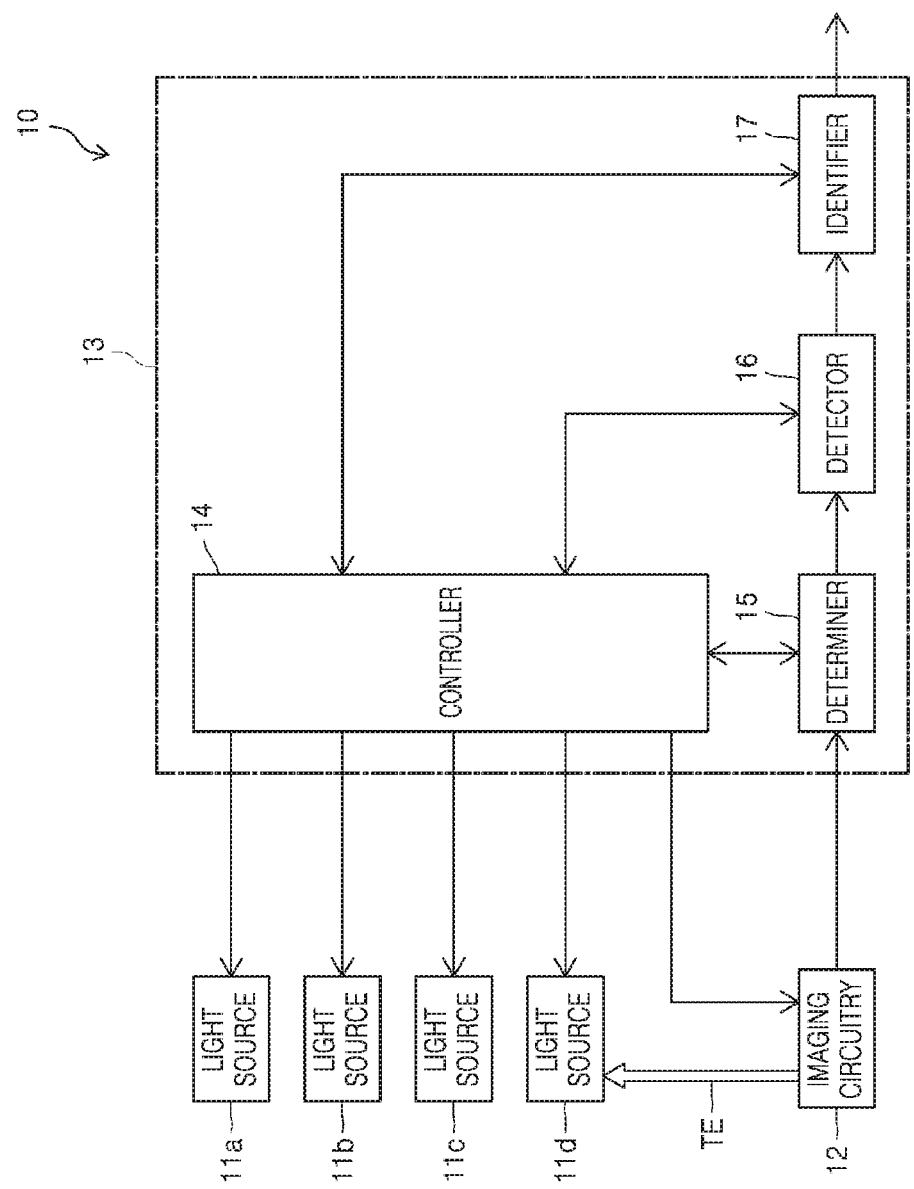
FIG. 47 is a block diagram illustrating a configuration of the imaging device according to Embodiment 10.

FIG. 47 illustrates a configuration of the imaging device 10 according to Embodiment 10. The imaging device 10 according to Embodiment 10 has the same configuration as that of the imaging device 10 according to Embodiment 4. Also, the imaging device 10 according to Embodiment 10 may perform the same operation as that of the imaging device 10 according to any of Embodiments 1 through 4. Also, in Embodiment 10, the imaging circuitry 12, the controller 14, the determiner 15, the detector 16, and the identifier 17 are configured as follows.

The imaging circuitry 12 is configured to be driven by a rolling shutter method. In detail, the imaging circuitry 12 has a light receiving surface (not shown) on which a plurality of light sources are arranged in a matrix and is configured so that n lines are exposed sequentially from a line of a first row (a line including two or more light sensors arranged in a row direction) that is a leading line to a line of an $n^{th}$ row (N is an integer equal to or greater than 2) that is a final line.

In light emission control, the controller 14 causes the light source 11 to emit light so that a period where the light-emitting light source 11 is turned on and a period where the light-emitting light source 11 is turned off from among the plurality of light sources 11a through 11d exist in a period other than a period where all lines of the imaging circuitry 12 are simultaneously exposed.

The determiner 15 is configured to determine whether a detection target exists in an image area that is a part of the captured image 20 obtained by the imaging circuitry 12, and corresponds to the light source 11 that emits light during imaging for obtaining the captured image 20 and corresponds to a period where the light source 11 is turned on.

The detector 16 is configured to detect the pre-determined object 100 (a human in the present embodiment) from the captured image including the image area determined by the determiner 15 to include the detection target.

The identifier 17 is configured to extract the object area 40 (an area that is a part of the captured image 20 and includes the object 100 detected by the detector 16) from the captured image 20 and identify the object 100 by combining the object area 40 with a combination image that is pre-registered.

<Corresponding Relationship Among Light Source, Imaging Circuitry, Captured Image 20>

Figure 48:
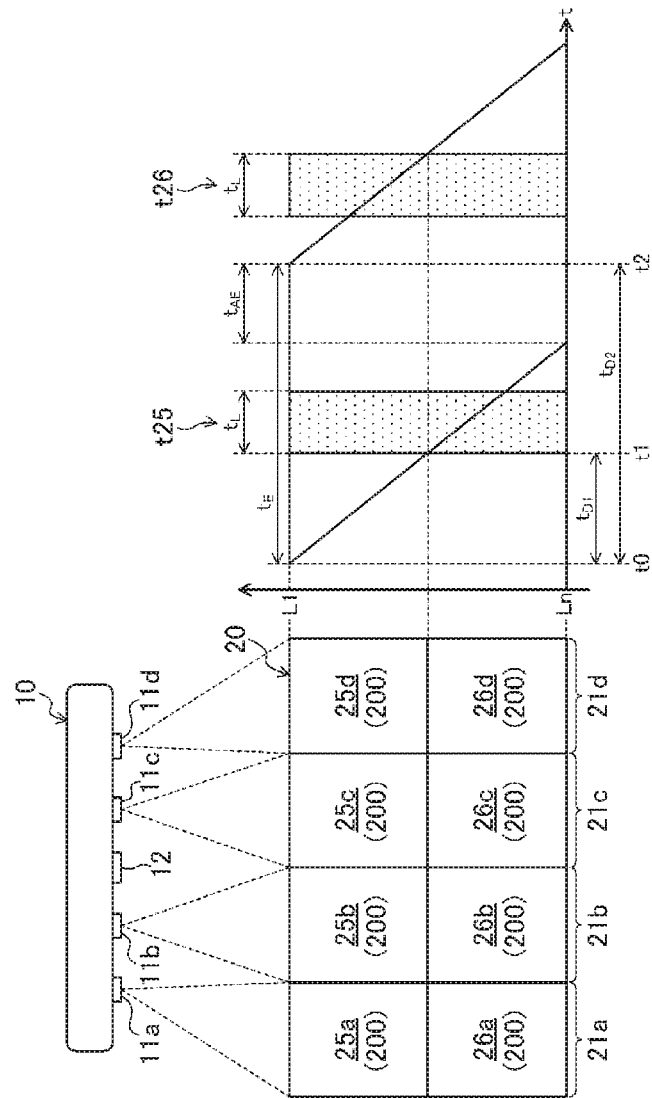
FIG. 48 is a conceptual diagram for explaining a corresponding relationship among the light source, an imaging circuitry, and a captured image in Embodiment 10.

A relationship among the light source 11, the imaging circuitry 12, and the captured image 20 will be described with reference to FIG. 48.

The imaging circuitry 12 is provided so that a row direction of light sensors arranged in a matrix on a light receiving surface is a first direction (e.g., a horizontal direction) and a column direction of the light sensors is a second direction (e.g., a vertical direction) perpendicular to the first direction. A plurality of light sources 11 (four light sources 11a through 11d in the present embodiment) are provided in parallel in the first direction (e.g., the horizontal direction), and are configured to separately illuminate a subject facing the light receiving surface of the imaging circuitry 12. Also, each of the plurality of light sources 11 is configured to be capable of changing a turn-on period into a plurality of turn-on periods $t_L$ (two turn-on periods t25 and t26 in the present embodiment).

A plurality of image areas (eight image areas 25a through 25d and 26a through 26d arranged in two rows and four columns in the present embodiment) arranged in a matrix are included in the captured image 20. In the following description, the image areas 25a through 25d and 26a through 26d are collectively referred to as "image areas 200". The plurality of light sources 11 respectively correspond to a plurality of image area columns (two or more image areas 200 arranged in the column direction) and a plurality of turn-on periods $t_L$ respectively correspond to a plurality of image area rows (two or more image areas 200 arranged in the row direction).

Also, the plurality of image area rows respectively correspond to a plurality of line groups (line groups each including two or more continuous lines) of the imaging circuitry 12. That is, each image area row includes a part of the subject imaged by a line group of the imaging circuitry 12 corresponding to the image area row. Also, the plurality of turn-on periods $t_L$ respectively correspond to the plurality of image area rows. Accordingly, the plurality of turn-on periods $t_L$ respectively correspond to the plurality of line groups of the imaging circuitry 12. Each turn-on period $t_L$ is set to overlap the exposure period $t_E$ of a line group of the imaging circuitry 12 corresponding to the turn-on period $t_L$. That is, when the light source 11 is turned in the turn-on period $t_L$, the light source 11 is turned on during exposure of a line group of the imaging circuitry 12 corresponding to the turn-on period $t_L$ to illuminate the subject, and a part of the subject illuminated by the light source 11 may be imaged by the line group (the line group corresponding to the turn-on period $t_L$) of the imaging circuitry 12.

In the present embodiment, the turn-on period t25 corresponds to m line groups (i.e., first half line groups) from a line L1 of a first row that is a leading line of the imaging circuitry 12 to a line of an $m^{th}$ row (m is an integer equal to or greater than 1 and is less than n, and close to n/2 in the present embodiment) that is located at the center, and the turn-on period t26 corresponds to n-m line groups (i.e., second half line groups) from a line of an $(m+1)^{th}$ row to a line Ln of an $n^{th}$ row that is a final line.

Also, a line group of the imaging circuitry 12 corresponding to a turn-on period may be changed by changing a length of the turn-on period or a delay time (a start delay time) of the turn-on period for a start timing of a predetermined period (e.g., a frame period). In the present embodiment, a delay time $t_{D2}$ of the turn-on period t26 is longer than a delay time $t_{D1}$ of the turn-on period t26. Also, a length of the turn-on period t26 is the same as a length of the turn-on period t25.

<Operation>

Figure 49:
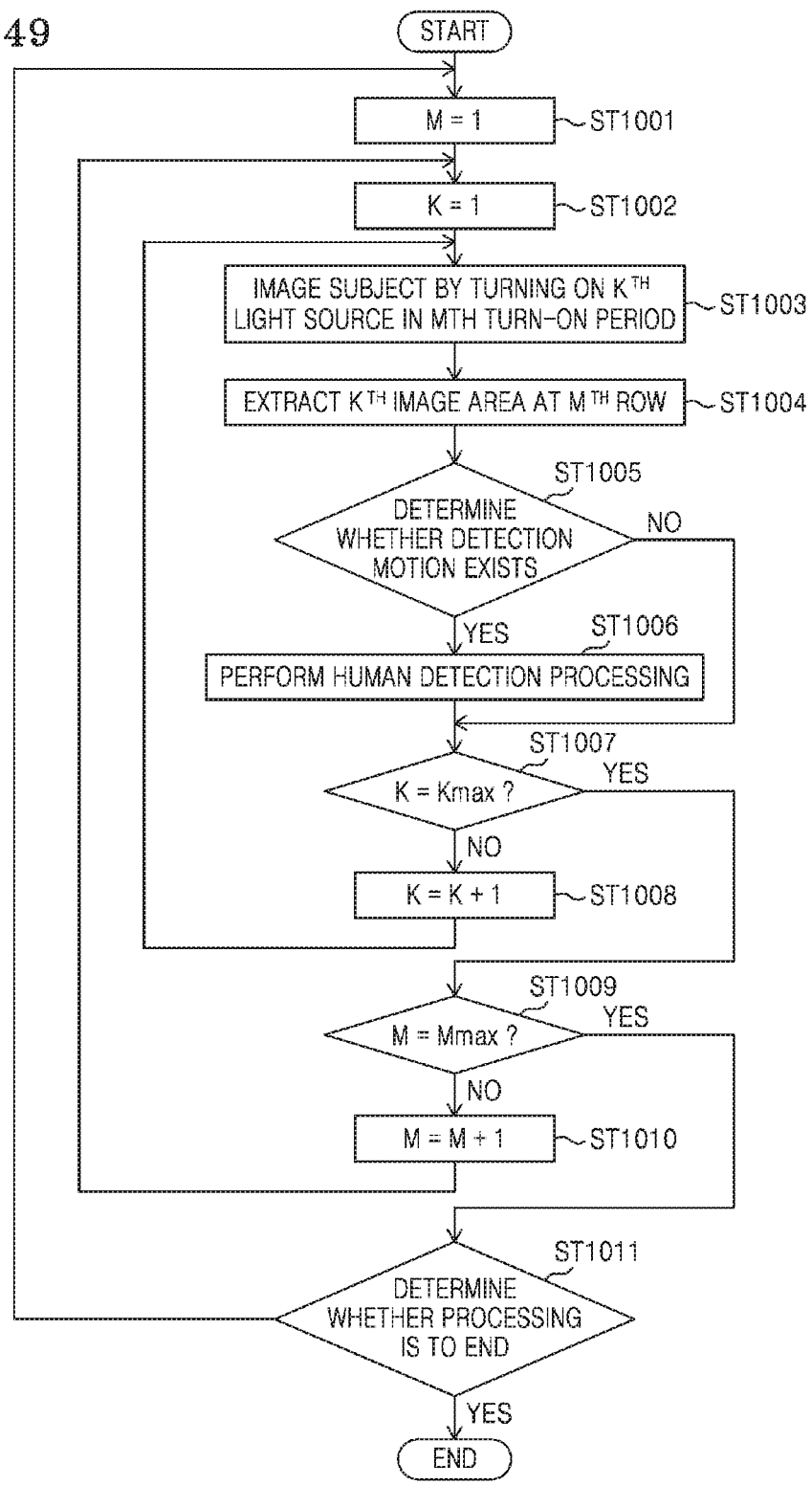
FIG. 49 is a flowchart for explaining an operation of the imaging device according to Embodiment 10.

Next, an operation of the imaging device 10 according to Embodiment 10 will be described with reference to FIG. 49. In the present embodiment, a light emission order (an order of selecting the light-emitting light source 11) of the light sources 11a through 11d is pre-determined, and a selection order of four image area columns is pre-determined. In detail, a selection order of the light sources 11 and the image area columns is pre-determined so that the light source 11a and the image area column (including the image areas 25a and 26a) are firstly selected, the light source 11b and the image area column (including the image areas 25b and 26b) are secondly selected, the light source 11c and the image area column (including the image areas 25c and 26c) are thirdly selected, and the light source 11d and the image area column (including the image areas 25d and 236d) are fourthly selected. Also, numbers (numbers indicating the selection order) are allocated to the light sources 11a through 11d and four image area columns based on the selection order of the light sources 11 and the image area columns. In detail, "1" is allocated to the light source 11a and the image area column (including the image areas 25a and 26a), "2" is allocated to the light source 11b and the image area column (including the image areas 25b and 26b), "3" is allocated to the light source 11c and the image area column (including the image areas 25c and 26c), and "4" is allocated to the light source 11d and the image area column (including the image areas 25d and 26d). Also, in the following description, the variable K is an integer equal to or greater than 1 and equal to or less than the upper limit Kmax, and indicates a number of the light source 11 and the image area column to be processed. The upper limit Kmax is an integer equal to or greater than 2 and corresponds to the number of the light sources 11.

Also, in the present embodiment, a selection order of the turn-on periods t25 and t26 is pre-determined, and a selection order of two image area rows is pre-determined. In detail, a section order of the turn-on periods and the image area rows is pre-determined so that the turn-on period t25 and an image area row including the image areas 25a, 25b, 25c, and 25d are firstly selected and the turn-on period t26 and an image area row including the image areas 26a, 26b, 26c, and 26d are secondly selected. Also, numbers (numbers indicating the selection order) are allocated to the turn-on periods t25 and t26 and two image area rows based on the selection order of the turn-on periods and the image area rows. In detail, "1" is allocated to the turn-on period t25 and the image area row including the image areas 25a, 25b, 25c, and 25d, and "2" is allocated to the turn-on period t26 and the image area row including the image areas 26a, 26b, 26c, and 26d. Also, in the following description, a variable M is an integer equal to or greater than 1 and equal to or less than an upper limit Mmax, and indicates a number of a turn-on period and an image area row to be processed. The upper limit Mmax is an integer equal to or greater than 2, and corresponds to the number of turn-on periods.

《Step ST1001》

First, the controller 14 sets the variable M to 1. That is, the controller 14 selects a turn-on period an image area row (the turn-on period t25 and the image area row including the image areas 25a, 25b, 25c, and 25d in the present embodiment) that are firstly selected in a pre-determined selection order as a turn-on period and an image area row to be processed this time.

《Step ST1002》

Next, the controller 14 sets the variable K to 1. That is, the controller 14 selects the light source 11 and an image area column (the light source 11 and the image area column including the image areas 25a and 26a in the present embodiment) that are firstly selected in the pre-determined selection order as the light source 11 and an image area column to be processed this time.

《Step ST1003》

Next, the controller 14 causes the imaging circuitry 12 to image a subject by turning on a $K^{th}$ light source 11 in an $m^{th}$ turn-on period.

《Step ST1004》

Next, the determiner 15 extracts a $K^{th}$ image area 200 at an $m^{th}$ row from the captured image 20 obtained in step ST1003.

《Step ST1005》

Next, the determiner 15 determines whether a detection target (a motion in the present embodiment) exists in the $K^{th}$ image area 200 at the $m^{th}$ row extracted in step ST1004. When it is determined that the detection target exists in the $K^{th}$ image area 200 at the $m^{th}$ row, the operation proceeds to step ST1006, and otherwise, the operation proceeds to step ST1007.

《Step ST1006》

Next, the detector 16 detects the object 100 (a human in the present embodiment) from the captured image 20 including the $K^{th}$ image area 200 at the $m^{th}$ row determined in step ST105 to include the detection target.

《Step ST1007》

Next, the controller 14 determines whether the variable K reaches the upper limit Kmax. That is, the controller 14 determines whether the light source 11 and the image area column to be processed this time are the light source 11 and an image area column that are finally selected in the pre-determined selection order. When the variable K does not reach the upper limit Kmax, the operation proceeds to step ST1008, and when the variable K reaches the upper limit Kmax, the operation proceeds to step ST1009.

《Step ST1008》

When the variable K does not reach the upper limit Kmax in step ST1007, the operation proceeds to step ST1008. In step ST1008, the controller 14 adds 1 to the variable K. That is, the controller 14 selects the light source 11 and an image area column selected next to the light source 11 and the image area column to be processed this time in the pre-determined selection order as the light source 11 and an image area column to be processed next time. Next, the operation proceeds to step ST1003.

《Step ST1009》

When the variable M does not reach the upper limit Mmax in step ST1007, the controller 14 determines whether the variable M reaches the upper limit Mmax. That is, the controller 14 determines whether the turn-on period and the image area row to be processed this time are a turn-on period and an image area row that are finally selected in the pre-determined selection order. When the variable M does not reach the upper limit Mmax, the operation proceeds to step ST1010, and when the variable M reaches the upper limit Mmax, the operation proceeds to step ST1011.

《Step ST1010》

When the variable M does not reach the upper limit Mmax in step ST1009, the controller 14 adds 1 to the variable M. That is, the controller 14 selects a turn-on period and an image area row selected next to the turn-on period and the image area row to be processed this time in the pre-determined selection order as a turn-on period and an image area row to be processed next time. Next, the operation proceeds to step ST1002.

《Step ST1011》

Next, when processing is to end, the processing ends, and when the processing is to continue, the operation proceeds to step ST1001.

<Light Emission Pattern of Light Source>

Figure 50:
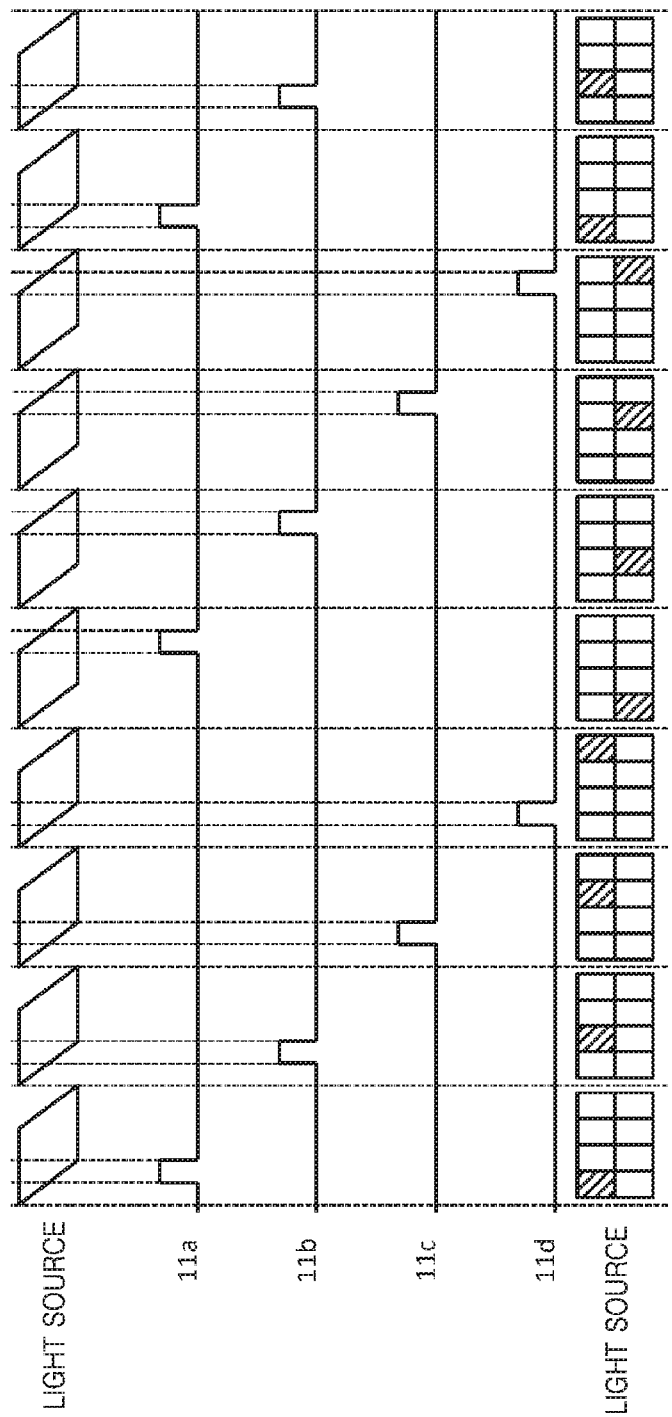
FIG. 50 is a timing chart illustrating a light emission pattern of the light source in the imaging device according to Embodiment 10.

FIG. 50 illustrates a light emission pattern of the light source 11 according to Embodiment 10. As shown in FIG. 50, in Embodiment 10, the light-emitting light source 11 is selected in a pre-determined light emission order (an order of the light sources 11a, 11b, 11c, and 11d in the present embodiment). A turn-on period of the light source 11 is selected in a pre-determined selection order (an order of the turn-on periods t25 and t26 in the present embodiment). Also, in FIG. 50, the image area 200 to be processed from among eight image areas 200 included in the captured image 20 is hatched.

Effect of Embodiment 10

Even in the above configuration, the same effect as that of Embodiments 1 through 4 may be achieved. That is, power consumption needed to illuminate a subject may be reduced and the subject may be continuously monitored.

Also, since the light source 11 emits light under light emission control so that a period where the light-emitting light source 11 from among the plurality of light sources 11a through 11d is turned on and a period where the light source 11 (the light-emitting light source 11) is turned off exist in a period other than a period where all lines of the imaging circuitry 12 are simultaneously exposed, power consumption of the light source 11 may be reduced.

Modification of Embodiment 10

Also, in the imaging device 10 according to Embodiment 10, the controller 14 may be configured to perform light emission control so that the plurality of light sources 11a through 11d emit light in a pre-determined light emission order and a turn-on order when the image area 200 determined by the determiner 154 to include a detection target does not exist, and perform light emission control so that a turn-on frequency of the light source 11 corresponding to the image area 200 determined by the determiner 15 to include the detection target from among the plurality of light sources 11a through 11d is increased in a turn-on period corresponding to the image area 200 determined by the determiner 15 to include the detection target when the image area 200 determined by the determiner 15 to include the detection target exists.

For example, when the image area 200 determined by the determiner 15 to include the detection target exists, the controller 14 may be configured to perform light emission control so that a first light-emitting operation and a second light-emitting operation are alternately performed. In the first light-emitting operation, the light source 11 corresponding to the image area 200 determined by the determiner 15 to include the detection target is turned on in a turn-on period corresponding to the image area 200 determined by the determiner 15 to include the detection target. In the second light-emitting operation, one light source 11 from among the light sources 11 corresponding to the image areas 200 not determined by the determiner 15 to include the detection target emits light based on the pre-determined light emission order and the turn-on order.

<Operation>

Figure 51:
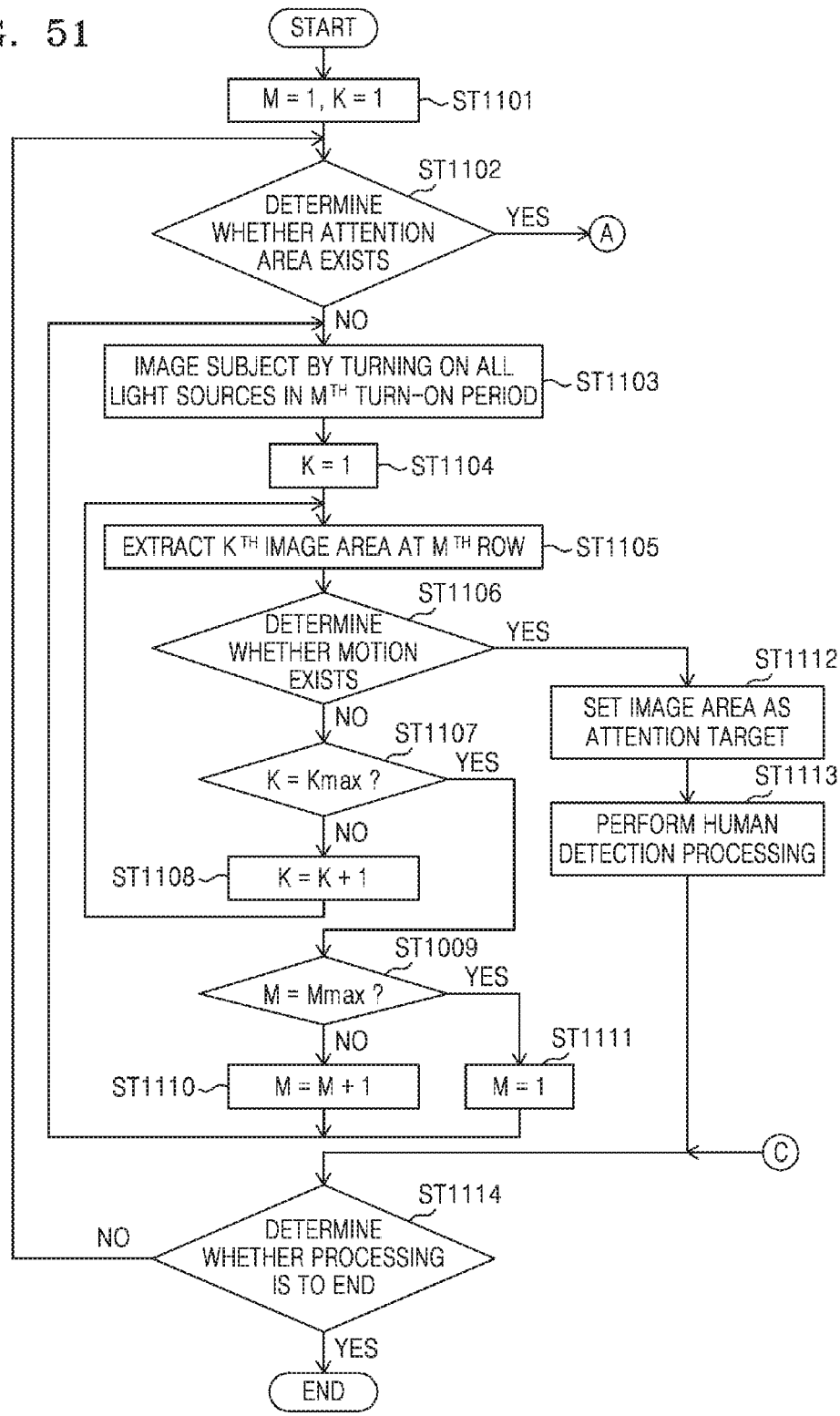
FIG. 51 is a flowchart for explaining an operation of the imaging device according to Modification of Embodiment 10.
Figure 52:
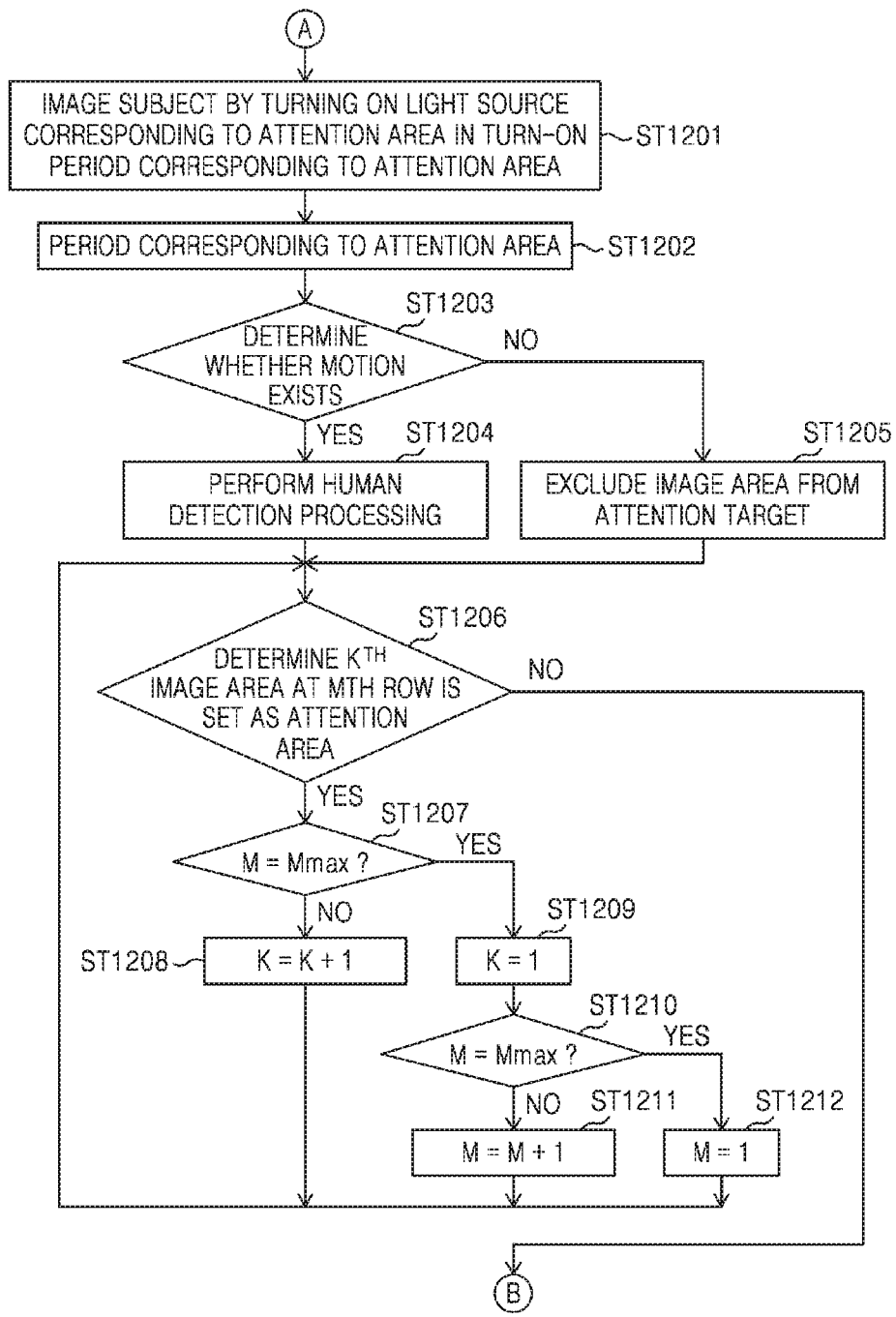
FIG. 52 is a flowchart for explaining an operation of the imaging device according to Modification of Embodiment 10.
Figure 53:
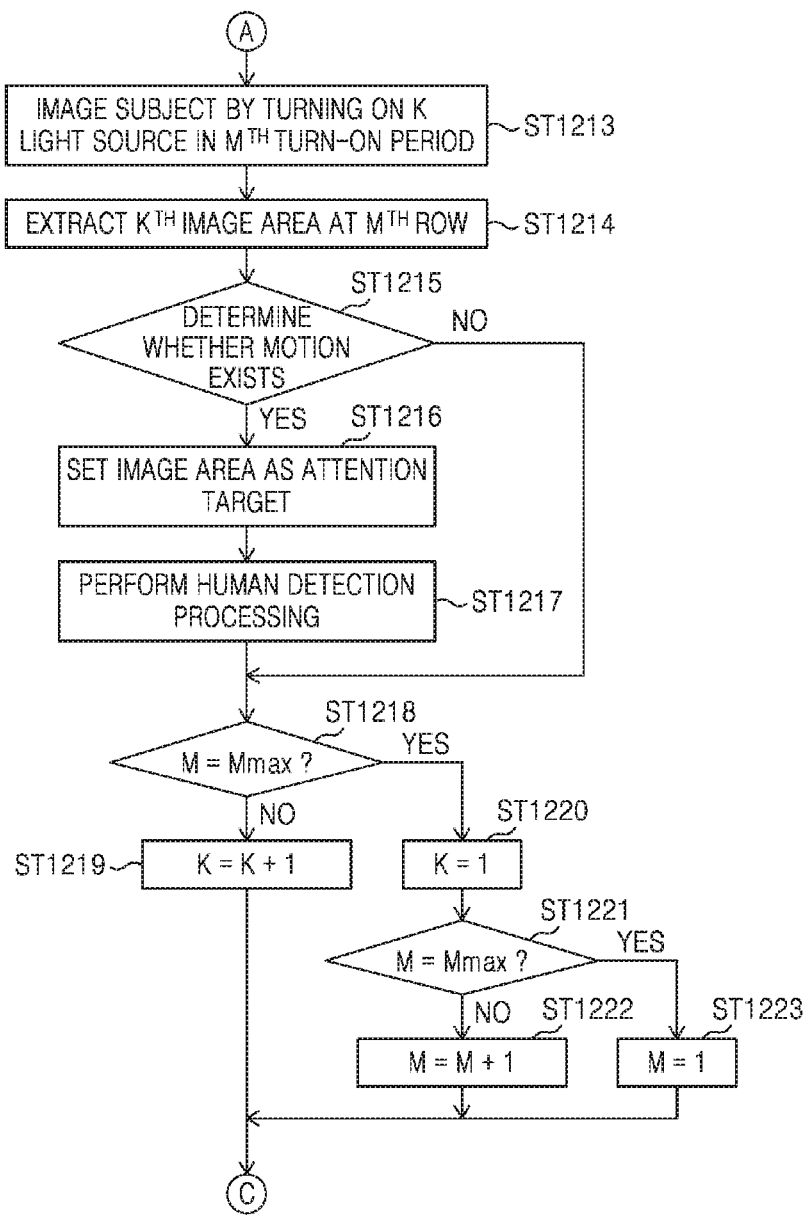
FIG. 53 is a flowchart for explaining an operation of the imaging device according to Modification of Embodiment 10.

Next, an operation of the imaging device 10 according to Modification of Embodiment 10 will be described with reference to FIGS. 51, 52, and 53. In the present embodiment, a light emission order of the light sources 11a through 11d (an order of selecting the light-emitting light source 11) is pre-determined, and a selection order of four image area columns is pre-determined. Also, a selection order of the turn-on periods t25 and t265 is pre-determined, and a selection order of two image area rows is pre-determined. In the following description, the variable K is an integer equal to or greater than 1 and equal to or less than the upper limit Kmax, and indicates a number of the light source 11 and an image area column to be processed. The upper limit Kmax is an integer equal to or greater than 2, and corresponds to the number of the light sources 11. The variable M is an integer equal to or greater than 1 and equal to or less than the upper limit Mmax, and indicates a number of a turn-on period and an image area row to be processed. The upper limit Mmax is an integer equal to or greater than 2, and corresponds to the number of turn-on periods.

《Step ST1101》

First, the controller 14 sets the variable M to 1, and sets the variable K to 1. That is, the controller 14 selects a turn-on period and an image area row that are firstly selected in a pre-determined selection order as a turn-on period and an image area row to be processed this time, and selects the light source 11 and an image area column that are firstly selected in the pre-determined selection order as the light source 11 and an image area column to be processed this time.

《Step ST1102》

Next, the controller 14 determines whether an attention area exists. The attention area corresponds to the image area 200 determined by the determiner 15 to include a detection target (a motion in the present embodiment). When it is determined that the attention area does not exist, the operation proceeds to step ST1103. When the attention area exists, the operation proceeds to step ST1201 (see FIG. 52).

《Step ST1103》

When it is determined in step ST1102 that the attention area does not exist, the controller 14 causes the imaging circuitry 12 to image a subject by turning on all of the light sources 11a through 11d in an $m^{th}$ turn-on period.

《Step ST1104》

Next, the controller 14 sets the variable K to 1.

《Steps ST1105 and ST1106》

Next, like in steps ST1003 and ST1004, the determiner 15 extracts a $K^{th}$ image area 200 at an $m^{th}$ row from the captured image 20 obtained in step ST1103, and determines whether the detection target (the motion in the present embodiment) exists in the extracted $K^{th}$ image area 200 at the $m^{th}$ row. When it is determined that the detection target does not exist in the $K^{th}$ image area 200 at the $m^{th}$ row, the operation proceeds to step ST1107, and when it is determined that the detection target exists in the $K^{th}$ image area 200 at the $m^{th}$ row, the operation proceeds to step ST1112.

《Step ST1107》

Next, the controller 14 determines whether the variable K reaches the upper limit Kmax. That is, the controller 14 determines whether the light source 11 and the image area column to be processed this time as the light source 11 and an image area column that are finally selected in the pre-determined selection order. When the variable K does not reach the upper limit Kmax, the operation proceeds to step ST1108, and when the variable K reaches the upper limit Kmax, the operation proceeds to step ST1109.

《Step ST1108》

When it is determined in step ST1107 that the variable K does not reach the upper limit Kmax, the operation proceeds to step ST1108. In step ST1108, the controller 14 adds 1 to the variable K. That is, the controller 14 selects the light source 11 and an image area column selected next to the light source 11 and the image area column to be processed this time in the pre-determined selection order as the light source 11 and an image area column to be processed next time. Next, the operation proceeds to step ST1105.

《Steps ST1109, ST1110, and ST1111》

Next, the controller 14 selects a turn-on period and an image area row to be processed next time based on the pre-determined selection order. In detail, the controller 14 determines whether the variable M reaches the upper limit Mmax, and adds 1 to the variable M when the variable M does not reach the upper limit Mmax and sets the variable M to 1 when the variable M reaches the upper limit Mmax. Next, the operation proceeds to step ST1103.

《Step ST1112》

When it is determined in step ST1106 that the detection target exists in the $K^{th}$ image area 200 at the $m^{th}$ row, the controller 14 sets the $K^{th}$ image area 200 at the $m^{th}$ row determined in step ST1106 to include the detection target as an attention target (i.e., the attention area).

《Step ST1113》

Next, like in step ST1006, the detector 16 detects the object 100 (a human in the present embodiment) from the captured image 20 including the $K^{th}$ image area 200 at the $m^{th}$ row determined in step ST1112 to include the detection target. Next, the operation proceeds to step ST1114.

《Step ST1114》

Next, when processing is to end, the processing ends, and when the processing is to continue, the operation proceeds to step ST1102.

《Step ST1201》

When it is determined in step ST1102 that the attention area exists, the controller 14 causes the imaging circuitry 12 to image the subject by causing the light source 11 corresponding to the image area 200 that is the attention area from among the plurality of light sources 11a through 11d to emit light in a turn-on period corresponding to the image area 200 that is the attention area from among the plurality of turn-on periods t25 and t26.

《Step ST1202》

Next, the determiner 15 extracts the image area 200 that is the attention area from the captured image 20 obtained in step ST1201.

《Step ST1203》

Next, the determiner 15 determines whether the detection target (the motion in the present embodiment) exists in the image area 200 that is the attention area extracted in step ST1202. When it is determined that the detection target exists in the image area 200 that is the attention area, the operation proceeds to step ST1204, and otherwise, the operation proceeds to step ST1205.

《Step ST1204》

Next, the detector 16 detects the object 100 (a human in the present embodiment) from the captured image 20 including the image area 200 that is the attention area determined in step ST1203 to include the detection target. Next, the operation proceeds to step ST1206.

《Step ST1205》

When it is determined in step ST1203 that the detection target does not exist, the controller 14 excludes the image area 200 that is the attention area determined not to include the detection target from the attention target (i.e., the attention area). Next, the operation proceeds to step ST1206.

《Step ST1206》

Next, the controller 14 determines whether the K$^{th}$ image area 200 at the m$^{th}$ row is set as the attention area. When the K$^{th}$ image area 200 at the m$^{th}$ row is set as the attention area, the operation proceeds to step ST1207, and otherwise, the operation proceeds to step ST1213 (see FIG. 53).

《Steps ST1207 through ST1212》

When it is determined in step ST1206 that the K$^{th}$ image area 200 at the m$^{th}$ row is set as the attention area, the controller 14 selects the image area 200 to be processed next time based on the pre-determined selection order. In detail, the controller 14 determines whether the variable K reaches the upper limit Kmax, and adds 1 to the variable K when the variable K does not reach the upper limit Kmax and sets the variable K to 1 when the variable M reaches the upper limit Kmax. Also, when the variable K is set to 1, the controller 14 determines whether the variable M reaches the upper limit Mmax, and adds 1 to the variable M when the variable M does not reach the upper limit Mmax and sets the variable M to 1 when the variable M reaches the upper limit Mmax. Next, the operation proceeds to step ST1206.

《Steps ST1213, ST1214, and ST1215》

When it is determined in step ST1206 that the K$^{th}$ image area 200 at the m$^{th}$ row is not set as the attention area, the controller 14 causes the imaging circuitry 12 to image the subject by causing the light source 11 corresponding to the image area 200 that is the attention area from among the plurality of light sources 11a through 11d to emit light in a turn-on period corresponding to the image area 200 that is the attention area from among the plurality of turn-on periods t25 and t26. Next, the determiner 15 extracts the K$^{th}$ image area 200 at the m$^{th}$ row from the captured image 20 obtained in step ST1213, and determines whether the detection target (the motion in the present embodiment) exists in the extracted K$^{th}$ image area 200 at the m$^{th}$ row. When it is determined that the detection target exists in the K$^{th}$ image area 200 at the m$^{th}$ row, the operation proceeds to step ST1216, and otherwise, the operation proceeds to step ST1218.

《Step ST1216》

Next, the controller 14 sets the K$^{th}$ image area 200 at the m$^{th}$ row determined in step ST1215 to include the detection target as the attention target (i.e., the attention area).

《Step ST1217》

Next, the detector 16 detects the object 100 (a human in the present embodiment) from the captured image 20 including the K$^{th}$ image area 200 at the m$^{th}$ row determined in step ST1215 to include the detection target. Next, the operation proceeds to step ST1218.

《Steps ST1218 through ST1223》

Next, the controller 14 selects the image area 200 to be processed next time, based on the pre-determined selection order. In detail, the controller 14 determines whether the variable K reaches the upper limit Kmax, and adds 1 to the variable K when the variable K does not reach the upper limit Kmax and sets the variable K to 1 when the variable M reaches the upper limit Kmax. Also, when the variable K is set to 1, the controller 14 determines whether the variable M reaches the upper limit Mmax, and adds 1 to the variable M when the variable M does not reach the upper limit Mmax and sets the variable M to 1 when the variable M reaches the upper limit Mmax. Next, the operation proceeds to step ST1114 (see FIG. 51).

<Light Emission Pattern of Light Source>

Figure 54:
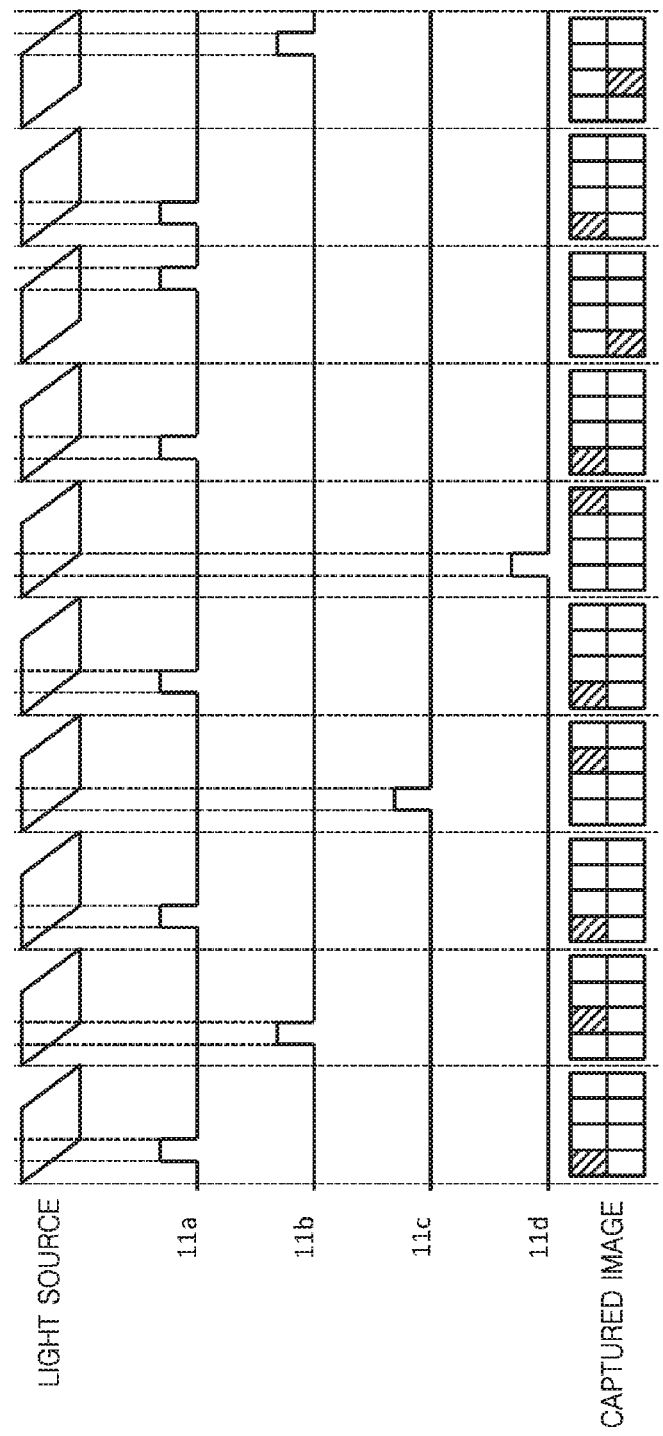
FIG. 54 is a timing chart illustrating a light emission pattern of the light source in the imaging device according to Modification of Embodiment 10.

FIG. 54 illustrates a light emission pattern of the light source 11 when an attention area exists in Modification of Embodiment 10. In FIG. 54, a first image area 25a at a first row from among eight image areas 200 included in the captured image 20 is set as the attention area, and each of the other seven image areas 200 is not set as the attention area. As shown in FIG. 54, in Modification of Embodiment 10, light emission control is performed so that a first light-emitting operation in which the light source 11a corresponding to the attention area is turned on in the turn-on period t25 corresponding to the attention area and a second light-emitting operation where one light source 11 from among the light sources 11 corresponding to the image areas that are not each the attention area emits light based on a pre-determined light emission order are alternately performed. Also, in FIG. 54, the image area 200 to be processed from among the eight image areas 200 included in the captured image 20 is hatched.

Effect of Modification of Embodiment 10

As described above, determining whether a detection target exists may be mainly performed on an attention area (the image area 200 determined to include a detection target). Accordingly, since a portion of a subject expected to include the detection target may be mainly monitored, the subject may be effectively monitored (whether the detection target exists may be effectively determined).

Also, in the imaging device 10 according to Modification of Embodiment 10, the plurality of image areas 200 may be each set as an attention target (i.e., the attention area).

The controller 14 may be configured to perform light emission control so that the plurality of light sources 11 respectively corresponding to a plurality of attention areas (in detail, the plurality of image areas 200 determined by the determiner 15 to include the detection target and corresponding to the same turn-on period $t_L$) simultaneously emit light (are turned on) in a first light-emitting operation. For example, the controller 14 may be configured to perform the same operation as an operation of the controller 14 according to Modification 1 of Embodiment 2.

Alternatively, the controller 14 may be configured to perform light emission control so that the light sources 11 respectively corresponding to the plurality of attention areas (in detail, the plurality of image areas 200 determined by the determiner 15 to include the detection target and corresponding to the same turn-on period $t_L$) sequentially emit light (are turned on) in the first light-emitting operation. For example, the controller 14 may be configured to perform the same operation as an operation of the controller 14 according to Modification 2 of Embodiment 2.

Other Modifications of Embodiment 10

Also, in the imaging device 10 according to Embodiment 10, the detector 16 may be configured to, when a portion of an attention area (the image area 200 determined by the determiner 15 to include a detection target) determined by the determiner 15 to include the detection target is an edge portion of the attention area, detect the object 100 from the candidate area 30 including the attention area and an adjacent area (the image area 200 adjacent to the edge portion of the attention area). For example, the detector 16 may be configured to perform the same operation as an operation of the detector 16 according to Embodiment 3.

Also, in the imaging device 10 according to Embodiment 10, the controller 14 may be configured to, when the object area 40 extracted by the identifier 17 extends over the attention area (the image area 200 determined by the determiner 15 to include the detection target) and the adjacent area (the image area 200 adjacent to the edge portion of the attention area), cause the light source 11 to emit light (to be turned on) and the imaging circuitry 12 to image a subject. The identifier 17 may be configured to, when the light source 11 corresponding to the attention area emits light (is turned on), extract the object area 40 from the captured image 20 obtained by the imaging circuitry 12 and combine the object area 40 with a combination image (a first combination image); and when the light sources 11 corresponding to the attention area and the adjacent area emit light (are turned on), extract the object area 40 from the captured image 20 obtained by the imaging circuitry 12 and combine the object area 40 with a combination image (a second combination image); and identify the object 100 based on a combination result. For example, the controller 14 and the identifier 17 may be configured to perform the same operations as those of the controller 14 and the identifier 17 of Modification of Embodiment 4.

Embodiment 11

Figure 55:
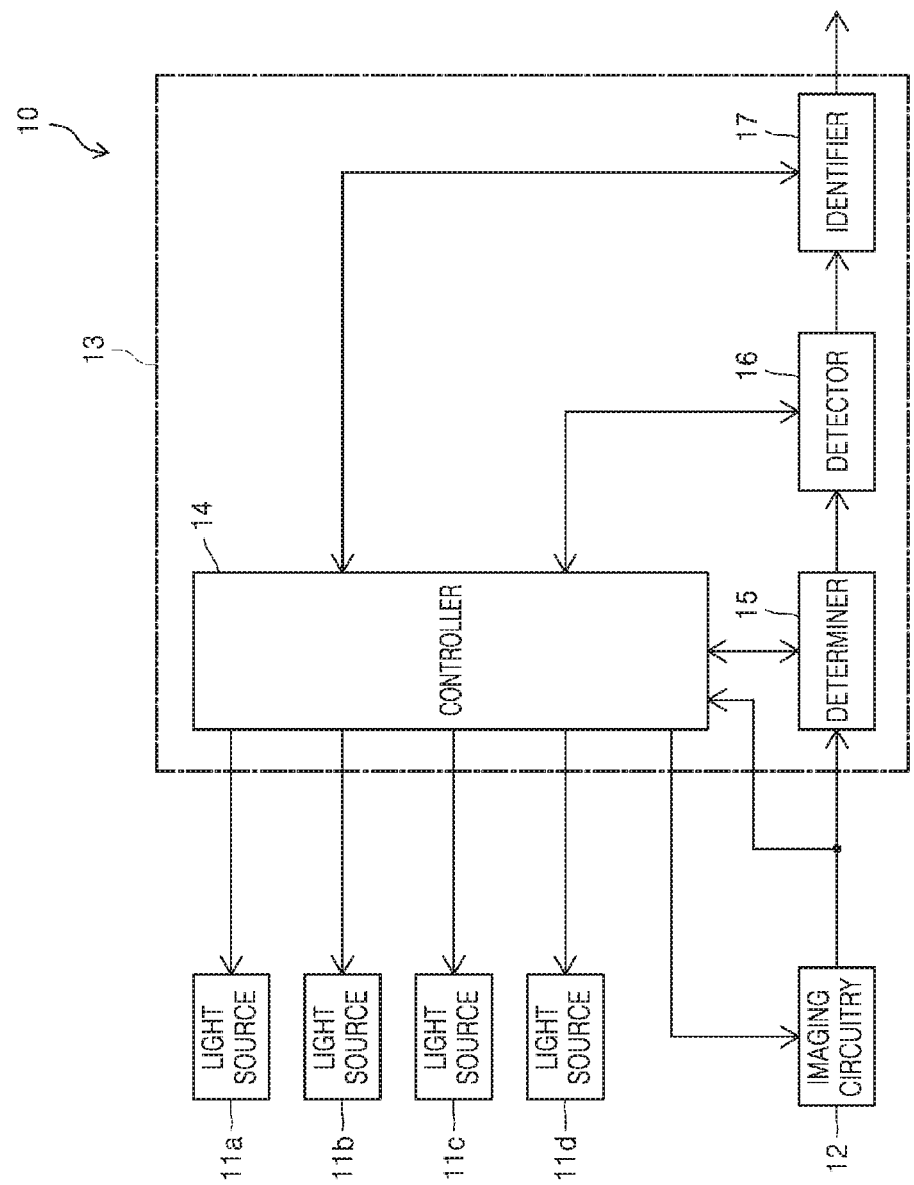
FIG. 55 is a block diagram illustrating a configuration of the imaging device according to Embodiment 11.

FIG. 55 illustrates a configuration of the imaging device 10 according to Embodiment 11. The imaging device 10 according to Embodiment 11 has the same configuration as that of the imaging device 10 according to Embodiment 4 of FIG. 16. Also, the imaging device 10 according to Embodiment 11 may perform the same operation as that of the imaging device 10 according to any of Embodiments 1 through 4.

Also, in Embodiment 11, each of the plurality of light sources 11a through 11d is configured to be capable of changing a light emission amount. Also, the controller 14 is configured to set a light emission amount of the light source 11 based on a brightness (e.g., an average luminance) of the image area 21 that is a part of the captured image 20 obtained by the imaging circuitry 12 and corresponds to the light source 11 that does not emit light during imaging for obtaining the captured image 20.

Figure 56:
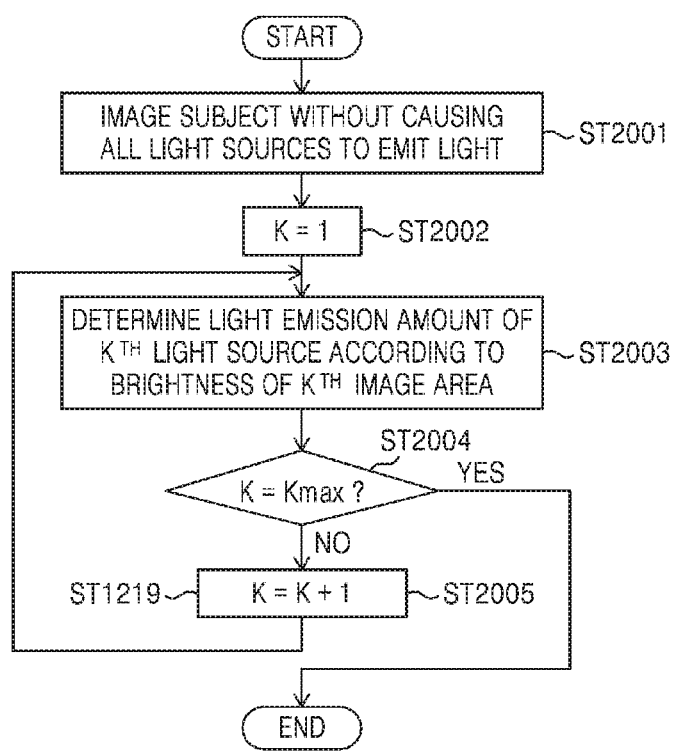
FIG. 56 is a flowchart for explaining an operation of the imaging device according to Embodiment 11.

Also, in the imaging device 10 according to Embodiment 11, an operation of FIG. 56 is performed, in addition to an operation of the imaging device 10 according to any of Embodiments 1 through 4.

<Operation>

Next, an operation of the imaging device 10 according to Embodiment 11 will be described with reference to FIG. 56. In the present embodiment, an order of determining an object to be processed from among the light sources 11a through 11d and the image areas 21a through 21d is pre-determined. Also, in the following description, the variable K is an integer equal to or greater than 1 and equal to or less than the upper limit Kmax, and indicates a number of the light source 11 and the image area 21 to be processed. The upper limit Kmax is an integer equal to or greater than 2, and corresponds to the number (4 in the present embodiment) of the light sources 11.

《Step ST2001》

First, the controller 14 causes all of the light sources 11a through 11d not to emit light and causes the imaging circuitry 12 to image a subject (the subject not illuminated by the light sources 11).

《Step ST2002》

Next, the controller 14 sets the variable K to 1. That is, the controller 14 selects the light source 11 and the image area 21 that are firstly selected in a pre-determined selection order (e.g., the light source 11a and the image area 21a) as the light source 11 and the image area 21 to be processed this time.

《Step ST2003》

Next, the controller 14 extracts a $K^{th}$ image area 21 from a captured image obtained in step ST2001. The controller 14 sets a light emission amount of the light source 11 (a $K^{th}$ light source 11) corresponding to the $K^{th}$ image area 21 based on a brightness of the $K^{th}$ image area 21. In detail, the controller 14 sets a light emission amount of the $K^{th}$ light source 11 based on a brightness of the $K^{th}$ image area 21 so that the light emission amount of the $K^{th}$ light source 11 decreases as the brightness of the $K^{th}$ image area 21 increases.

《Step ST2004》

Next, the controller 14 determines whether the variable K reaches the upper limit Kmax. That is, the controller 14 determines whether the light source 11 (the light source 11 whose light emission amount is not set) that is not selected as an object to be processed from among the plurality of light sources 11 remains. When the variable K does not reach the upper limit Kmax, the operation proceeds to step ST2005, and when the variable K reaches the upper limit Kmax, processing ends.

《Step ST2005》

When it is determined in step ST2004 that the variable K does not reach the upper limit Kmax, the controller 14 adds 1 to the variable K. That is, the controller 14 selects the light source 11 and the image area 21 selected next to the light source 11 and the image area 21 to be processed this time in the pre-determined selection order as the light source 11 and the image area 21 to be processed next time. Next, the operation proceeds to step ST2003.

Effect of Embodiment 11

Even in the above configuration, the same effect as that of Embodiments 1 through 4 may be achieved. That is, power consumption needed to illuminate a subject may be reduced and the subject may be continuously monitored.

Also, a light emission amount of the light source 11 may be set based on a brightness of the image area 21 that is a part of the captured image 20 obtained by the imaging circuitry 12 and corresponds to the light source 11 that does not emit light during imaging for obtaining the captured image 20. Accordingly, a light emission amount of the light source 11 may be set so that a brightness of the image area 21 is an appropriate brightness.

Embodiment 12

Figure 57:
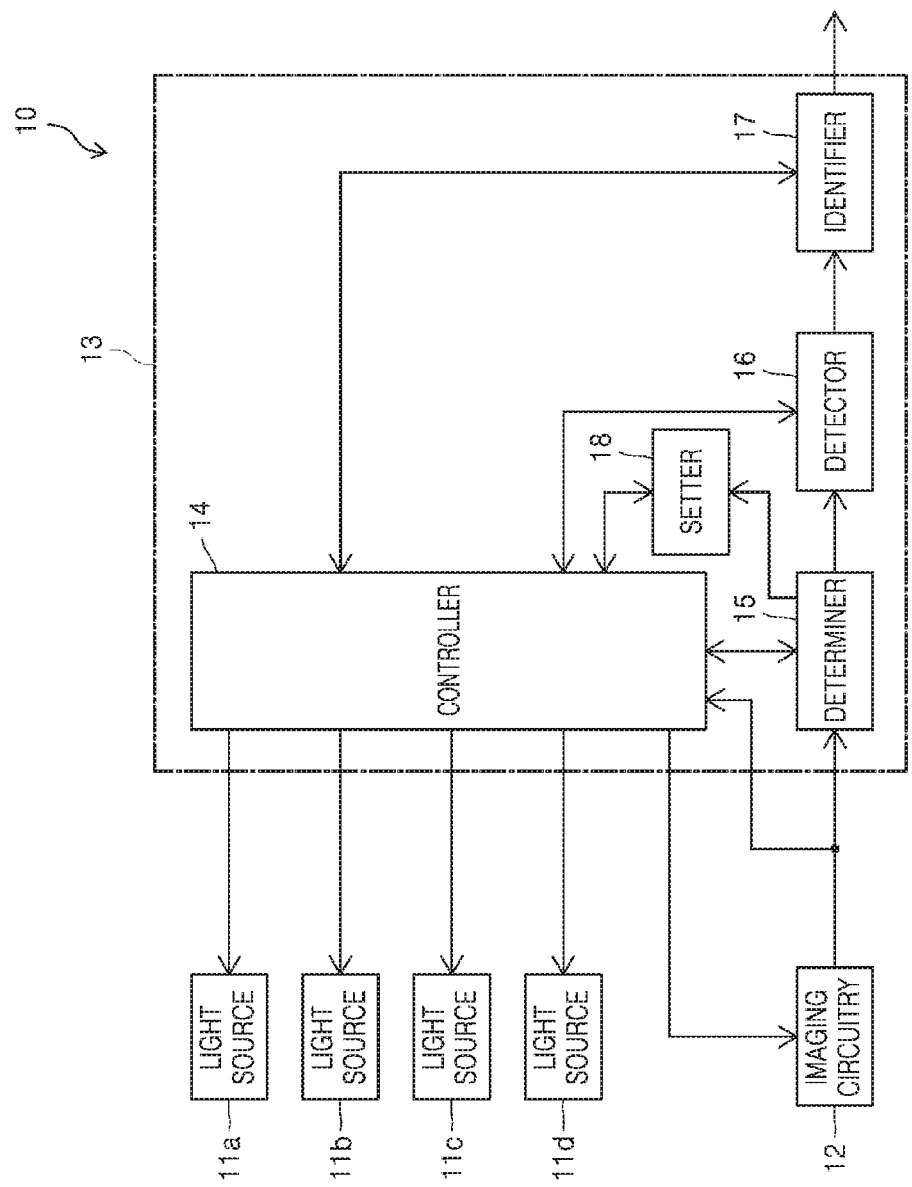
FIG. 57 is a block diagram illustrating a configuration of the imaging device according to Embodiment 12.

FIG. 57 illustrates a configuration of the imaging device 10 according to Embodiment 12. The imaging device 10 according to Embodiment 12 has the same configuration as that of the imaging device 10 according to any of Embodiment 4 of FIG. 16. Also, the imaging device 10 according to Embodiment 12 may perform the same operation as an operation of the imaging device 10 according to any of Embodiments 1 through 4. Also, in Embodiment 12, the processing circuit 13 further includes the setter 18 in addition to the controller 14, the determiner 15, the detector 16, and the identifier 17. Also, in Embodiment 12, the plurality of light sources 11a through 11d, the controller 14, and the setter 18 are configured as follows.

Each of the plurality of light sources 11a through 11d is configured to be capable of changing a light emission amount into a plurality of light emission amounts.

The controller 14 is configured to perform a first operation when a light emission amount to be set for the light-emitting light source 11 from among the plurality of light sources 11*a* through 11*d* is not determined. In the first operation, the controller 14 sets a light emission amount of the light source 11 (the light-emitting light source 11 from among the plurality of light sources 11*a* through 11*d*) as a light emission amount selected from among the plurality of light emission amounts in a pre-determined order, and causes the imaging circuitry 12 to image a subject illuminated by the light source 11 that emits light at the selected light emission amount.

Also, the controller 14 is configured to perform a second operation when the light emission amount to be set for the light-emitting light source 11 from among the plurality of light sources 11*a* through 11*d* is determined. In the second operation, the controller 14 sets a light emission amount of the light source (the light-emitting light source 11 from among the plurality of light sources 11*a* through 11*d*) as a light emission amount to be set, and causes the imaging circuitry 12 to image the subject illuminated by the light source 11 that emits light at the light emission amount to be set.

The setter 18 determines a light emission amount of the light source 11 that emits light during imaging for obtaining the captured image 20 including the image area 21 determined by the determiner 15 to include a detection target as a light emission amount to be set for the light source 11.

<Operation>

Figure 58:
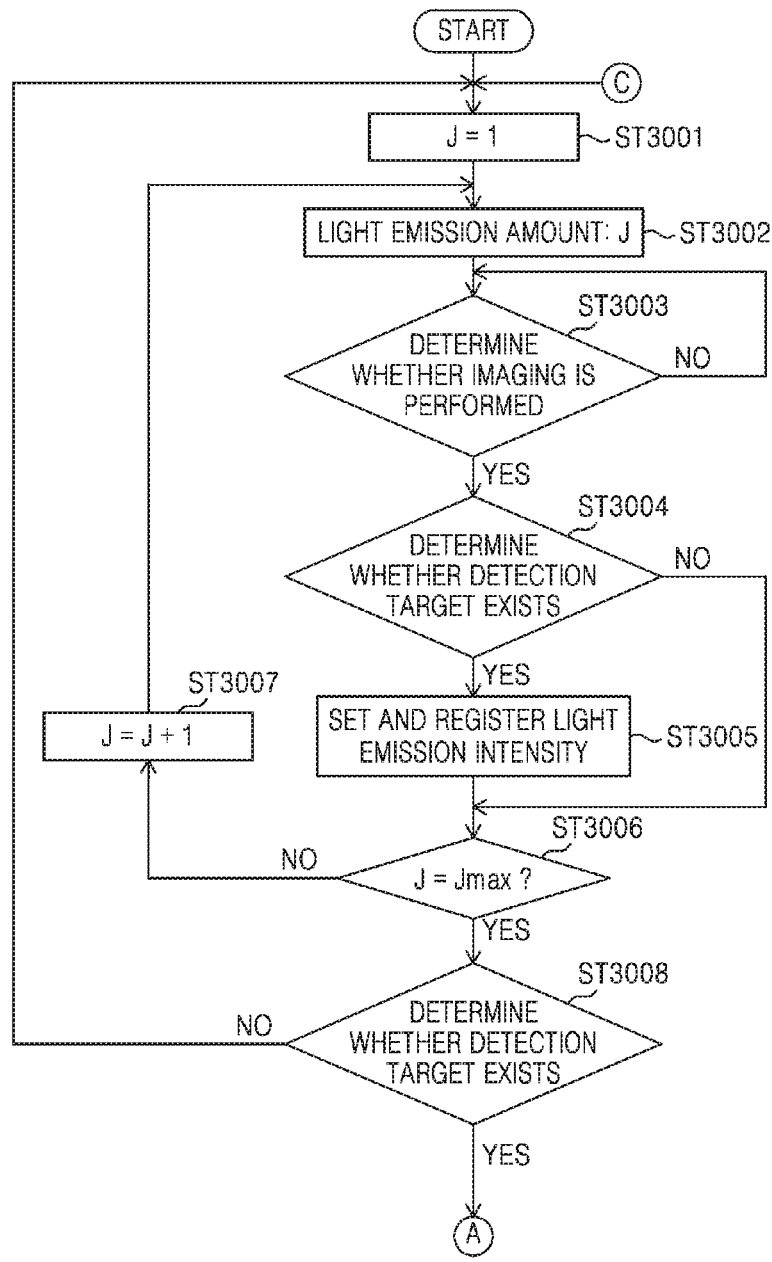
FIG. 58 is a flowchart for explaining an operation of the imaging device according to Embodiment 12.
Figure 59:
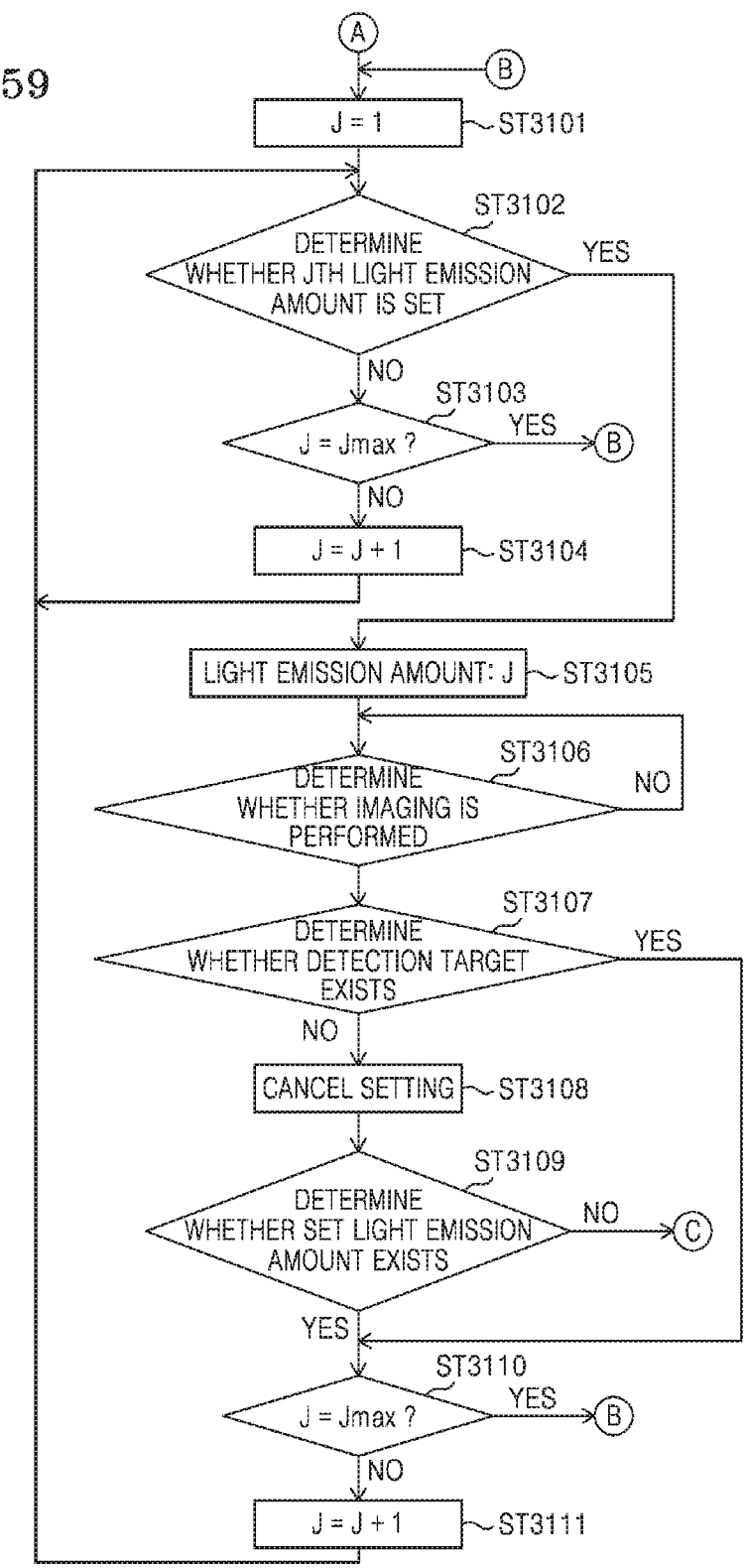
FIG. 59 is a flowchart for explaining an operation of the imaging device according to Embodiment 12.

Next, an operation of the imaging device 10 according to Embodiment 12 will be described with reference to FIGS. 58 and 59. In the imaging device 10 according to Embodiment 12, the following processing is performed on each of the plurality of light sources 11*a* through 11*d*. Also, an operation of FIG. 58 corresponds to an operation (a first operation) performed when a light emission amount to be set for the light source 11 is not determined. An operation of FIG. 59 corresponds to an operation (a second operation) performed when a light emission amount to be set for the light source 11 is determined. Also, in the following description, the variable J is an integer equal to or greater than 1 and equal to or less than the upper limit Jmax, and indicates a number (e.g., a number indicating a level of a light emission amount) of a light emission amount to be processed. The upper limit Jmax is an integer equal to or greater than 2, and corresponds to the number (e.g., the number of light emission amount changeable levels) of settable light emission amounts of the light source 11.

⟨ Step ST3001 ⟩

When a light emission amount to be set for the light source 11 (referred to as the light source 11 to be processed this time) is not determined, the controller 14 sets the variable J to 1. That is, the controller 14 selects a first light emission amount as an object to be processed this time.

⟨ Step ST3002 ⟩

Next, the controller 14 sets a light emission amount of the light source 11 as a $J^{th}$ light emission amount.

⟨ Step ST3003 ⟩

Next, the controller 14 determines whether a subject illuminated by the light source 11 whose light emission amount is set as the $J^{th}$ light emission amount is imaged by the imaging circuitry 12. For example, the controller 14 determines whether at least one imaging (imaging of the subject) is performed by the imaging circuitry 12 and at least one captured image is obtained in a period where the subject is illuminated by the light source 11 whose light emission amount is set as the $J^{th}$ light emission amount. When the subject illuminated by the light source 11 whose light emission amount is set as the $J^{th}$ light emission amount is imaged by the imaging circuitry 12, the operation proceeds to step ST3004, and otherwise, the method repeats steps ST3003.

⟨ Step ST3004 ⟩

Next, the determiner 15 extracts the image area 21 corresponding to the light source 11 from the captured image obtained in step ST3003, and determines whether a detection target exists in the extracted image area 21. When it is determined that the detection target exists in the image area 21, the operation proceeds to step ST3005, and otherwise, the operation proceeds to step ST3006.

⟨ Step ST3005 ⟩

Next, the setter 18 determines a light emission amount of the light source 11 during imaging for obtaining the captured image including the image area 21 determined in step ST3004 to include the detection target as a light emission amount to be set for the light source 11. That is, the setter 18 determines the $J^{th}$ light emission amount set in step ST3002 as the light emission amount of the light source 11 as a light emission amount to be set for the light source 11. In detail, the setter 18 registers the $J^{th}$ light emission amount as a light emission amount to be set for the light source 11 in the setter 18 (a memory area). Next, the operation proceeds to step ST3006.

⟨ Step ST3006 ⟩

Next, the controller 14 determines whether the variable J reaches the upper limit Jmax. That is, the controller 14 determines whether a light emission amount not selected as an object to be processed form among a plurality of light emission amounts remains. When the variable J does not reach the upper limit Jmax, the operation proceeds to step ST3007, and when the variable J reaches the upper limit Jmax, the operation proceeds to step ST3008.

⟨ Step ST3007 ⟩

When it is determined in step ST3006 that the variable J does not reach the upper limit Jmax, the controller 14 adds 1 to the variable J. That is, the controller 14 selects a light emission amount not selected yet from among the plurality of light emission amounts as an object to be processed this time. Next, the operation proceeds to step ST3002.

⟨ Step ST3008 ⟩

When it is determined in step ST3006 that the variable J reaches the upper limit Jmax, the controller 14 determines whether a light emission amount to be set for the light source 11 is determined. In detail, the controller 14 determines whether a light emission amount registered in the setter 18 (the memory area) exists as a light emission amount to be set from among the plurality of light emission amounts. When a light emission amount to be set for the light source 11 is determined, the operation proceeds to step ST3101 (see FIG. 59), and otherwise, the operation proceeds to step ST3001.

⟨ Step ST3101 ⟩

When a light emission amount to be set for the light source 11 is determined, the controller 14 sets the variable J to 1. That is, the controller 14 selects a first light emission amount as an object to be processed this time.

⟨ Step ST3102 ⟩

Next, the controller 14 determines whether a $J^{th}$ light emission amount (i.e., a light emission amount to be processed this time) is determined as a light emission amount to be set for the light source 11. When the $J^{th}$ light emission amount is not determined as a light emission amount to be set, the operation proceeds to step ST3103, and when the $J^{th}$ light emission amount is determined as a light emission amount to be set, the operation proceeds to step ST3105.

《Step ST3103》

Next, the controller 14 determines whether the variable J reaches the upper limit Jmax. When the variable J does not reach the upper limit Jmax, the operation proceeds to step ST3104, and when the variable J reaches the upper limit Jmax, the operation proceeds to step ST3101.

《Step ST3104》

When it is determined in step ST3103 that the variable J does not reach the upper limit Jmax, the controller 14 adds 1 to the variable J. Next, the operation proceeds to step ST3102.

《Step ST3105》

When it is determined in step ST3102 that the $J^{th}$ light emission amount for the light source 11 is determined as a light emission amount to be set, the controller 14 sets a light emission amount of the light source 11 as the $J^{th}$ light emission amount.

《Step ST3106》

Next, the controller 14 determines whether the subject illuminated by the light source 11 whose light emission amount is set as the $J^{th}$ light emission amount is imaged by the imaging circuitry 12. When the subject illuminated by the light source 11 whose light emission amount is set as the $J^{th}$ light emission amount is imaged by the imaging circuitry 12, the operation proceeds to step ST3107, and otherwise, the operation proceeds to step ST3106.

《Step ST3107》

Next, the determiner 15 extracts the image area 21 corresponding to the light source 11 from the captured image 20 obtained in step ST3106, and determines whether the detection target exists in the extracted image area 21. When it is determined that the detection target does not exist in the image area 21, the operation proceeds to step ST3108, and when it is determined that the detection target exists in the image area 21, the operation proceeds to step ST3110.

《Step ST3108》

Next, the setter 18 cancels the determining of the light emission amount (i.e., the $J^{th}$ light emission amount set in step ST3105 as a light emission amount of the light source) of the light source 11 during imaging for obtaining the captured image 20 including the image area 21 determined in step ST3107 not to include the detection target as a light emission amount to be set. In detail, the setter 18 cancels the registering of the $J^{th}$ light emission amount (as a light emission amount to be set) in the setter 18 (the memory area) for the light source 11. Next, the operation proceeds to step ST3109.

《Step ST3109》

Next, the controller 14 determines whether a light emission amount to be set for the light source 11 is determined. When a light emission amount to be set is determined, the operation proceeds to step ST3110, and otherwise, the operation proceeds to step ST3001 (see FIG. 58).

《Steps ST3110 and ST3111》

When it is determined in step ST3109 that a light emission intensity to be set for the light source 11 is determined, the controller 14 determines whether the variable J reaches the upper limit Jmax. When the variable J does not reach the upper limit Jmax, the controller 14 adds 1 to the variable J. Next, the operation proceeds to step ST3102. When the variable J reaches the upper limit Jmax, the operation proceeds to step ST3101.

Effect of Embodiment 12

Even in the above configuration, the same effect as that of Embodiments 1 through 4 may be achieved. That is, power consumption needed to illuminate a subject may be reduced and the subject may be continuously monitored.

Also, when a light emission amount to be set for the light source is not determined, a light emission amount suitable to determine whether a detection target exists may be determined, and when the light emission amount to be set for the light source 11 is determined, the subject may be imaged at the light emission amount suitable to determine whether the detection target exists.

Embodiment 13

The imaging device 10 according to Embodiment 13 may have the same configuration as that of the imaging device 10 according to Embodiment 4 of FIG. 16. Also, the imaging device 10 according to Embodiment 13 may perform the same operation as an operation of the imaging device 10 according to any of Embodiments 1 through 4. Also, in Embodiment 13, the plurality of light sources 11a through 11d, the imaging circuitry 12, and the controller 14 are configured as follows.

Each of the plurality of light sources 11a through 11d is configured to be capable of changing a light emission amount into two different light emission amounts (a first light emission amount and a second light emission amount less than the first light emission amount).

The imaging circuitry 12 is configured to be capable of changing an exposure time into two different exposure times (a first exposure time and a second exposure time longer than the first exposure time).

The controller 14 is configured to set a light emission amount of the light source 11 corresponding to the image area 21 determined by the determiner 15 to include a detection target as the first light emission amount and set an exposure time of the imaging circuitry 12 during imaging of a subject illuminated by the light source 11 as the first exposure time. Also, the controller 14 is configured to set a light emission amount of the light source 11 corresponding to the image area 21 determined by the determiner 15 not to include the detection target as the second light emission amount and set an exposure time of the imaging circuitry 12 during imaging the subject illuminated by the light source 11 as the second exposure time.

<Operation>

Figure 60:
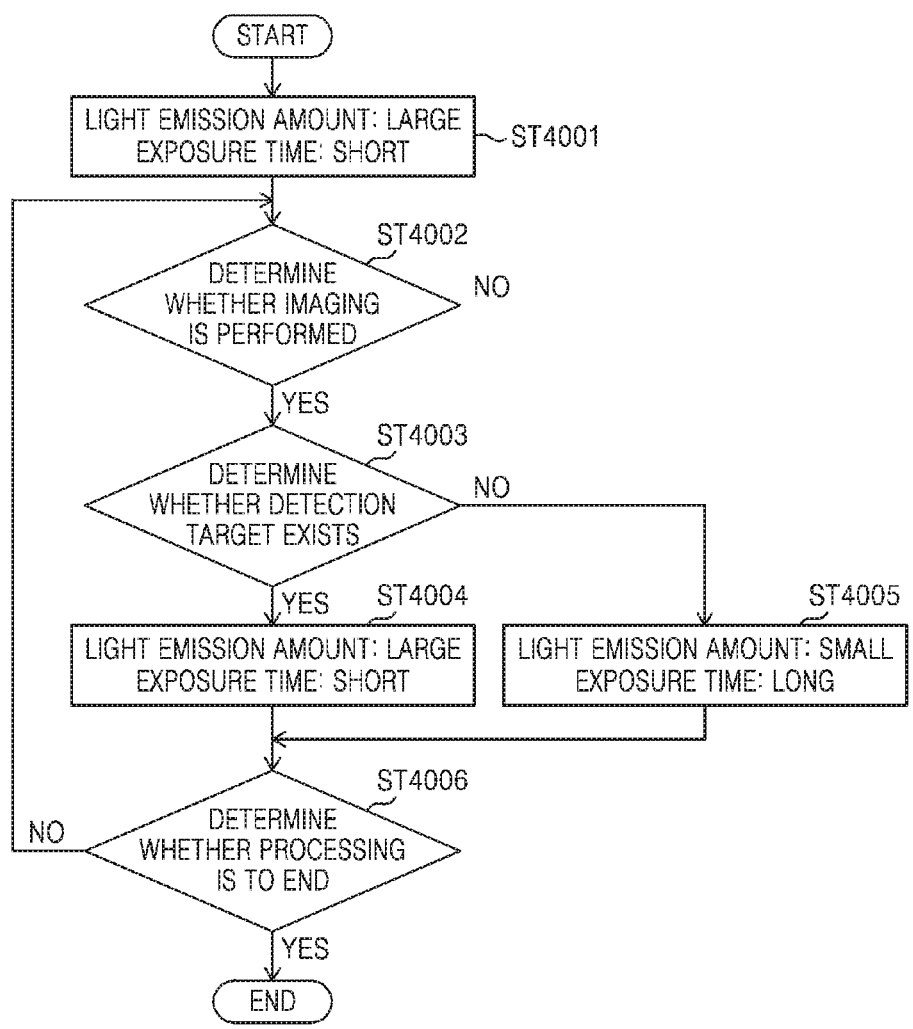
FIG. 60 is a flowchart for explaining an operation of the imaging device according to Embodiment 13.

Next, an operation of the imaging device 10 according to Embodiment 13 will be described with reference to FIG. 60. In the imaging device 10 according to Embodiment 13, the following processing is performed on each of the plurality of light sources 11a through 11d.

《Step ST4001》

First, the controller 14 sets a light emission amount of the light source 11 (referred to as the light source 11 to be processed this time) as a first light emission amount (i.e., "large") and sets an exposure time of the imaging circuitry 12 as a first exposure time (i.e., "short").

《Step ST4002》

Next, the controller 14 determines whether a subject illuminated by the light source 11 that emits light at a preset light emission amount (in detail, a light emission amount set in steps ST4001, ST4004, and ST4005) is imaged by the imaging circuitry 12 that is exposed at a preset exposure time (in detail, an exposure time set in steps ST4001, ST4004, and ST4005). For example, the controller 14 causes the imaging circuitry 12 that is exposed at the preset exposure time to image the subject N times and determines whether a captured image sequence including N (N is an integer equal to or greater than 2) captured images 20 that are continuous in time series is obtained, during a period where the light source 11 emits light at the preset light emission amount. When the subject illuminated by the light source 11 that emits light at the preset light emission amount is imaged by the imaging circuitry 12 that is exposed at the preset exposure time, the operation proceeds to step ST4003, and otherwise, the operation proceeds to step ST4002.

《Step ST4003》

Next, the determiner 15 extracts the image area 21 corresponding to the light source 11 from the captured image 20 obtained in step ST4002, and determines whether a detection target exists in the extracted image area 21. When it is determined that the detection target exists in the image area 21, the operation proceeds to step ST4004, and otherwise, the operation proceeds to step ST4005.

《Step ST4004》

When it is determined in step ST4003 that the detection target exists, the controller 14 sets a light emission amount of the light source 11 as the first light emission amount (i.e., "large") and sets an exposure time of the imaging circuitry 12 as the first exposure time (i.e., "short"). Next, the operation proceeds to step ST4006.

《Step ST4005》

When it is determined in step ST4003 that the detection target does not exist, the controller 14 sets a light emission amount of the light source 11 as a second light emission amount (i.e., "small") and sets an exposure time of the imaging circuitry 12 as a second exposure time (i.e., "long"). Next, the operation proceeds to step ST4006.

《Step ST4006》

Next, when processing is to end, the processing ends, and when the processing is to continue, the operation proceeds to step ST4002.

Effect of Embodiment 13

Even in the above configuration, the same effect as that of Embodiments 1 through 4 may be achieved. That is, power consumption needed to illuminate a subject may be reduced and the subject may be continuously monitored.

Also, when it is determined by the determiner 15 that a detection target exists, since a light emission amount of the light source 11 is set as a first light emission amount and an exposure time of the imaging circuitry 12 is set as a first exposure time, imaging of the subject by the imaging circuitry 12 may be rapidly performed more than that when a light emission amount of the light source 11 is set as a second light emission amount (a light emission amount less than the first light emission amount) and an exposure time of the imaging circuitry 12 is set as a second exposure time (an exposure time longer than the first exposure time).

Also, when it is determined by the determiner 15 that the detection target does not exist, since a light emission amount of the light source 11 is set as the second light emission amount (a light emission amount less than the first light emission amount) and an exposure time of the imaging circuitry 12 is set as the second exposure time (an exposure time longer than the first exposure time), a light emission amount of the light source 11 may be reduced and an exposure time of the imaging circuitry 12 may be r increased more than when it is determined by the determiner 15 that the detection target exists (i.e., when a light emission amount of the light source 11 is set as the first light emission amount and an exposure time of the imaging circuitry 12 is set as the first exposure time). Accordingly, power consumption of the light source 11 may be reduced. Also, since a light emission amount of the light source 11 is reduced and an exposure time of the imaging circuitry 12 is increased, a reduction in a brightness of a captured image due to a reduction in a light emission amount of the light source 11 may be compensated.

Also, in the above description, although a light emission amount of the light source 11 is set as the first light emission amount (i.e., "large") and an exposure time of the imaging circuitry 12 is set as the first exposure time (i.e., "short") in step ST4001, the controller 14 may be configured to set a light emission amount of the light source 11 as the second light emission amount (i.e., "small") and set an exposure time of the imaging circuitry 12 as the second exposure time (i.e., "long") in step ST4001.

Other Embodiments

Also, the above embodiments and modifications may be combined in any suitable manner. The above embodiments and modifications are essentially preferred examples and are not intended to limit the scope of the present disclosure, applications, or uses.

For example, control of Embodiment 6 may be applied to the imaging device 10 according to Embodiment 10. That is, in the imaging device 10 according to Embodiment 10, each of the plurality of light sources 11a through 11d may be configured to be capable of changing a light emission amount. The controller 14 may be configured to set a light emission amount of the light source 11 based on a brightness of the image area 200 that is a part of the captured image 20 obtained by the imaging circuitry 12 and corresponds to the light source 11 that does not emit light during imaging for obtaining the captured image 20. For example, the controller 14 may be configured to perform the same operation as an operation of the controller 14 of Embodiment 6.

Also, control of Embodiments 7 and 8 may be applied to the imaging device 10 according to Embodiment 10. That is, the imaging device 10 according to Embodiment 10 may further include the setter 18. Also, each of the plurality of light sources 11a through 11d may be configured to be capable of changing a light emission amount into a plurality of light emission amounts. Also, the controller 14 may be configured to, when a light emission amount to be set for the light-emitting light source 11 from among the plurality of light sources 11a through 11d is not determined, set a light emission amount of the light source 11 as a light emission amount selected from among the plurality of light emission amounts in a pre-determined order and perform a first operation in which a subject illuminated by the light source 11 that emits light (is turned on) at the selected light emission amount is imaged by the imaging circuitry 12, and when a light emission amount to be set for the light-emitting light source 11 from among the plurality of light sources 11a through 11d is determined, set a light emission amount of the light source 11 as a light emission amount to be set and perform a second operation in which the subject illuminated by the light source 11 that emits light (is turned on) at the light emission amount to be set is imaged by the imaging circuitry 12. The setter 18 may be configured to determine a light emission amount of the light source 11 that emits light (is turned on) during imaging for obtaining the captured image 20 including the image area 200 determined by the determiner 15 to include a detection target as a light emission amount to be set for the light source 11. For example, the controller 14 and the setter 18 may be configured to perform the same operations as those of the controller 14 and the setter 18 of Embodiments 7 and 8.

Also, control of Embodiment 9 may be applied to the imaging device 10 according to Embodiment 10. That is, in the imaging device 10 according to Embodiment 10, each of the plurality of light sources 11a through 11d may be configured to be capable of changing a light emission amount into a first light emission amount and a second light emission amount (a light emission amount less than the first light emission amount). Also, the imaging circuitry 12 may be configured to be capable of changing an exposure time into a first exposure time and a second exposure time (an exposure time longer than the first exposure time). The controller 14 may be configured to set a light emission amount of the light source 11 corresponding to the image area 200 determined by the determiner 15 to include the detection target as the first light emission amount and set an exposure time of the imaging circuitry 12 during imaging of the subject illuminated by the light source 11 as the first exposure time, and set a light emission amount of the light source 11 corresponding to the image area 200 determined by the determiner 15 not to include the detection target as the second light emission amount and set an exposure time of the imaging circuitry 12 during imaging of the subject illuminated by the light source 11 as the second exposure time. For example, the controller 14 may be configured to perform the same operation as an operation of Embodiment 9.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims.

INDUSTRIAL APPLICABILITY

As described above, since the above-described imaging device may reduce power consumption needed to illuminate a subject and continuously monitor the subject, the imaging device may be used as an imaging device for imaging and monitoring the subject.

The invention claimed is:
1. An imaging device comprising:
a plurality of light sources;
an imaging circuitry configured to capture an image of an image area; and
a processing circuit configured to:
sequentially select a group of light sources from among the plurality of light sources,
sequentially control the group of light sources to emit light, each light source of the group of light sources emitting light to a respective portion of the image area,
control the imaging circuitry to capture images of respective portions of the image area to which the light is emitted,
identify whether a detection target exists in each image of the images of the respective portions of the image area,
perform selective light emission control of the plurality of light sources based on identifying whether the detection target exists in each portion of the image area,
based on identifying that the detection target does not exist in the images of the respective portions of the image area, control the plurality of light sources to continue to emit the light to the image area based on a pre-determined light emission order, and
based on identifying that the detection target exists in the images of the respective portions of the image area, increase a light emission frequency of light sources corresponding to the images of the respective portions of the image area in which the detection target exists.

2. The imaging device of claim 1, wherein the processing circuit is further configured to:
based on identifying that the detection target exists in the images of the respective portions of the image area, alternately control the light sources corresponding to the images of the respective portions of the image area for which the detection target exists and light sources for which the detection target does not exist in the image area among the plurality of light sources to emit the light to the image area based on the pre-determined light emission order.

3. The imaging device of claim 2, wherein the processing circuit is further configured to control the light sources corresponding to the images of the respective portions of the respective portions of the image area for which the detection target exists to simultaneously emit the light.

4. The imaging device of claim 2, wherein the processing circuit is further configured to control the light sources corresponding to the images of the respective portions of the respective portions of the image area for which the detection target exists to sequentially emit the light.

5. The imaging device of claim 1, further comprising a detector configured to perform object detection on a pre-determined object in the image area.

6. The imaging device of claim 5, wherein, when a portion that is a part of an attention area that is the image area identified to include the detection target is an edge portion of the attention area, the processing circuit is further configured to detect the pre-determined object from a candidate area comprising the attention area and an adjacent area that is an image area adjacent to the edge portion of the attention area.

7. The imaging device of claim 5, further comprising an identifier configured to extract an object area that is a part of the image area and comprises the pre-determined object detected by the detector, and identify the pre-determined object by combining the object area with a combination image that is pre-registered.

8. The imaging device of claim 7, wherein, when the object area extracted by the identifier extends over an attention area of the image area identified to include the detection target and an adjacent area that is an image area adjacent to an edge portion of the attention area, the processing circuit is further configured to cause the imaging circuitry to image the image area by causing light sources corresponding to the attention area from among the plurality of light sources and light sources corresponding to the adjacent area from among the plurality of light sources to emit the light, and
the identifier is further configured to combine the object area with the combination image by extracting the object area from the images obtained by the imaging circuitry when the light sources corresponding to the attention area emit the light, combine the object area with the combination image by extracting the object area from the image obtained by the imaging circuitry when the light sources corresponding to the attention area and the adjacent area emit the light, and identify the pre-determined object based on a combination result.

9. The imaging device of claim 1, wherein the imaging circuitry is further configured to be driven by a rolling shutter method,
the processing circuit is further configured to control the group of light sources to emit the light so that a turn-on period when at least one light source from among the plurality of light sources is turned on and a turn-off period when the at least one light source is turned off exist in a period other than a period when all lines of the imaging circuitry are simultaneously exposed, and
the processing circuit is further configured to identify whether the detection target exists in the image area corresponding to the period when the at least one light source is turned on.

10. The imaging device of claim 9, wherein the processing circuit is further configured to:
based on identifying that the detection target does not exist in an image of a portion of the image area the images of the respective portions of the image area, control a next light source among the group of light sources of the plurality of light sources to emit the light to the image area based on the pre-determined light emission order and a turn-on order, and
based on identifying that the detection target exists in the images of the respective portions of the image area, increase a frequency at which light sources corresponding to the images of the respective portions of the image area are turned on in the turn-on period.

11. The imaging device of claim 10, wherein the processing circuit is further configured to:
based on identifying that the detection target exists in the images of the respective portions of the image area, alternately control light sources corresponding to the images of the respective portions of the respective portions of the image area for which the detection target exists and light sources for which the detection target does not exist in the image area among the plurality of light sources to emit the light to the image area based on the pre-determined light emission order.

12. The imaging device of claim 11, wherein the processing circuit is further configured to control the light sources corresponding to the images of the respective portions of the respective portions of the image area for which the detection target exists to simultaneously emit the light.

13. The imaging device of claim 11, wherein the processing circuit is further configured to control the light sources corresponding to the images of the respective portions of the respective portions of the image area for which the detection target exists to sequentially emit the light.

14. The imaging device of claim 1, wherein the processing circuit is further configured to set a light emission amount of the group of light sources based on a brightness of the image area.

15. The imaging device of claim 1, wherein the processing circuit is further configured to:
set a light emission amount of the group of light sources from among a plurality of light emission amounts in a pre-determined order.

16. The imaging device of claim 1, wherein the imaging circuitry is further configured to change an exposure time for capturing the image area, and
the processing circuit is further configured to set a light emission amount of the group of light sources and the exposure time of the imaging circuitry.

17. The imaging device of claim 1, wherein the imaging circuitry is further configured to be driven by a rolling shutter method, and
the processing circuit is further configured to:
control the group of light sources to emit the light so that a period when at least one light source from among the plurality of light sources is turned on and a period when the at least one light source is turned off exist in a period other than a period when all lines of the imaging circuitry are simultaneously exposed, and
determine the image area based on the period when the at least one light source is turned on.

18. The imaging device of claim 17, wherein the image area is divided into a plurality of row areas and a plurality of column areas,
wherein each column area from among the plurality of column areas corresponds to a light source among the plurality of light sources, and
each row area from among the plurality of row areas corresponds to the period when the at least one light source is turned on.

19. An imaging method using a plurality of light sources that each emit light to an image area, the imaging method comprising:
sequentially selecting a group of light sources from among the plurality of light sources;
sequentially controlling the group of light sources to emit light, each light source of the group of light sources emitting light to a respective portion of the image area;
capturing images of respective portions of the image area to which the light is emitted;
identifying whether a detection target exists in each image of the images of the respective portions of the image area;
performing selective light emission control of the plurality of light sources based on identifying whether the detection target exists in each portion of the image area;
based on identifying that the detection target does not exist in the images of the respective portions of the image area, controlling the plurality of light sources to continue to emit the light to the image area based on a pre-determined light emission order, and
based on identifying that the detection target exists in the images of the respective portions of the image area, increasing a light emission frequency of light sources corresponding to the images of the respective portions of the image area in which the detection target exists.

20. The imaging method of claim 19, further comprising:
based on identifying that the detection target exists in the images of the respective portions of the image area, alternately controlling the light sources corresponding to the images of the respective portions of the image area for which the detection target exists and light sources for which the detection target does not exist in the image area among the plurality of light sources to emit the light to the image area based on the pre-determined light emission order.

21. The imaging method of claim 20, further comprising:
controlling the light sources corresponding to the images of the respective portions of the respective portions of the image area for which the detection target exists to simultaneously emit the light.

22. The imaging method of claim 20, further comprising:
controlling the light sources corresponding to the images of the respective portions of the respective portions of the image area for which the detection target exists to sequentially emit the light.

23. The imaging method of claim 19, further comprising:
performing object detection on a pre-determined object in the image area.

24. The imaging method of claim 23, further comprising:
extracting an object area that is a part of the image and comprises the pre-determined object detected from the image, and identifying the pre-determined object by combining the object area with a combination image that is pre-registered.

* * * * *